United States Patent
Marinier et al.

(10) Patent No.: US 9,699,779 B2
(45) Date of Patent: Jul. 4, 2017

(54) PHYSICAL LAYER OPERATION FOR MULTI-LAYER OPERATION IN A WIRELESS SYSTEM

(71) Applicant: INTERDIGITAL PATENT HOLDINGS, INC., Wilmington, DE (US)

(72) Inventors: Paul Marinier, Brossard (CA); J. Patrick Tooher, Montreal (CA); Ghyslain Pelletier, Laval (CA); Diana Pani, Montreal (CA)

(73) Assignee: InterDigital Patent Holdings, Inc., Wilmington, DE (US)

( * ) Notice: Subject to any disclaimer, the term of this patent is extended or adjusted under 35 U.S.C. 154(b) by 150 days.

(21) Appl. No.: 13/974,911

(22) Filed: Aug. 23, 2013

(65) Prior Publication Data

US 2014/0056278 A1 Feb. 27, 2014

Related U.S. Application Data

(60) Provisional application No. 61/692,548, filed on Aug. 23, 2012, provisional application No. 61/726,262, (Continued)

(51) Int. Cl.
*H04W 72/04* (2009.01)
*H04W 72/12* (2009.01)
(Continued)

(52) U.S. Cl.
CPC .......... *H04W 72/044* (2013.01); *H04B 7/024* (2013.01); *H04W 52/365* (2013.01);
(Continued)

(58) Field of Classification Search
CPC .... H04W 52/346; H04W 74/04; H04L 1/1887
(Continued)

(56) References Cited

U.S. PATENT DOCUMENTS 7,826,411 B2  11/2010 Gonikberg et al.
7,978,677 B2   7/2011 Prakash et al.
(Continued)

FOREIGN PATENT DOCUMENTS

CN   1863344 A    11/2006
JP   2009-124500 A  6/2009
(Continued)

OTHER PUBLICATIONS

3rd Generation Partnership Project (3GPP), R1-090357, "Carrier Aggregation in Heterogeneous Networks", Qualcomm Europe, 3GPP TSG RAN WG1 #55bis, Ljubljana, Slovenia, Jan. 12-16, 2009, 12 pages.
(Continued)

*Primary Examiner* — Yaotang Wang
(74) *Attorney, Agent, or Firm* — Condo Roccia Koptiw LLP

(57) ABSTRACT

Methods and systems are disclosed for providing physical layer resources to a plurality of medium access control (MAC) instances that are associated with different serving sites that are independently scheduled. For example, a WTRU may utilize a first physical layer configuration for transmitting to a first serving site associated with a first MAC instance. The WTRU may utilize a second physical layer configuration for transmitting to a second serving site associated with a second MAC instance. The WTRU may prevent conflicts between transmission requests from the first MAC instance and transmission requests from the second MAC instance. For example, preventing the conflicts may include utilizing one or more of time segregation or frequency segregation for transmissions associated with the first MAC instance and transmissions associated with the second MAC instance.

20 Claims, 6 Drawing Sheets

Related U.S. Application Data filed on Nov. 14, 2012, provisional application No. 61/808,013, filed on Apr. 3, 2013, provisional application No. 61/821,154, filed on May 8, 2013.

(51) Int. Cl.
*H04W 52/36* (2009.01)
*H04W 88/06* (2009.01)
*H04B 7/024* (2017.01)
*H04B 7/02* (2017.01)
*H04W 52/14* (2009.01)
*H04W 52/26* (2009.01)
*H04W 52/28* (2009.01)

(52) U.S. Cl.
CPC ..... *H04W 52/367* (2013.01); *H04W 72/1268* (2013.01); *H04W 52/146* (2013.01); *H04W 52/265* (2013.01); *H04W 52/281* (2013.01); *H04W 88/06* (2013.01)

(58) Field of Classification Search
USPC .......................................................... 370/330
See application file for complete search history.

(56) References Cited

U.S. PATENT DOCUMENTS

| | | | |
|---|---|---|---|
| 8,184,658 B1* | 5/2012 | Chowdhuri et al. | 370/466 |
| 8,498,284 B2 | 7/2013 | Pani et al. | |
| 8,553,580 B2 | 10/2013 | Yin | |
| 2006/0056448 A1 | 3/2006 | Zaki et al. | |
| 2006/0121921 A1 | 6/2006 | Tajima et al. | |
| 2007/0201397 A1 | 8/2007 | Zhang et al. | |
| 2007/0232358 A1 | 10/2007 | Sherman | |
| 2007/0286126 A1 | 12/2007 | Prakash et al. | |
| 2009/0122730 A1 | 5/2009 | Yang et al. | |
| 2009/0175214 A1 | 7/2009 | Sfar et al. | |
| 2009/0196259 A1 | 8/2009 | Pani et al. | |
| 2009/0238124 A1 | 9/2009 | Pragada et al. | |
| 2009/0316659 A1 | 12/2009 | Lindoff et al. | |
| 2010/0020852 A1 | 1/2010 | Erell et al. | |
| 2010/0027471 A1 | 2/2010 | Palanki et al. | |
| 2010/0124291 A1 | 5/2010 | Muharemovic et al. | |
| 2010/0157944 A1 | 6/2010 | Horn | |
| 2010/0202392 A1 | 8/2010 | Sambhwani et al. | |
| 2010/0202394 A1* | 8/2010 | Zhang | H04W 52/34 370/329 |
| 2010/0240375 A1 | 9/2010 | Ahluwalia | |
| 2010/0260111 A1* | 10/2010 | Sung et al. | 370/328 |
| 2011/0044218 A1 | 2/2011 | Kaur et al. | |
| 2011/0044297 A1* | 2/2011 | Lee | H04W 28/06 370/336 |
| 2011/0134774 A1 | 6/2011 | Pelletier et al. | |
| 2011/0134831 A1 | 6/2011 | Pirskanen | |
| 2011/0141959 A1* | 6/2011 | Damnjanovic | H04L 1/1854 370/311 |
| 2011/0275374 A1 | 11/2011 | Narasimha et al. | |
| 2011/0310859 A1 | 12/2011 | Vedantham et al. | |
| 2012/0083308 A1* | 4/2012 | Wang et al. | 455/522 |
| 2012/0178454 A1 | 7/2012 | Kim et al. | |
| 2013/0058315 A1* | 3/2013 | Feuersanger | H04W 52/281 370/336 |
| 2013/0083678 A1 | 4/2013 | Yin | |
| 2014/0010207 A1 | 1/2014 | Horn et al. | |
| 2014/0099939 A1 | 4/2014 | Uemura et al. | |
| 2015/0009853 A1 | 1/2015 | Wan et al. | |
| 2015/0215898 A1 | 7/2015 | Nebat et al. | |

FOREIGN PATENT DOCUMENTS

| | | |
|---|---|---|
| JP | 2009-290341 A | 12/2009 |
| JP | 2011-517536 A | 6/2011 |
| JP | 2011-525327 A | 9/2011 |
| JP | 2011-530238 A | 12/2011 |
| JP | 2012-503347 A | 2/2012 |
| JP | 2013-502152 A | 1/2013 |
| KR | 10-2011-0050546 A | 5/2011 |
| KR | 10-2011-0124302 A | 11/2011 |
| KR | 10-2012-0027526 A | 3/2012 |
| RU | 2420903 C2 | 6/2011 |
| WO | WO 2005/002141 A1 | 1/2005 |
| WO | WO 2009/120125 A1 | 10/2009 |
| WO | WO 2010/014969 A1 | 2/2010 |
| WO | WO 2010032675 A1 | 3/2010 |
| WO | WO 2010/144864 A1 | 12/2010 |
| WO | WO 2011/019501 A1 | 2/2011 |
| WO | WO 2011/100673 A1 | 2/2011 |
| WO | WO 2012/074878 A2 | 6/2012 |
| WO | WO 2012/096502 A2 | 7/2012 |

OTHER PUBLICATIONS

3rd Generation Partnership Project (3GPP), R1-122402, "UL Transmissions in Case of Multiple TA", Nokia Siemens Networks, Nokia, 3GPP TSG-RAN WG1 Meeting #69, Prague, Czech Republic, May 21-25, 2012, 4 pages.

3rd Generation Partnership Project (3GPP), R2-093104, "Carrier Aggregation in Active Mode", Huawei, 3GPP TSG RAN WG2 Meeting #66, San Francisco, USA, May 4-8, 2009, 4 pages.

3rd Generation Partnership Project (3GPP), R2-093599, "LS on RAN2 Status on Carrier Aggregation Design", RAN 2, 3GPP TSG RAN WG2 Meeting #66, San Francisco, USA, May 4-8, 2009, 3 pages.

3rd Generation Partnership Project (3GPP), R2-093933, "Mobility Management Consideration for Carrier Aggregation", Huawei, 3GPP TSG RAN WG2 Meeting #66bis, Los Angeles, USA, Jun. 29-Jul. 3, 2009, 3 pages.

3rd Generation Partnership Project (3GPP), R2-095958, "Control Plane Aspects of Carrier Aggregation", Ericsson, 3GPP TSG RAN WG2 #66, San Francisco, USA, May 4-8, 2009, pp. 1-4.

3rd Generation Partnership Project (3GPP), TS 36.211 V10.1.0, "Technical Specification Group Radio Access Network, Evolved Universal Terrestrial Radio Access (E-UTRA), Physical Channels and Modulation (Release 10)", Mar. 2011, pp. 1-103.

3rd Generation Partnership Project (3GPP), TS 36.212 V10.1.0, "Technical Specification Group Radio Access Network, Evolved Universal Terrestrial Radio Access (E-UTRA), Multiplexing and Channel Coding (Release 10)", Mar. 2011, pp. 1-76.

3rd Generation Partnership Project (3GPP), TS 36.213 V10.1.0, "Technical Specification Group Radio Access Network, Evolved Universal Terrestrial Radio Access (E-UTRA), Physical Layer Procedures (Release 10)", Mar. 2011, pp. 1-115.

3rd Generation Partnership Project (3GPP), TS 36.321 V11.2.0, "Technical Specification Group Radio Access Network, Evolved Universal Terrestrial Radio Access (E-UTRA), Medium Access Control (MAC) Protocol Specification (Release 11)", Mar. 2013, pp. 1-56.

3rd Generation Partnership Project (3GPP), TS 36.322 V8.6.0, "Technical Specification Group Radio Access Network, Evolved Universal Terrestrial Radio Access (E-UTRA) Radio Link Control (RLC) Protocol Specification (Release 8)", Jun. 2009, pp. 1-39.

3rd Generation Partnership Project(3GPP), R1-090066, "Relaying for LTE-Advanced", Alcatel Shanghai Bell, Alcatel-Lucent, 3GPP TSG RAN WG1 Meeting #55bis, Ljubljana, Slovenia, Jan. 12-16, 2009, 9 pages.

3rd Generation Partnership Project, TS 36.423 V8.6.0, "Technical Specification Group Radio Access Network, Evolved Universal Terrestrial Radio Access Network (E-UTRAN), X2 Application Protocol (X2AP) (Release 8)", Jun. 2009, pp. 1-100.

Shen et al., "Overview of 3GPP LTE-Advanced Carrier Aggregation for 4G Wireless Communications", IEEE Communications Magazine, vol. 50, No. 2, Feb. 1, 2012, pp. 122-130.

3rd Generation Partnership Project (3GPP), R2-092394, "LTE-Advanced Discussion for RAN2", Panasonic, 3GPP TSG RAN WG2 #65bis, Mar. 23-27, 2009, 7pp.

* cited by examiner

PHYSICAL LAYER OPERATION FOR MULTI-LAYER OPERATION IN A WIRELESS SYSTEM

CROSS-REFERENCE TO RELATED APPLICATIONS

This application claims the benefit of U.S. Provisional Patent Application No. 61/692,548, filed Aug. 23, 2012; U.S. Provisional Patent Application No. 61/726,262, filed Nov. 14, 2012; U.S. Provisional Patent Application No. 61/808,013, filed Apr. 3, 2013; and U.S. Provisional Patent Application No. 61/821,154, filed May 8, 2013, the contents of which are hereby incorporated by reference in their entirety.

BACKGROUND

Long Term Evolution (LTE) R11 and earlier may support multi-point connections with Remote Radio Heads (RRH) based architectures. However, such systems utilized a centralized scheduler on the same or different uplink (UL) and/or downlink (DL) frequencies. Since the scheduling of the different transmissions were scheduled in a coordinated fashion, conflicts between scheduling orders received from different transmission/reception points were generally not of great concern.

The operation of a wireless transmit/receive unit (WTRU) in a network in which the scheduling functionality for the downlink and/or the uplink transmissions is distributed in more than one physical location and/or node may present some challenges. For example, some characteristics of a signal to be transmitted by a WTRU may depend on scheduling decisions that are made independently in each node. Without tight coordination among nodes (e.g., which may be unavailable if the backhaul link between the nodes is associated with a relatively high latency) certain signals may not be properly transmitted at the WTRU side, and signals received at the network side may not be properly decoded.

SUMMARY

Methods and systems are described for physical layer operation when a WTRU is configured to transmit to a plurality of serving sites. For example, methods and systems are disclosed for providing physical layer resources to a plurality of medium access control (MAC) instances that are associated with different serving sites that are independently scheduled. For example, a WTRU may utilize a first physical layer configuration for transmitting to a first serving site associated with a first MAC instance. The WTRU may utilize a second physical layer configuration for transmitting to a second serving site associated with a second MAC instance. The WTRU may prevent conflicts between transmission requests from the first MAC instance and transmission requests from the second MAC instance (e.g., coordinate transmission requests). For example, preventing the conflicts may include utilizing one or more of time segregation or frequency segregation for transmissions associated with the first MAC instance and transmissions associated with the second MAC instance.

For example, time segregation may be utilized for preventing conflicts between the uplink transmissions of the plurality of MAC instances. When time segregation is utilized each of the first MAC instance and the second MAC instance may be assigned a respective subset of subframes for transmitting in the uplink. For example, a first subset of subframes may be assigned to the first MAC instance and a second set of subframes may be assigned to the second MAC instance. The subframe subsets may be completely separated or may partially overlap. The first MAC instance and the second MAC instance may utilize non-synchronous subframe timing. The WTRU may determine to drop at least one symbol to be transmitted to the first serving site based on an allocated subframe of the second serving site overlapping with an allocated subframe of the first serving site. The symbol may be dropped in order to allow the WTRU to switch its physical layer configuration in order to transmit to a different serving site. The at least one symbol that is dropped may be the last symbol in the allocated subframe of the first serving site. In an example, the WRU may drop the first symbol of the allocated subframe of the second serving site.

Due to limited number of subframes available for uplink transmission, one or more uplink procedures may be modified in order to ensure uplink resources are available for transmission to a given MAC instance. For example, a first hybrid automatic repeat request (HARQ) feedback timing relationship may be applied for transmissions sent using the first MAC instance, and a second HARQ timing relationship may be applied for transmission sent using the second MAC instance.

In an example, frequency segregation may be utilized. For example, the WTRU may transmit using a first carrier when sending transmission associated with the first MAC instance, and the WTRU may transmit using a second carrier when sending transmission associated with the second MAC instance. The carriers may be separated in the frequency domain. The WTRU may be configured with a maximum transmit power for each MAC instance. The WTRU may be configured with a maximum transmit power for transmitting to one or more of the first serving site or the second serving site (e.g., a total amount of power available at any given time instant). The WTRU may determine that transmitting according to a first received uplink grant for the first serving site and transmitting according to a second uplink grant for the second serving site would result in the WTRU exceeding the maximum transmit power.

The WTRU may determine to scale one or more of a transmission to the first serving site or a transmission to the second serving site based on determining that transmitting according to the first received uplink grant for the first serving site and transmitting according to the second uplink grant for the second serving site would result in the WTRU exceeding the maximum transmit power. For example, scaling one or more of a transmission to the first serving site or a transmission to the second serving site may include allocating power first to a physical uplink control channel (PUCCH) transmission, and allocating remaining power up to the maximum transmit power to one or more physical uplink shared channel (PUSCH) transmissions. The WTRU may include an indication that a transmission has been scaled due to power constraints in one or more of the transmission to the first serving site or the transmission to the second serving site. The WTRU may determine which transmission to scale based on a priority of data to be transmitted to the first serving site and a priority of data to be transmitted to the second serving site.

The WTRU may transmit a quality of service (QoS) status report (QSR) to one or more of the first serving site or the second serving site. The QSR may be sent based on determining that a QoS requirement for at least one radio bearer is not being met. The QSR may include information related to bearers associated with different serving sites and/or bearers mapped to a plurality of serving sites. The WTRU may determine a relative priority between a first uplink grant associated with the first MAC instance and a second uplink grant associated with the second MAC instance based on explicit indications regarding priority received from a network entity. The priority may be used to prioritize a transmission to one of the serving sites in case of conflict.

The WTRU may report power headroom information for each of transmissions associated with the MAC instance and transmissions associated with the second MAC instance to the first serving site. For example, the power headroom information for each of transmissions associated with the MAC instance and transmissions associated with the second MAC instance to the first serving site may be reported based on determining to scale at least one transmission to one or more of the first serving site or the second serving site.

BRIEF DESCRIPTION OF THE DRAWINGS

A more detailed understanding may be had from the following description, given by way of example in conjunction with the accompanying drawings wherein.

DETAILED DESCRIPTION

A detailed description of illustrative examples will now be described with reference to the various Figures. Although this description provides a detailed example of possible implementations, it should be noted that the details are intended to be exemplary and in no way limit the scope of the application.

Figure 1A:
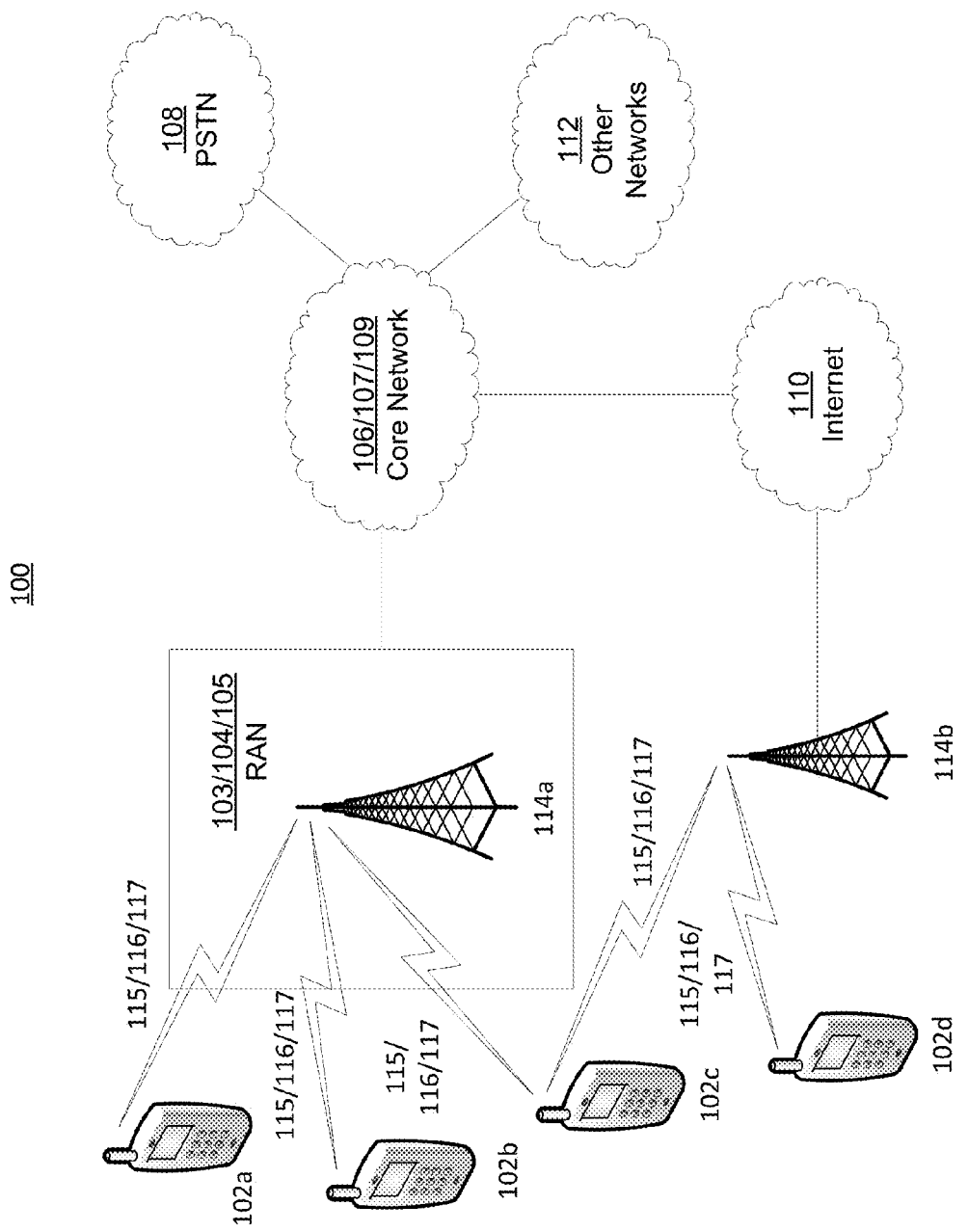
FIG. 1A is a system diagram of an example communications system in which one or more disclosed embodiments may be implemented.

FIG. 1A is a diagram of an example communications system 100 in which one or more disclosed embodiments may be implemented. The communications system 100 may be a multiple access system that provides content, such as voice, data, video, messaging, broadcast, etc., to multiple wireless users. The communications system 100 may enable multiple wireless users to access such content through the sharing of system resources, including wireless bandwidth. For example, the communications systems 100 may employ one or more channel access methods, such as code division multiple access (CDMA), time division multiple access (TDMA), frequency division multiple access (FDMA), orthogonal FDMA (OFDMA), single-carrier FDMA (SC-FDMA), and the like.

As shown in FIG. 1A, the communications system 100 may include wireless transmit/receive units (WTRUs) 102a, 102b, 102c, and/or 102d (which generally or collectively may be referred to as WTRU 102), a radio access network (RAN) 103/104/105, a core network 106/107/109, a public switched telephone network (PSTN) 108, the Internet 110, and other networks 112, though it will be appreciated that the disclosed embodiments contemplate any number of WTRUs, base stations, networks, and/or network elements. Each of the WTRUs 102a, 102b, 102c, 102d may be any type of device configured to operate and/or communicate in a wireless environment. By way of example, the WTRUs 102a, 102b, 102c, 102d may be configured to transmit and/or receive wireless signals and may include user equipment (UE), a mobile station, a fixed or mobile subscriber unit, a pager, a cellular telephone, a personal digital assistant (PDA), a smartphone, a laptop, a netbook, a personal computer, a wireless sensor, consumer electronics, and the like.

The communications systems 100 may also include a base station 114a and a base station 114b. Each of the base stations 114a, 114b may be any type of device configured to wirelessly interface with at least one of the WTRUs 102a, 102b, 102c, 102d to facilitate access to one or more communication networks, such as the core network 106/107/109, the Internet 110, and/or the networks 112. By way of example, the base stations 114a, 114b may be a base transceiver station (BTS), a Node-B, an eNode B, a Home Node B, a Home eNode B, a site controller, an access point (AP), a wireless router, and the like. While the base stations 114a, 114b are each depicted as a single element, it will be appreciated that the base stations 114a, 114b may include any number of interconnected base stations and/or network elements.

The base station 114a may be part of the RAN 103/104/105, which may also include other base stations and/or network elements (not shown), such as a base station controller (BSC), a radio network controller (RNC), relay nodes, etc. The base station 114a and/or the base station 114b may be configured to transmit and/or receive wireless signals within a particular geographic region, which may be referred to as a cell (not shown). The cell may further be divided into cell sectors. For example, the cell associated with the base station 114a may be divided into three sectors. Thus, in one embodiment, the base station 114a may include three transceivers, i.e., one for each sector of the cell. In another embodiment, the base station 114a may employ multiple-input multiple output (MIMO) technology and, therefore, may utilize multiple transceivers for each sector of the cell.

The base stations 114a, 114b may communicate with one or more of the WTRUs 102a, 102b, 102c, 102d over an air interface 115/116/117, which may be any suitable wireless communication link (e.g., radio frequency (RF), microwave, infrared (IR), ultraviolet (UV), visible light, etc.). The air interface 115/116/117 may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114a in the RAN 103/104/105 and the WTRUs 102a, 102b, 102c may implement a radio technology such as Universal Mobile Telecommunications System (UMTS) Terrestrial Radio Access (UTRA), which may establish the air interface 115/116/117 using wideband CDMA (WCDMA). WCDMA may include communication protocols such as High-Speed Packet Access (HSPA) and/or Evolved HSPA (HSPA+). HSPA may include High-Speed Downlink Packet Access (HSDPA) and/or High-Speed Uplink Packet Access (HSUPA).

In another embodiment, the base station 114a and the WTRUs 102a, 102b, 102c may implement a radio technology such as Evolved UMTS Terrestrial Radio Access (E-UTRA), which may establish the air interface 115/116/117 using Long Term Evolution (LTE) and/or LTE-Advanced (LTE-A).

In other embodiments, the base station 114a and the WTRUs 102a, 102b, 102c may implement radio technologies such as IEEE 802.16 (i.e., Worldwide Interoperability for Microwave Access (WiMAX)), CDMA2000, CDMA2000 1x, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114b in FIG. 1A may be a wireless router, Home Node B, Home eNode B, or access point, for example, and may utilize any suitable RAT for facilitating wireless connectivity in a localized area, such as a place of business, a home, a vehicle, a campus, and the like. In one embodiment, the base station 114b and the WTRUs 102c, 102d may implement a radio technology such as IEEE 802.11 to establish a wireless local area network (WLAN). In another embodiment, the base station 114b and the WTRUs 102c, 102d may implement a radio technology such as IEEE 802.15 to establish a wireless personal area network (WPAN). In yet another embodiment, the base station 114b and the WTRUs 102c, 102d may utilize a cellular-based RAT (e.g., WCDMA, CDMA2000, GSM, LTE, LTE-A, etc.) to establish a picocell or femtocell. As shown in FIG. 1A, the base station 114b may have a direct connection to the Internet 110. Thus, the base station 114b may not be required to access the Internet 110 via the core network 106/107/109.

The RAN 103/104/105 may be in communication with the core network 106/107/109, which may be any type of network configured to provide voice, data, applications, and/or voice over internet protocol (VoIP) services to one or more of the WTRUs 102a, 102b, 102c, 102d. For example, the core network 106/107/109 may provide call control, billing services, mobile location-based services, pre-paid calling, Internet connectivity, video distribution, etc., and/or perform high-level security functions, such as user authentication. Although not shown in FIG. 1A, it will be appreciated that the RAN 103/104/105 and/or the core network 106/107/109 may be in direct or indirect communication with other RANs that employ the same RAT as the RAN 103/104/105 or a different RAT. For example, in addition to being connected to the RAN 103/104/105, which may be utilizing an E-UTRA radio technology, the core network 106/107/109 may also be in communication with another RAN (not shown) employing a GSM radio technology.

The core network 106/107/109 may also serve as a gateway for the WTRUs 102a, 102b, 102c, 102d to access the PSTN 108, the Internet 110, and/or other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and the internet protocol (IP) in the TCP/IP internet protocol suite. The networks 112 may include wired or wireless communications networks owned and/or operated by other service providers. For example, the networks 112 may include another core network connected to one or more RANs, which may employ the same RAT as the RAN 103/104/105 or a different RAT.

Some or all of the WTRUs 102a, 102b, 102c, 102d in the communications system 100 may include multi-mode capabilities, i.e., the WTRUs 102a, 102b, 102c, 102d may include multiple transceivers for communicating with different wireless networks over different wireless links. For example, the WTRU 102c shown in FIG. 1A may be configured to communicate with the base station 114a, which may employ a cellular-based radio technology, and with the base station 114b, which may employ an IEEE 802 radio technology.

Figure 1B:
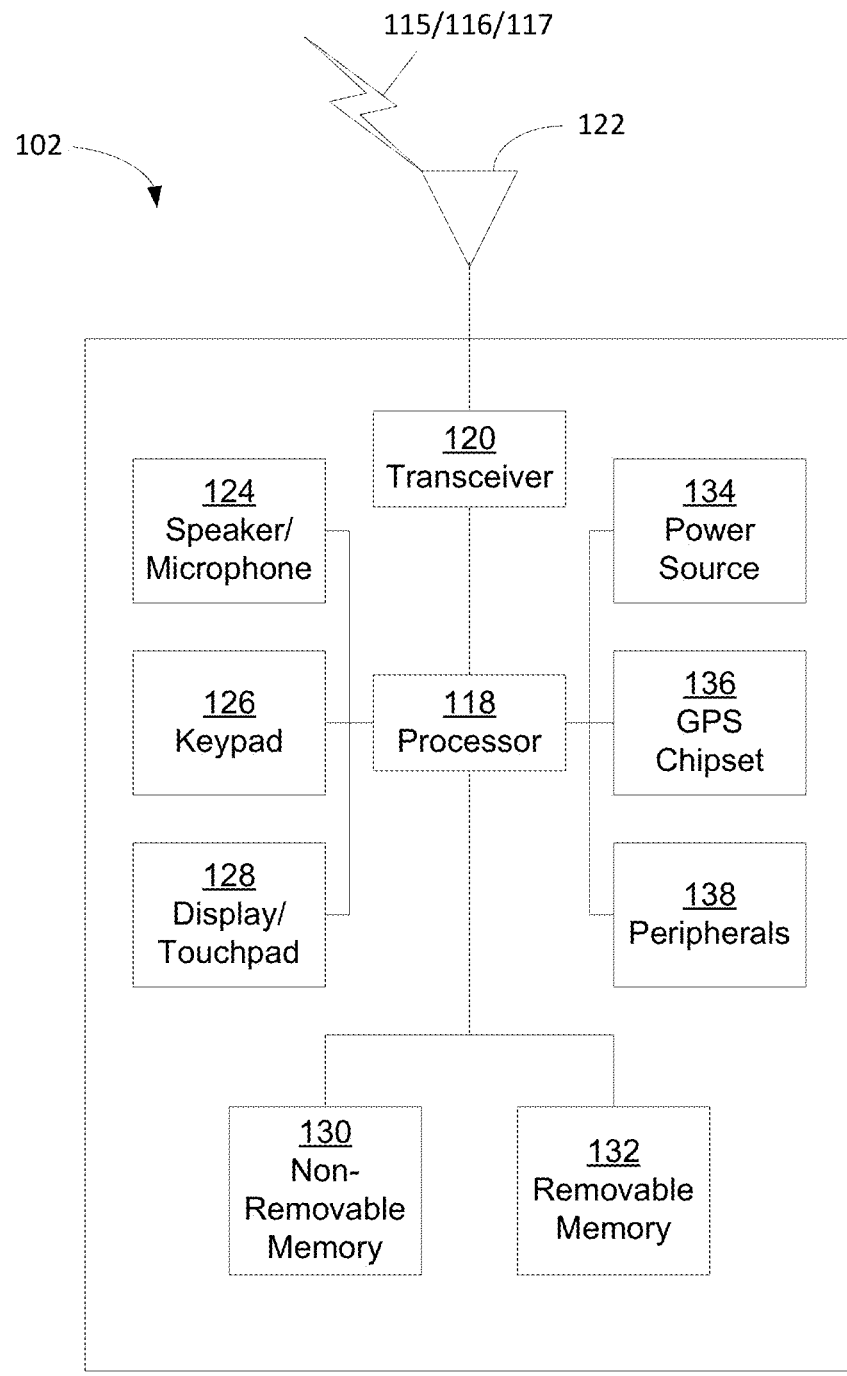
FIG. 1B is a system diagram of an example wireless transmit/receive unit (WTRU) that may be used within the communications system illustrated in FIG. 1A.

FIG. 1B is a system diagram of an example WTRU 102. As shown in FIG. 1B, the WTRU 102 may include a processor 118, a transceiver 120, a transmit/receive element 122, a speaker/microphone 124, a keypad 126, a display/touchpad 128, non-removable memory 130, removable memory 132, a power source 134, a global positioning system (GPS) chipset 136, and other peripherals 138. It will be appreciated that the WTRU 102 may include any sub-combination of the foregoing elements while remaining consistent with an embodiment. Also, embodiments contemplate that the base stations 114a and 114b, and/or the nodes that base stations 114a and 114b may represent, such as but not limited to transceiver station (BTS), a Node-B, a site controller, an access point (AP), a home node-B, an evolved home node-B (eNodeB), a home evolved node-B (HeNB), a home evolved node-B gateway, and proxy nodes, among others, may include some or all of the elements depicted in FIG. 1B and described herein.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 1B depicts the processor 118 and the transceiver 120 as separate components, it will be appreciated that the processor 118 and the transceiver 120 may be integrated together in an electronic package or chip.

The transmit/receive element 122 may be configured to transmit signals to, or receive signals from, a base station (e.g., the base station 114a) over the air interface 115/116/117. For example, in one embodiment, the transmit/receive element 122 may be an antenna configured to transmit and/or receive RF signals. In another embodiment, the transmit/receive element 122 may be an emitter/detector configured to transmit and/or receive IR, UV, or visible light signals, for example. In yet another embodiment, the transmit/receive element 122 may be configured to transmit and receive both RF and light signals. It will be appreciated that the transmit/receive element 122 may be configured to transmit and/or receive any combination of wireless signals.

In addition, although the transmit/receive element 122 is depicted in FIG. 1B as a single element, the WTRU 102 may include any number of transmit/receive elements 122. More specifically, the WTRU 102 may employ MIMO technology. Thus, in one embodiment, the WTRU 102 may include two or more transmit/receive elements 122 (e.g., multiple antennas) for transmitting and receiving wireless signals over the air interface 115/116/117.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as UTRA and IEEE 802.11, for example.

The processor 118 of the WTRU 102 may be coupled to, and may receive user input data from, the speaker/microphone 124, the keypad 126, and/or the display/touchpad 128 (e.g., a liquid crystal display (LCD) display unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, such as the non-removable memory 130 and/or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. In other embodiments, the processor 118 may access information from, and store data in, memory that may not be physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 115/116/117 from a base station (e.g., base stations 114a, 114b) and/or determine its location based on the timing of the signals being received from two or more nearby base stations. It will be appreciated that the WTRU 102 may acquire location information by way of any suitable location-determination method while remaining consistent with an embodiment.

The processor 118 may further be coupled to other peripherals 138, which may include one or more software and/or hardware modules that provide additional features, functionality and/or wired or wireless connectivity. For example, the peripherals 138 may include an accelerometer, an e-compass, a satellite transceiver, a digital camera (for photographs or video), a universal serial bus (USB) port, a vibration device, a television transceiver, a hands free headset, a Bluetooth® module, a frequency modulated (FM) radio unit, a digital music player, a media player, a video game player module, an Internet browser, and the like.

Figure 1C:
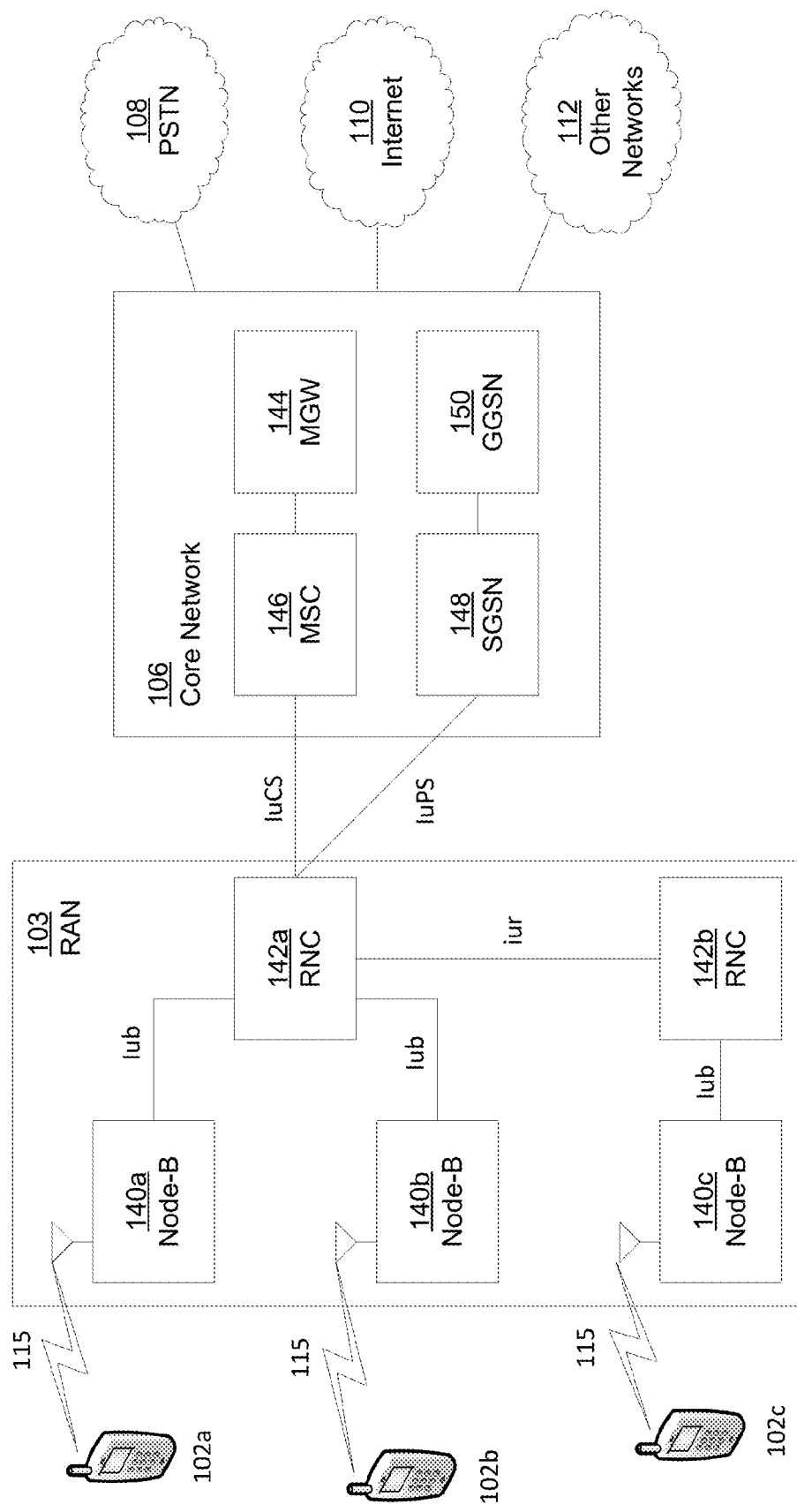
FIG. 1C is a system diagram of an example radio access network and an example core network that may be used within the communications system illustrated in FIG. 1A.

FIG. 1C is a system diagram of the RAN 103 and the core network 106 according to an embodiment. As noted above, the RAN 103 may employ a UTRA radio technology to communicate with the WTRUs 102a, 102b, 102c over the air interface 115. The RAN 103 may also be in communication with the core network 106. As shown in FIG. 1C, the RAN 103 may include Node-Bs 140a, 140b, 140c, which may each include one or more transceivers for communicating with the WTRUs 102a, 102b, 102c over the air interface 115. The Node-Bs 140a, 140b, 140c may each be associated with a particular cell (not shown) within the RAN 103. The RAN 103 may also include RNCs 142a, 142b. It will be appreciated that the RAN 103 may include any number of Node-Bs and RNCs while remaining consistent with an embodiment.

As shown in FIG. 1C, the Node-Bs 140a, 140b may be in communication with the RNC 142a. Additionally, the Node-B 140c may be in communication with the RNC142b. The Node-Bs 140a, 140b, 140c may communicate with the respective RNCs 142a, 142b via an Iub interface. The RNCs 142a, 142b may be in communication with one another via an Iur interface. Each of the RNCs 142a, 142b may be configured to control the respective Node-Bs 140a, 140b, 140c to which it is connected. In addition, each of the RNCs 142a, 142b may be configured to carry out or support other functionality, such as outer loop power control, load control, admission control, packet scheduling, handover control, macrodiversity, security functions, data encryption, and the like.

The core network 106 shown in FIG. 1C may include a media gateway (MGW) 144, a mobile switching center (MSC) 146, a serving GPRS support node (SGSN) 148, and/or a gateway GPRS support node (GGSN) 150. While each of the foregoing elements are depicted as part of the core network 106, it will be appreciated that any one of these elements may be owned and/or operated by an entity other than the core network operator.

The RNC 142a in the RAN 103 may be connected to the MSC 146 in the core network 106 via an IuCS interface. The MSC 146 may be connected to the MGW 144. The MSC 146 and the MGW 144 may provide the WTRUs 102a, 102b, 102c with access to circuit-switched networks, such as the PSTN 108, to facilitate communications between the WTRUs 102a, 102b, 102c and traditional land-line communications devices.

The RNC 142a in the RAN 103 may also be connected to the SGSN 148 in the core network 106 via an IuPS interface. The SGSN 148 may be connected to the GGSN 150. The SGSN 148 and the GGSN 150 may provide the WTRUs 102a, 102b, 102c with access to packet-switched networks, such as the Internet 110, to facilitate communications between and the WTRUs 102a, 102b, 102c and IP-enabled devices.

As noted above, the core network 106 may also be connected to the networks 112, which may include other wired or wireless networks that are owned and/or operated by other service providers.

Figure 1D:
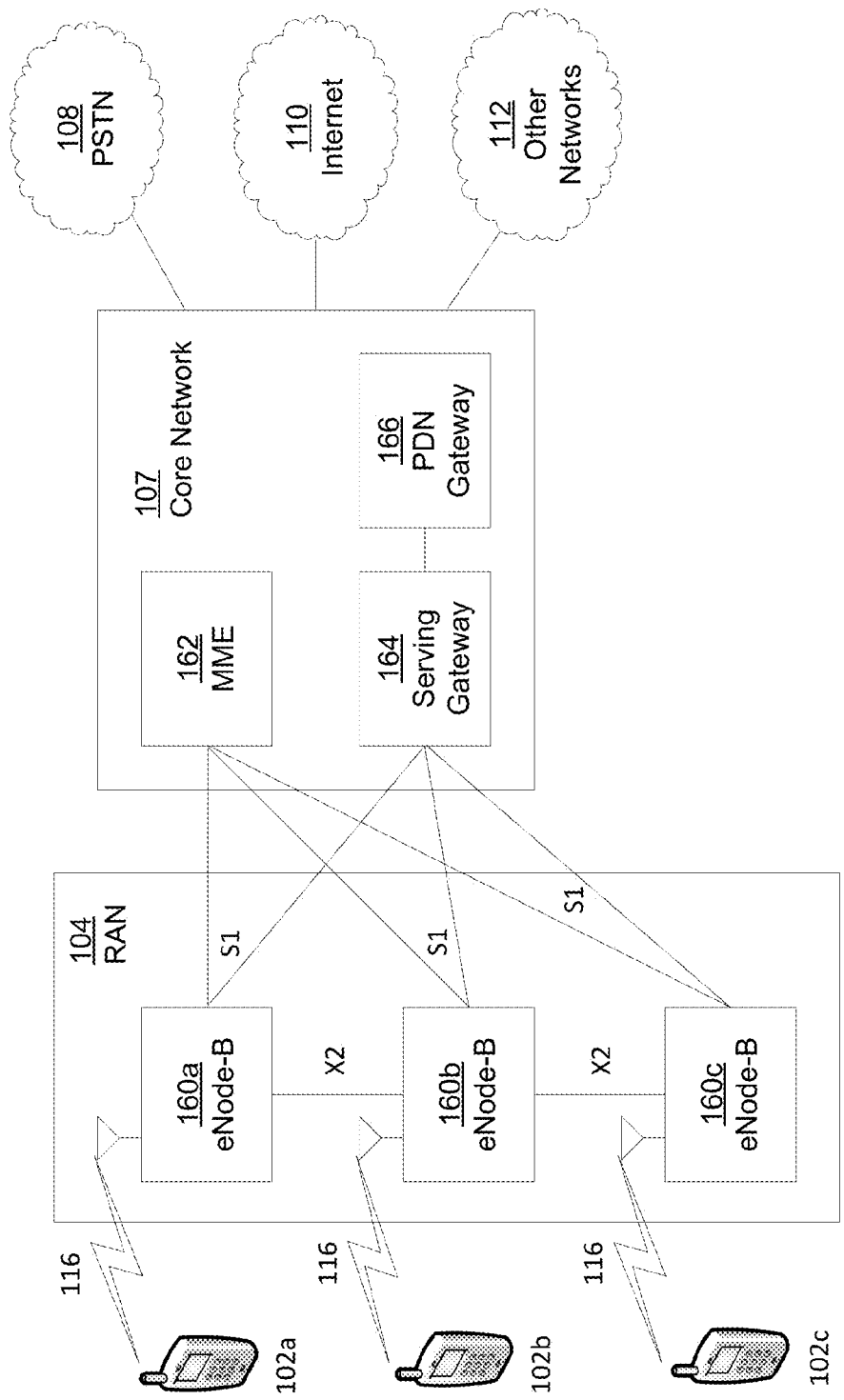
FIG. 1D is a system diagram of an another example radio access network and another example core network that may be used within the communications system illustrated in FIG. 1A.

FIG. 1D is a system diagram of the RAN 104 and the core network 107 according to an embodiment. As noted above, the RAN 104 may employ an E-UTRA radio technology to communicate with the WTRUs 102a, 102b, 102c over the air interface 116. The RAN 104 may also be in communication with the core network 107.

The RAN 104 may include eNode-Bs 160a, 160b, 160c, though it will be appreciated that the RAN 104 may include any number of eNode-Bs while remaining consistent with an embodiment. The eNode-Bs 160a, 160b, 160c may each include one or more transceivers for communicating with the WTRUs 102a, 102b, 102c over the air interface 116. In one embodiment, the eNode-Bs 160a, 160b, 160c may implement MIMO technology. Thus, the eNode-B 160a, for example, may use multiple antennas to transmit wireless signals to, and receive wireless signals from, the WTRU 102*a*.

Each of the eNode-Bs 160*a*, 160*b*, 160*c* may be associated with a particular cell (not shown) and may be configured to handle radio resource management decisions, handover decisions, scheduling of users in the uplink and/or downlink, and the like. As shown in FIG. 1D, the eNode-Bs 160*a*, 160*b*, 160*c* may communicate with one another over an X2 interface.

The core network 107 shown in FIG. 1D may include a mobility management gateway (MME) 162, a serving gateway 164, and a packet data network (PDN) gateway 166. While each of the foregoing elements are depicted as part of the core network 107, it will be appreciated that any one of these elements may be owned and/or operated by an entity other than the core network operator.

The MME 162 may be connected to each of the eNode-Bs 160*a*, 160*b*, 160*c* in the RAN 104 via an S1 interface and may serve as a control node. For example, the MME 162 may be responsible for authenticating users of the WTRUs 102*a*, 102*b*, 102*c*, bearer activation/deactivation, selecting a particular serving gateway during an initial attach of the WTRUs 102*a*, 102*b*, 102*c*, and the like. The MME 162 may also provide a control plane function for switching between the RAN 104 and other RANs (not shown) that employ other radio technologies, such as GSM or WCDMA.

The serving gateway 164 may be connected to each of the eNode-Bs 160*a*, 160*b*, 160*c* in the RAN 104 via the S1 interface. The serving gateway 164 may generally route and forward user data packets to/from the WTRUs 102*a*, 102*b*, 102*c*. The serving gateway 164 may also perform other functions, such as anchoring user planes during inter-eNode B handovers, triggering paging when downlink data is available for the WTRUs 102*a*, 102*b*, 102*c*, managing and storing contexts of the WTRUs 102*a*, 102*b*, 102*c*, and the like.

The serving gateway 164 may also be connected to the PDN gateway 166, which may provide the WTRUs 102*a*, 102*b*, 102*c* with access to packet-switched networks, such as the Internet 110, to facilitate communications between the WTRUs 102*a*, 102*b*, 102*c* and IP-enabled devices.

The core network 107 may facilitate communications with other networks. For example, the core network 107 may provide the WTRUs 102*a*, 102*b*, 102*c* with access to circuit-switched networks, such as the PSTN 108, to facilitate communications between the WTRUs 102*a*, 102*b*, 102*c* and traditional land-line communications devices. For example, the core network 107 may include, or may communicate with, an IP gateway (e.g., an IP multimedia subsystem (IMS) server) that serves as an interface between the core network 107 and the PSTN 108. In addition, the core network 107 may provide the WTRUs 102*a*, 102*b*, 102*c* with access to the networks 112, which may include other wired or wireless networks that are owned and/or operated by other service providers.

Figure 1E:
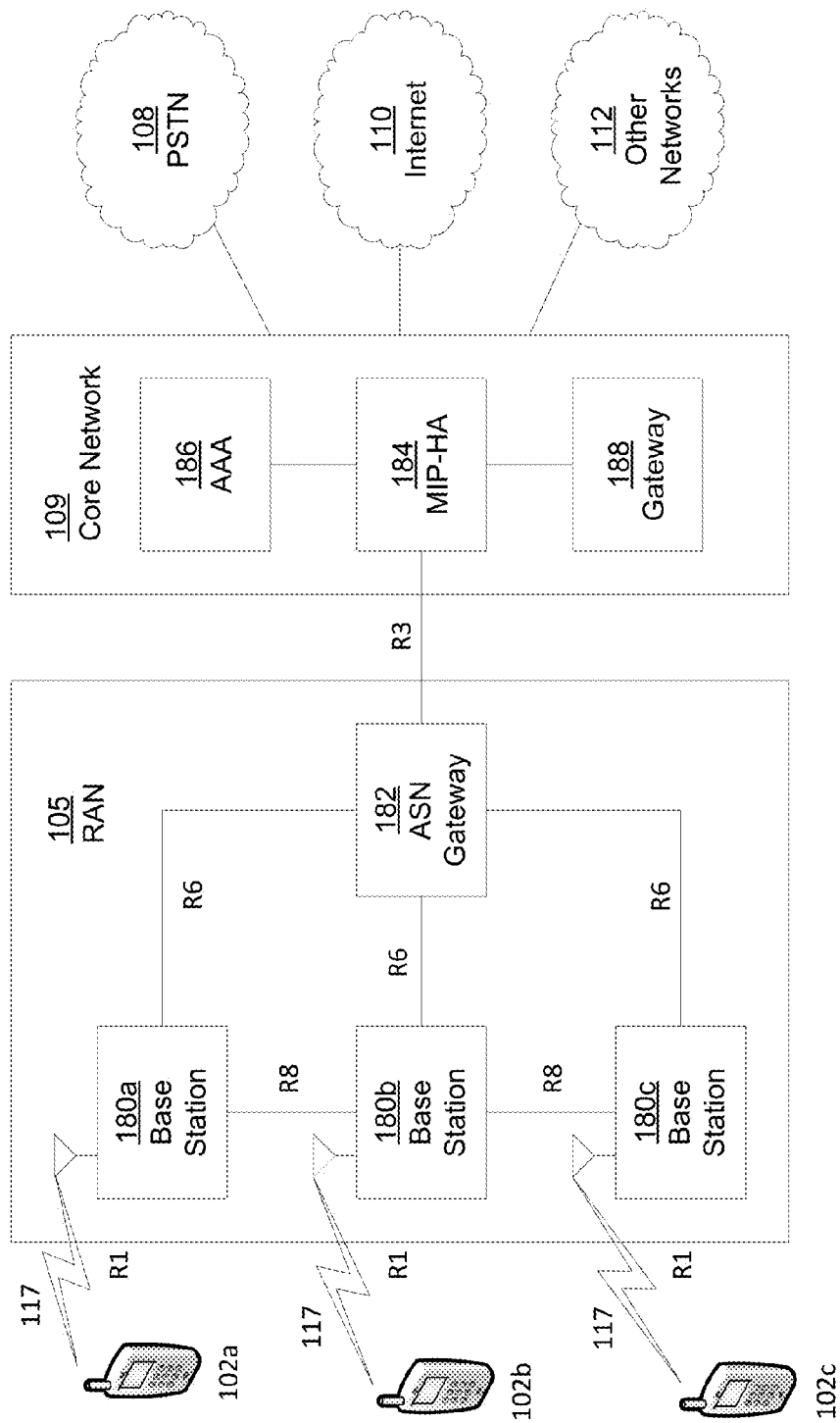
FIG. 1E is a system diagram of an another example radio access network and another example core network that may be used within the communications system illustrated in FIG. 1A.

FIG. 1E is a system diagram of the RAN 105 and the core network 109 according to an embodiment. The RAN 105 may be an access service network (ASN) that employs IEEE 802.16 radio technology to communicate with the WTRUs 102*a*, 102*b*, 102*c* over the air interface 117. As will be further discussed below, the communication links between the different functional entities of the WTRUs 102*a*, 102*b*, 102*c*, the RAN 105, and the core network 109 may be defined as reference points.

As shown in FIG. 1E, the RAN 105 may include base stations 180*a*, 180*b*, 180*c*, and an ASN gateway 182, though it will be appreciated that the RAN 105 may include any number of base stations and ASN gateways while remaining consistent with an embodiment. The base stations 180*a*, 180*b*, 180*c* may each be associated with a particular cell (not shown) in the RAN 105 and may each include one or more transceivers for communicating with the WTRUs 102*a*, 102*b*, 102*c* over the air interface 117. In one embodiment, the base stations 180*a*, 180*b*, 180*c* may implement MIMO technology. Thus, the base station 180*a*, for example, may use multiple antennas to transmit wireless signals to, and receive wireless signals from, the WTRU 102*a*. The base stations 180*a*, 180*b*, 180*c* may also provide mobility management functions, such as handoff triggering, tunnel establishment, radio resource management, traffic classification, quality of service (QoS) policy enforcement, and the like. The ASN gateway 182 may serve as a traffic aggregation point and may be responsible for paging, caching of subscriber profiles, routing to the core network 109, and the like.

The air interface 117 between the WTRUs 102*a*, 102*b*, 102*c* and the RAN 105 may be defined as an R1 reference point that implements the IEEE 802.16 specification. In addition, each of the WTRUs 102*a*, 102*b*, 102*c* may establish a logical interface (not shown) with the core network 109. The logical interface between the WTRUs 102*a*, 102*b*, 102*c* and the core network 109 may be defined as an R2 reference point, which may be used for authentication, authorization, IP host configuration management, and/or mobility management.

The communication link between each of the base stations 180*a*, 180*b*, 180*c* may be defined as an R8 reference point that includes protocols for facilitating WTRU handovers and the transfer of data between base stations. The communication link between the base stations 180*a*, 180*b*, 180*c* and the ASN gateway 182 may be defined as an R6 reference point. The R6 reference point may include protocols for facilitating mobility management based on mobility events associated with each of the WTRUs 102*a*, 102*b*, 102*c*.

As shown in FIG. 1E, the RAN 105 may be connected to the core network 109. The communication link between the RAN 105 and the core network 109 may defined as an R3 reference point that includes protocols for facilitating data transfer and mobility management capabilities, for example. The core network 109 may include a mobile IP home agent (MIP-HA) 184, an authentication, authorization, accounting (AAA) server 186, and a gateway 188. While each of the foregoing elements are depicted as part of the core network 109, it will be appreciated that any one of these elements may be owned and/or operated by an entity other than the core network operator.

The MIP-HA may be responsible for IP address management, and may enable the WTRUs 102*a*, 102*b*, 102*c* to roam between different ASNs and/or different core networks. The MIP-HA 184 may provide the WTRUs 102*a*, 102*b*, 102*c* with access to packet-switched networks, such as the Internet 110, to facilitate communications between the WTRUs 102*a*, 102*b*, 102*c* and IP-enabled devices. The AAA server 186 may be responsible for user authentication and for supporting user services. The gateway 188 may facilitate interworking with other networks. For example, the gateway 188 may provide the WTRUs 102*a*, 102*b*, 102*c* with access to circuit-switched networks, such as the PSTN 108, to facilitate communications between the WTRUs 102*a*, 102*b*, 102*c* and traditional land-line communications devices. In addition, the gateway 188 may provide the WTRUs 102*a*, 102*b*, 102*c* with access to the networks 112, which may include other wired or wireless networks that are owned and/or operated by other service providers.

Although not shown in FIG. 1E, it will be appreciated that the RAN 105 may be connected to other ASNs and the core network 109 may be connected to other core networks. The communication link between the RAN 105 the other ASNs may be defined as an R4 reference point, which may include protocols for coordinating the mobility of the WTRUs 102a, 102b, 102c between the RAN 105 and the other ASNs. The communication link between the core network 109 and the other core networks may be defined as an R5 reference, which may include protocols for facilitating interworking between home core networks and visited core networks.

The operation of a wireless transmit/receive unit (WTRU) in a network in which the scheduling functionality for the downlink and/or the uplink transmissions is distributed in more than one physical location or node may present some challenges. For example, a first scheduler associated with a first transmission layer may be included at a first MAC instance associated with and/or included in a first serving site (e.g., a first RAN node such as an eNB and/or macro eNB (MeNB)). A second scheduler associated with a second transmission layer may be included at a second MAC instance associated with and/or included in a second serving site (e.g., a second RAN node such as an eNB and/or small cell eNB (SCeNB)). One or more signal characteristics of a transmission to and/or from a WTRU may depend on scheduling decisions that are made independently in each node. Additionally, the scheduling nodes may communicate via a relatively high latency interface, making coordination of scheduling decisions difficult to implement in practice.

For example, the WTRU may receive grants (e.g., dynamic grants via a Physical Downlink Control Channel (PDCCH), semi-persistent scheduling (SPS) grants, other uplink grants, etc.) from each of the two scheduling sites. The grants may direct the WTRU to transmit over on an uplink (UL) channel (e.g., Physical Uplink Control Channel (PUCCH), Physical Uplink Shared Channel (PUSCH)), and two or more grants may allocate resources to the WTRU that overlap in the frequency and/or time domain(s). In such a situation, the WTRU may be unable to comply with the grant transmitted from one or more of the sites.

As another example, the WTRU may receive UL grants from two (or more) sites, and each received grant may be associated with a different UL channel and/or different UL frequency bands. However, if the WTRU transmits in accordance with each of the signaled grants, the combination may result in the WTRU exceeding its maximum transmission power. In this situation, the WTRU may be unable to transmit each signal at the power level requested the receptive schedulers, increasingly the likelihood of a failed transmission.

In an example, the WTRU may be configured to transmit uplink control information (UCI) in a given subframe based on a Physical Downlink Shared Channel (PDSCH) transmission received from a first serving site. Additionally, in the same subframe the WTRU may be configured to transmit a PUSCH transmission based on a received UL grant from a second serving site. The UCI transmission to the first site (e.g., sent via the PUCCH, PUSCH, etc.) may conflict with the PUSCH transmission to the second site. Such a situation may cause numerous complications. For example, the WTRU may attempt to include the UCI (e.g., which was request by and/or pertains to transmissions associated with the first serving site) in the PUSCH transmission sent to the second serving site; however, the second serving site may be unaware that the WTRU is including the UCI in the PUSCH transmission, so the second serving site may fail to properly decode one or more of the UCI and/or the entire PUSCH transmission.

In order to avoid and/or address such scheduling difficulties, the WTRU may attempt to decouple transmissions and/or receptions associated with scheduling decisions made in different nodes of a network. For example, the characteristics of a signal that is to be transmitted and/or received from a given serving site in the network may be determined based on signaling originating from a single serving node of the network, for example rather than signaling originating from multiple nodes of the network.

Although the examples described herein may be described with respect to operation utilizing a first data path (e.g., may also be referred to as a first layer, a primary data path, a primary layer, etc.) that is associated with a MeNB and a second data path (e.g., may also be referred to as a second layer, a secondary data path, a secondary layer, etc.), the methods and systems described herein may be equally applicable to other network transmission/reception points that are independently scheduled (e.g., two or more independently scheduled eNBs, two or more independently scheduled NBs, two or more independently scheduled RAN access nodes, etc.). The systems and methods described herein may be applicable to one or more multi-scheduler frameworks wherein different network nodes serve as transmission/reception points for different data paths A data path may be defined based on the identity of one or more service access points (SAPs) that are used to transmit data associated with the data path, based on the identity of one or more network interfaces or nodes that are used to transmit the data associated with the data path, based on one or more radio interfaces (e.g., X2, X2bis, X2', Uu, etc.) that are used to transmit data associated with the data path, and/or the like. Further, a data path may be defined based on the communication protocol stack (e.g., including one or more of a packet data convergence protocol (PDCP) layer, a radio link control (RLC) layer, a medium access control (MAC) layer, a physical (PHY) layer, etc.) that may be used to define a processing sequence for transferring information associated with the data path. The information or data transmitted over a data path may include one or more of control plane data (e.g., non-access stratum (NAS) signaling, RRC signaling, etc.) and/or user plane data (e.g., IP packets, etc.). Data paths may be independently scheduled from other data paths.

For example, in LTE Release 11, data transfer may be performed over a single data path between the WTRU and the network. For the control plane, there may be a direct mapping between an SRB and a Logical Channel (LCH) over a single Uu interface (e.g., an interface between the WTRU and an eNB). For the user plane, there may be a direct mapping between an EPS bearer, a Data Radio Bearer (DRB), and a Logical Channel (LCH) over that same Uu interface.

However, in the presence of multiple independent schedulers, the WTRU may be configured to utilize more than one data path, for example where each data path may be established between the WTRU and network nodes using different Uu interfaces. A data path may also be referred to as a layer. For example, the WTRU may be configured to transmit and/or receive data over multiple layers, where each layer is associated with a different data path. Each layer may be scheduled independently of other layers. Each layer may be associated with a different air interface for the WTRU.

Each layer may be associated with a serving site that serves as a transmission and/or reception point for the data path within the network.

In order to support transmissions over multiple layers, a plurality of MAC instances may be established at the WTRU. For example, the WTRU may be configured with multiple MAC instances that are each associated with a corresponding set of physical layer parameters and/or with layer-specific radio bearers. As an example, the WTRU may be configured with a set of primary layer information (e.g., which may be associated with a macro layer/MeNB/macro serving site) and one or more sets of secondary layer information (e.g., which may be associated with a small cell layer/SCeNB/small cell serving site). A WTRU may be configured with one or more serving cells for each layer. For example, the WTRU may perform carrier aggregation in each of the layers such that transmissions and/or reception may occur from multiple cells within a given layer.

For example, the WTRU may be configured to operate with one or more serving sites (e.g., also referred to as serving eNBs) in the downlink and/or the uplink. Each serving site may be associated with one or more serving cells. For example, a WTRU may operate using a single serving cell (e.g., component carrier) at first serving site (e.g., a MeNB) and may operate using a plurality of serving cells (e.g., a plurality of component carriers) at a second serving site (e.g., a SCeNB). Thus, a serving site may be associated with a plurality of serving cells. Each serving cell of a given serving site may be configured for operation at a corresponding component carrier (CC). A serving site may support one or multiple CCs. Each CC within a serving site may operate using a different frequency range than other CCs of the serving site, so that each of the serving cells associated with a given serving site may be transmitted using a different CC. However, serving cells from different serving sites may be transmitted using the same CC. Therefore, serving cells may be associated with the same CC but with different serving sites. A WTRU may be configured with a maximum number of serving sites over which the WTRU may operate (e.g., 1, 2, 3, 4, etc.). An indication of the maximum number of serving sites that the WTRU may be allowed to utilize may be signaled by the WTRU to the network as part of WTRU capability information and/or may be determined by the network based on the operating class of a WTRU.

A serving site may be associated with one or more Transport Channels. For example, in the uplink the WTRU may be configured to deliver data to the physical layer using a transport channel (e.g., UL-SCH) that is associated with a serving cell associated with a specific serving site. In an example, each transport channel may be specific to a given serving site/layer, although the transport channel may be associated with multiple serving cells and/or component carriers within that serving site. For example, a UL-SCH may be associated with a specific serving site (e.g., a serving site associated with the data path including the MeNB) and one or more component carriers associated with that serving site (e.g., multiple component carriers that are associated with the MeNB). A transport block to be delivered to that serving site may be served with data associated with the transport channel mapped to that serving site. In the downlink the WTRU may be configured to receive data to at the physical layer and deliver the data to a transport channel (e.g., DL-SCH) that is associated with a serving cell associated with a specific serving site. For example, a DL-SCH may be associated with a specific serving site (e.g., a serving site associated with the data path including the SCeNB) and one or more component carriers associated with that serving site (e.g., multiple component carriers that are associated with the SCeNB). A transport block received at the physical layer may be mapped to a transport channel associated with that serving site from which the transport block was received. A given serving site may be associated with zero, one, or more than one UL-SCHs and zero, one, or more than one DL-SCHs.

Each serving site may be associated with a corresponding MAC instance at the WTRU. The WTRU may be configured with multiple MAC instances. Each MAC instance may be associated with a specific serving site. The terms serving site, layer, data path, MAC instance, etc. may be used interchangeably herein. Each MAC instance may be associated with one or more configured serving cells and support one or more CCs. Each UL-SCH and/or DL-SCH may be associated with a given MAC instance (e.g., a one-to-one instance between a transport channel and a MAC instance).

A MAC instance may be configured with a Primary Cell (PCell). For each serving site (and/or MAC instance), one of its associated serving cells may support at least a subset of the functionality supported by a primary serving cell (PcCell) in legacy (e.g., single-site) systems. For example, one or more of the serving cells of a given MAC instance may support PUCCH transmissions that may be utilized for sending scheduling requests, HARQ feedback, CSI feedback, and/or the like related to the UL-SCH and/or the DL-SCH mapped to the corresponding serving site. A serving cell that is configured to receive uplink control information (UCI) associated with the transport channels of the serving site may be referred to as a "site PCell" and/or a "MAC primary cell." Each MAC instance may be configured with one PCell and zero or more SCells. Further, the PCell of a primary MAC instance (e.g., the MAC instance associated with a MeNB) may have additional functionality specific to that MAC instance. A serving site may be associated with a data path. A serving site may correspond to a single data path.

In an example, physical channels of a given MAC instance may be associated with a specific serving site. For example, a given uplink and/or downlink physical channel may be used for transmission between the WTRU and a single serving site. Similarly, a given reference signal transmitted in the uplink and/or the downlink may be associated with the channel between the WTRU and a single serving site. The set of physical channels and/or set of reference signals used for communication with a certain serving site may be mapped to one MAC instance at the WTRU.

When the WTRU is configured to operate with more than one serving site, multiple MAC instances may be utilized. For example, the WTRU may utilize instantiate a MAC instance for each serving site it is connected to. Each MAC instance may utilize a corresponding set of physical channels in order to communicate with the serving site. For example, a first MAC in the WTRU instance may be may be configured to connect to and/or communicate with a first serving site (e.g., a MeNB), and a second MAC instance in the WTRU may be may be configured to connect to and/or communicate with a second serving site (e.g., a SCeNB). The first MAC instance may be associated with a first set of physical channels (e.g., a PDCCH, a PDSCH, a PUCCH, a PUSCH, etc.) that may be used for transmissions between the WTRU and the first serving site, and the second MAC instance may be associated with a second set of physical channels (e.g., a PDCCH, a PDSCH, a PUCCH, a PUSCH, etc.) that may be used for transmissions between the WTRU and the second serving site. The first MAC instance may be configured to map transport channels to its corresponding set of physical channels.

If carrier aggregation is configured, a serving site and/or its corresponding MAC instance may be configured for use with more than one serving cell. For example, one of the serving cells associated with a given serving site may be identified as a primary serving cell (e.g., a PCell). Zero or more serving cells associated with a given serving site may be identified as a secondary serving cell (e.g., SCell). The PCell and zero or more SCells associated with a given layer and/or serving site may be scheduled by a single scheduler. The PCell and zero or more SCells associated with a given layer and/or serving site may be scheduled by more than one scheduler, for example if the multiple schedulers may coordinate that scheduling so as to avoid scheduling conflicts (e.g., using a relatively low latency interface).

One or more physical channels and/or signals (e.g., reference signals) may be associated with each MAC instance. For example, a PUCCH may be associated with a given MAC instance. The PUCCH may be configured to transport uplink control information (e.g., HARQ feedback, channel state information (CSI) such as channel quality indicator (CQI), precoding matrix indicator (PMI), rank indicator (RI), Scheduling Request (SR), etc.) associated with the corresponding MAC instance to the applicable serving site. If multiple MAC instances are configured, multiple PUCCHs may be configured (e.g., one PUCCH for each MAC instance). If carrier aggregation is performed for a given serving site, the PUCCH may be transmitted on the primary serving cell of the MAC instance (e.g., the PCell for the MAC instance/serving site), but not on the secondary serving cell(s) of the MAC instance (e.g., the SCell(s) for the MAC instance/serving site).

A physical broadcast channel (PBCH) may be associated with a given MAC instance. For example, the PBCH for a given MAC instance/serving site may transport system information associated with the corresponding MAC instance. If carrier aggregation is performed for a given serving site, the PBCH may be transmitted on the primary serving cell of the MAC instance (e.g., the PCell for the MAC instance/serving site), but not on the secondary serving cell(s) of the MAC instance (e.g., the SCell(s) for the MAC instance/serving site).

A PUSCH may be associated with each serving cell of a given MAC instance. For example, if a given MAC instance is associated with a single PCell and two SCell, the MAC instance may be associated with three PUSCHs (e.g., a first PUSCH sent to the PCell, a second PUSCH sent to the first SCell, and a third PUSCH sent to the second SCell). A PUSCH may be configured to transport information from a given transport channel (e.g., one or more transport blocks) associated with the MAC instance. The PUSCH may be used to transmit user data and/or UCI associated with its corresponding MAC instance.

A PDCCH and/or enhanced PDCCH (E-PDCCH) may be associated with each serving cell of a given MAC instance. For example, for a given serving cell of a MAC instance, the WTRU may attempt to receive the PDCCH and/or E-PDCCH in at least one search space (e.g., a common search space, a WTRU-specific, etc.). If carrier aggregation is used and the carrier indication field (CIF) is configured for a given MAC instance, then the WTRU may attempt to receive the PDCCH and/or E-PDCCH in PCell of the MAC instance, but not on the zero or more SCells associated with the MAC instance. More than one E-PDCCH set may be configured for a given serving cell associated with a MAC instance. A PDCCH and/or E-PDCCH may be used to transport control information to the corresponding MAC instance in the WTRU. For example, one or more of PDSCH assignments, PUSCH grants, physical random access channel (PRACH) orders, transmit power control (TPC) commands, CSI requests, aperiodic sounding reference signal (SRS) request, and/or the like may be transmitted on the PDCCH and/or E-PDCCH. The downlink control information (DCI) received on a given PDCCH (and/or E-PDCCH) may be applicable to the MAC instance associated with that PDCCH (and/or E-PDCCH).

A PRACH may be associated a serving cell of a corresponding given MAC instance. For example, each serving cell of associated with given MAC instance may be include a PRACH. The PRACH may be used for supporting contention-based and/or non-contention-based random access (RACH) procedures for the associated MAC instance.

In an example, rather than physical channels being associated with a single serving site, a set of one or more physical channel may be associated with more than one serving site. For example, a given uplink transmission by the WTRU sent over an uplink physical channel may be received by multiple serving sites (e.g., eNBs), for example using a MAC instance that is common to multiple serving sites. Thus, an uplink physical channel (e.g., and/or reference signal) may be used for transmission of data and/or control information associated with more than one serving site, and a downlink physical channel (e.g., and/or reference signal) may be used for reception of data and/or control information associated with more than one serving site. The set of physical channels and/or reference signals used for communication with multiple serving sites may be mapped to a single MAC instance that is associated with each of the serving sites. A MAC instance that is associated with transmission to/from multiple serving sites may be referred to as a common MAC instance.

In the uplink, one or more characteristics of a transmission for a physical channel associated with a common MAC instance may be determined semi-statically. For example, the WTRU may determine one or more parameters to apply for an uplink transmission (e.g., PUSCH, PUCCH, etc.) without relying on and/or receiving dynamic control signaling from a serving site. For example, in some instances one or more of a resource block assignment, a modulation and coding scheme (MCS), a demodulation reference signal (DM-RS) characteristic, transmission of aperiodic CSI, a HARQ characteristic, an SRS transmission and/or the like may be pre-determined or configured semi-statically, rather dynamically indicated or scheduled. Parameters such as the transmission power and/or timing advance used for semi-statically configured transmissions (e.g., transmission that are not dynamically scheduled) may be determined based on one or more measurements taken with respect to one or more of the serving sites. For example, measurements may be performed in order to determine one or more of a timing reference, a pathloss reference, etc. for one or more of the serving sites, and timing adjustment messages/commands and/or power adjustment messages/commands may be received from one or more of the serving sites.

One or more physical channels and/or reference signals may be associated with a common MAC instance. For example, a single PUCCH may be utilized for transporting uplink control information (e.g., CSI, Scheduling Request, etc.) that may be applicable to various serving sites. The PUCCH may be associated with a common MAC instance, and the common MAC instance may be associated with a plurality of serving sites.

In an example, each serving cell associated with a common MAC instance (e.g., one or more serving cells for each of multiple serving sites) may have an associated PUSCH. The PUSCHs may be associated with the common MAC instance and may be used to for transmitting one or more transport block(s) including information to be processed at one or more of the serving sites. For example, the WTRU may include an indication of which serving site (e.g., and/or which cell of a serving site) is the intended destination of the data included in the transport block. The indication may be included in-band within a transport block and/or may be included as additional control information in the PUSCH transmission. For example, the indication of which serving site the PUSCH is associated with may include a serving site indicator and/or a logical channel identifier. A logical channel identifier may be used if the logical channel identifiers are unique across the different serving sites.

In an example, a single transport block may include data to be delivered to more than one serving site. For example, a transport block may be transmitted by the WTRU and received at a given serving site. A serving site (e.g., eNB) that successfully decodes the transport block may forward the transport block (and/or one or more portions of the transport block relevant to another serving site) to another serving site that is the destination of some or all of the data included in the transport block. Such a scheme may be used to achieve macrodiversity. Additionally, one or more serving cells associated with a common MAC instance may include a PRACH, for example in order to support contention-based and/or non-contention-based random access procedures.

When multiple instances of a given type of physical channel exist (e.g., an instance of a given physical channel for each MAC instance), one or more transmission properties associated with a given instance of a type of physical channel may be configured individually. For example, one or more transmission properties associated with a given instance of a type of physical channel may be configured separately for each MAC instance. As an example, a first transmission power may be associated with a PUCCH associated with a first MAC instance and a second transmission power level may be associated with a PUCCH associated with a second MAC instance. In an example, transmission power and/or the identity of a reference signal(s) used for a path loss reference determination may be configured, maintained, and/or updated independently for each MAC instance. Transmission timing and/or the identity of a reference signal(s) used for deriving transmission timing may be configured, maintained, and/or updated independently for each MAC instance.

If timing and/or power adjustments are performed independently for each MAC instance, the uncoordinated nature of the adjustments may lead situations where concurrent operation of two physical channels associated with different MAC instances may become infeasible due to large disparities between transmission properties associated with each of the MAC instances. For example, transmission timing differences between the different MAC instances that exceed the duration of a cyclic prefix may infeasible in some modes of operation. When the difference between transmission timing associated with two or more MAC instances (and/or transmission power associated with two or more MAC instances) exceeds a predetermined and/or configured threshold, the WTRU may take one or more corrective actions in using one or more of the MAC instances. For example, upon determining that the timing and/or power differences between MAC instances exceed a threshold, the WTRU may determine to declare radio link failure (RLF) for one or more of the MAC instances. For example, the WTRU may stop transmissions for the physical channel(s) associated with one or more of the MAC instances. The WTRU may trigger transmission of an RRC message, such as a measurement report, based on determining the difference between transmission timing associated with two or more MAC instances (and/or transmission power associated with two or more MAC instances) exceeds the threshold. In an example, the WTRU may perform one or more actions that are performed upon receiving a configuration (and/or reconfiguration) that it is unable to comply with upon determining that the timing and/or power differences between MAC instances exceeds a threshold. In an example, the WTRU may prioritize a transmission for one of the MAC instances (e.g., according to prioritization rules as described herein) upon determining that the timing and/or power differences between MAC instances exceed a threshold. The WTRU may drop or truncate in time (e.g., skip one or more symbols) a transmission for a MAC instance upon determining that the timing and/or power differences between MAC instances exceed a threshold.

When a timing and/or power difference between MAC instances exceeds the threshold, the WTRU may use various criteria for determining which of the MAC instances should be used to take corrective action (e.g., declare RLF, stop transmissions, dropping transmissions or symbols, etc.). For example, the MAC instance to use for taking corrective action may be selected based on whether the MAC instance is associated with transmission to a macro eNB (MeNB) or a small cell eNB (SCeNB). As an example, the WTRU may determine to attempt to take corrective action using the MAC instance associated with the small cell eNB. In an example, the MAC instance to use for taking corrective action may be selected based on the relative timing between the MAC instances. For example, the MAC instance associated with the earliest timing (e.g., or in another example the latest timing) may be selected for performing the corrective action.

In an example, a WTRU may be provided with independent power control adjustments for one or more (and/or each) of PUCCH, PUSCH and/or SRS that are associated with a given MAC instance. Each MAC instance may utilize power control commands that are independent of power control commands for other MAC instances at the WTRU. Each received power control command may be associated with a given channel of a given MAC instance (e.g., and/or a specific instance of the channel if the MAC instance is associated with multiple channels of a given channel type). For example, if a given MAC instance is associated with a PUCCH, one or more PUSCHs (e.g., where a PUSCH is associated with a corresponding component carrier of a serving site for the MAC instance), and/or one or more SRS transmissions (e.g., where an SRS transmission is associated with a corresponding component carrier of a serving site for the MAC instance), the WTRU may receive a power control commands that are associated with one of the channel types of a specific MAC instance. For example, the WTRU may receive a first power control command for the PUCCH associated with the MAC instance, a second power control command associated with one or more of the PUSCHs of the MAC instance (e.g., possibly a separate power control command for each PUSCH), and/or a third power control command associated with one or more of the SRS transmissions for the MAC instance (e.g., possibly a separate power control command for each SRS transmission). In an example, the identity of the MAC instance that a received power control adjustment is applicable to may be determined based on the identity of the MAC instance used for to receive the DCI that included the corresponding TPC command field.

In an example, power control for a given channel type may be common across multiple MAC instances. For example, a single power control command may be used to adjust the power of PUCCH, PUSCH and/or SRS transmissions associated with different MAC instances. If the WTRU receives a power control adjustment for a given channel, the power control adjustment may be applied to any and/or all occurrences/instances of the given channel for one or more (and/or all) MAC instances of the WTRU. For example, a WTRU may receive a power control command for the PUCCH (e.g., via a first MAC instance), and the WTRU may adjust the transmit power for one or more (and/or all) PUCCHs associated with the MAC instance over which the command was received and/or one or more (and/or all) MAC other MAC instances maintained by the WTRU. A power control adjustment that may be applicable to channels associated with different MAC instances may be referred to as a global power control command/adjustment. Global power control commands may be used in combination with power control commands that are specific to given MAC instance. For example, a field in the DCI used to send the power control command (e.g., via a PDCCH of one or more MAC instances) may be used to indicate to the WTRU whether the power control command is a global power control command or a power control command that is specific to a given MAC instance (e.g., the MAC instance over which the power control command was received).

The WTRU may be configured to receive power control adjustments/commands using DCI Format 3. In an example, the WTRU may be configured with multiple TPC RNTIs in order to determine which channel a given power control command is applicable to. For example, the WTRU may be configured with one or more of a TPC-PUSCH-RNTI that may be used for encoding/decoding power control commands for the PUSCH, a TPC-PUCCH-RNTI that may be used for encoding/decoding power control commands for the PUCCH, and/or a TPC-SRS-RNTI that may be used for encoding/decoding power control commands for SRS transmissions. In an example, the WTRU may be configured with multiple TPC RNTIs for each MAC instance. For example, the WTRU may have a first set of one of more TPC RNTIs (e.g., one or more of a TPC-PUSCH-RNTI, a TPC-PUCCH-RNTI, a TPC-SRS-RNTI, etc.) for receiving power control adjustments for a first MAC instance, a second set of one of more TPC RNTIs (e.g., one or more of a TPC-PUSCH-RNTI, a TPC-PUCCH-RNTI, a TPC-SRS-RNTI, etc.) for receiving power control adjustments for a second MAC instance, and so forth. In this manner, a TPC command applicable to any of the channels for any MAC instance may be transmitted by the network using any MAC instance. For example, a power control command for the PUCCH of a first MAC instance may be sent to the WTRU using a second MAC instance by encoding the DCI including the power control command with the TPC-PUCCH-RNTI associated with the first MAC instance. In another example, the MAC instance for which a given power control command is applicable may be used to transmit the DCI including the power control command and the WTRU may be configured to associate a given power control command with the MAC instance over which the power control command was received.

The timing of the subframe for which a given power control command is applicable may be explicitly signaled and/or implicitly determined by the WTRU. In an example, a power control command may be applicable to a transmission to occur in a subframe that is a predetermined amount of time ahead of the subframe in which the power control command was received. For example, if a power control adjustment was received in subframe(n), the power control command may be valid a UL transmission (e.g., on a channel for which the power control command was received) for any MAC instance in subframe(n+k) and beyond, where k may be a preconfigured number of subframes. For example, DCI included in a PDCCH transmission associated with a first MAC instance may be received in subframe(n). The DCI may indicate a power control adjustment for SRS. In subframe(n+k), SRS may be scheduled for one or more MAC instances, for example a second MAC instance. The WTRU may determine to apply the power control command received in subframe(n) of the first MAC instance to the transmission of SRS in subframe(n+k) via the second MAC instance. Thus, the power control adjustment received in subframe(n) may be valid even though the MAC instance used for transmission of the DCI that included the power control command may be different than that used for transmitting in the uplink. Such a scheme may be used when SRS may be used by multiple reception points in the network (e.g., multiple serving sites).

In an example, in order to facilitate the reception of power control commands that are applicable to a single MAC instance (e.g., and/or a single channel type of a single MAC instance) via any MAC instance maintained by the WTRU, the power control adjustment may include an index that is used to explicitly indicate which MAC instance the power control command is applicable to. For example, the indication (e.g., index) of which MAC instance a power control adjustment is applicable to may be received with the power control command in the DCI via any MAC instance. The indication may also specify what channel the power control command is applicable to. In this manner, any MAC instance may be used to adjust the power of a transmission to be performed using another MAC instance.

Although multiple MAC instances may be associated with independent schedulers, multiple MAC instances may use the same physical layer transceiver and/or resources. For example, OFDMA transmission schemes may be used by multiple serving sites for downlink transmissions to the WTRU, and/or SC-FDMA transmission schemes may be used by multiple serving sites for receiving uplink transmissions from the WTRU. Transmission and/or reception of physical channels associated with different serving sites (e.g., and/or or sets of serving sites) may conflict with each other if the physical channels associated with the different serving sites are used in an unrestricted manner. For example, a WTRU may receive a first scheduling grant for transmitting a PUSCH transmission to a first serving site (e.g., using a first MAC instance) and a second scheduling grant for transmitting a PUSCH transmission to a second serving site (e.g., using a second MAC instance). Each of the received grants may indicate that the WTRU is to transmit at the same time using the same frequency resources. Simultaneous transmission of two PUSCH transmission in the same subframe and using the same resource block allocation may be infeasible for a variety of reasons.

Various examples disclosed herein may enable concurrent transmission and/or reception of physical channels associated with different serving sites. It should be understood that different examples may be used in various combinations, for example based on one or more of the different types of subframe timing between the serving sites, the different types of subframes used at serving sites, the time/frequency resources associated with transmissions to and/or from the different serving sites, the relative level of coordination between the serving sites, the type of physical channel(s) being transmitted to and/or from the different serving sites, and/or the like.

For example, in the uplink a WTRU may be configured to transmit multiple UL transmissions to multiple serving sites. For example, the WTRU may provide concurrent physical channel access to multiple MAC instances that are associated with transmissions to different serving sites. The WTRU may be configured using higher layer signaling (e.g., RRC signaling) regarding whether UL transmission to multiple serving sites are allowed. For example, RRC may be used to configure the ability to transmit data and/or uplink control signaling to multiple sites in the same or different subframes. He WTRU may be configured with a respective set of UL transmission parameters for transmission to each of the serving sites. For example, each serving site/MAC instance may be associated with one or more of power control parameter(s), timing advance parameter(s), cell ID(s) (and/or virtual cell ID(s)), etc. that are specific to a given serving site and/or MAC instance.

As an example of UL concurrent UL transmission to independently scheduled serving sites, consider a WTRU that is configured with at least two radio bearers. A first radio bearer may be associated with a first set of QoS parameter(s) and may be associated with transmissions to a first serving site. A second radio bearer may be associated with a second set of QoS parameter(s) and may be associated with transmissions to a second serving site. For example, the WTRU may transmit UL data/traffic to the first serving site using the first radio bearer, while transmitting UCI associated with DL transmission received from the second serving site (e.g., CSI reports, HARQ feedback, etc.) to the second serving site using the second radio bearer. In another example, the WTRU may be configured to transmit multiple sets of UCI, for example a first set of UCI to the first serving site and a second set of UCI to the second serving site. In either case, if UL transmission is to be supported for concurrent transmission to multiple serving sites, the WTRU may be configured to perform contention resolution for the physical layer resources between the MAC instances associated with the transmission to the different serving site. As an example, the WTRU may be configured to use one or more of time segregation of physical layer resources, frequency segregation of physical layer resources, and/or code segregation of physical layer resources in order to support concurrent transmission to multiple serving sites.

When used herein the term concurrent transmission to multiple serving sites may refer to one or more of simultaneous transmission to multiple serving sites at the same time (e.g., transmitting to multiple serving sites in the same subframe using the same and/or different frequency resources), transmission to multiple serving sites using the same frequency resources within a specified amount of time (e.g., transmitting to multiple transmissions to different serving sites using the same frequency within a relatively close amount of time and/or during the same RRC Connected session), and/or the like. Concurrent transmission to multiple serving sites may refer to the scenario wherein any one of multiple serving sites may have the ability to schedule the WTRU for transmission on the same time/frequency resources as are used by a different serving site. Thus, concurrent transmission may refer to the chance that a WTRU may receive conflicting scheduling requests from multiple serving sites.

In an example, UCI for multiple serving sites may be transmitted to one of the serving sites, for example via the PUCCH associated with one of the serving sites. For example, first control information applicable to a first serving site may be included a PUCCH transmission to the first serving site, and second control information applicable to a second serving site may be included in the PUCCH transmission to the first serving site. The control information may be HARQ ACK/NACK information, for example if the WTRU has determined that HARQ feedback is to be provided to multiple serving sites in the same subframe. The PUCCH parameters used for a transmission that includes UCI applicable to multiple serving sites may be a preconfigured set of parameters configured specifically for transmitting control information for multiple serving sites to a single site. For example, the parameters used for PUCCH transmissions containing control information applicable to multiple serving sites may depend on the subframe in which the PUCCH is transmitted. In an example, one of the serving sites may be designated as the serving site to which UCI is transmitted. The PUCCH parameters may be configured by the serving site that receives the UCI for the multiple sites. A set of reception points (RPs) may be considered to be from a same serving site. Multiple sets of RPs may be considered to be from different serving sites (e.g., with one set of RPs per serving site).

One example method for segregating physical channel resources for transmissions to multiple serving sites may be for the physical layer entity to serve a single MAC instance (e.g., where each MAC instance is associated with a different serving site) at any given instance in time. In such a scenario, a physical channel associated with a single MAC instance may be allowed to be used in a given subframe. Which MAC instance may utilize the physical channel(s) in a given subframe may be determined according to semi-static configurations and/or dynamically based on explicit signaling and/or implicit criteria. For example, priority information for the MAC instances may be utilized to resolve conflicts between a plurality of MAC instances.

As an example, in order to support concurrent transmission to multiple serving sites, the WTRU may be configured to implement a time segregation scheme (e.g., time division multiplexing (TDM)) for the UL transmissions to the multiple serving sites. For example, a given subframe may be dedicated for transmissions to a specific serving site. The WTRU may be configured with a subset of subframes for transmitting to each of the different serving sites. The WTRU may be configured with a set of UL transmission parameters (e.g., power control parameters, set of virtual cell IDs, dedicated PUCCH resources, etc.) for each site. The WTRU may determine which set of UL transmission parameters to apply based on the subframe subset that includes the subframe in which the UL transmission is to occur. For example, even numbered subframes may be include in the subframe subset of a first serving site. Odd numbered subframes may be included in the subframe subset of a second serving site. For UL transmissions occurring in even numbered subframes, the WTRU may determine to apply to UL transmission parameters associated with the first serving site. For UL transmissions occurring in odd numbered subframes, the WTRU may determine to apply to UL transmission parameters associated with the second serving site.

In an example, each physical channel and/or transmission type may be transmitted to a different serving site. For example, PUCCH may be transmitted to a first serving site and PUSCH may be transmitted to a second serving site. To allocate physical resources for transmission of multiple UL channels that are associated with different serving sites, each channel (e.g., channel type) may be assigned a subset of subframes that may be used for transmission of the channel to its corresponding serving site. In such a scenario, the WTRU may determine which UL transmission parameters to apply based on the type of channel and/or type of transmission being sent in the subframe. In an example, different types of transmissions may be allocated subframe subsets. For example, CQI transmissions may be allocated a first subset of subframes and SRS transmissions may be allocated a second subset of subframes.

Multiple sets of subframe subsets may be orthogonal to each other (e.g., non-overlapping in the time domain) and/or may be configured to overlap. For example, if two or more subframe subsets associated with different serving sites overlap, multiple UL transmissions to different serving sites may occur in the same subframe(s). For example, a WTRU may be configured to transmit a PUCCH transmission to a first serving site and a PUSCH transmission to a second serving site in the same subframe. As an example, the WTRU may receive an UL grant for transmission to a first serving site in subframe(n), and the WTRU may also be configured to transmit HARQ feedback via the PUCCH to a second serving site in the same subframe(n). As another example, the WTRU may be configured to transmit HARQ feedback to multiple serving sites in the same subframe. In another example, the WTRU may utilize overlapping subframe subsets for transmitting power headroom reports (PHRs) to multiple serving sites in the same subframe.

In an example, in order to segregate the subframe subsets associated with different serving sites, one or more HARQ feedback timing rules may be modified. For example, it may be desirable to avoid transmitting a PUSCH transmission to a first serving site and HARQ feedback to a second serving site in the same subframe. However, the WTRU may have recently received a PDSCH transmission from the second serving site (e.g., four subframes ago), and legacy HARQ timing rules may have dictated that the WTRU is to transmit the HARQ feedback in the same subframe as the WTRU was granted UL transmission resources for a PUSCH transmission to the first serving site. To avoid this scenario, the WTRU may indicate to one or more of the serving sites that the WTRU is utilizing multi-serving site operation. The indication of multi-serving site operation may include an indication of the subframe subsets that are applicable to the different serving sites (e.g., and/or physical channels). Upon receiving the indication that the WTRU is utilizing multi-serving site operation (e.g., and/or the indication of the different subframe subsets), a serving site may indicate a different subframe offset to be used for HARQ timing (e.g., a subframe offset different than four) by the WTRU for acknowledging PDSCH transmissions from that serving site.

The WTRU may be configured with multiple subframe subsets to use for transmissions to different serving sites in a variety of ways. For example, higher layer signaling (e.g., RRC signaling) may be used to configured to the WTRU with the subframe subsets. The high layer signaling may be received from any of the serving sites. For example, a first serving site may configure the subframe subsets to be used for the first serving site and a second subframe subset to be used with a second serving site. In an example, physical layer signaling may be used to indicate a subframe subset to the WTRU. For example, the WTRU may receive a UL grant using DCI Format 0/4 on the PDCCH, and the DCI may indicate the subframe subset pattern that a WTRU may use for that site.

In an example, upon sending a SR and/or other control signaling, a WTRU may indicate a preferred density (and/or ratio) of subframes that the WTRU requests to be included in the subframe subset for the serving site (e.g., a percentage of subframes to be allocated for use transmitting to that site). Rather than or in addition to a subframe density, the SR and/or other control signaling may indicate a preferred subframe subset pattern that the WTRU is requesting for the serving site. The network/serving site may confirm and/or reject the request density and/or pattern. The network/serving site may propose a different density and/or subframe subset pattern. The network may indicate the density and/or pattern of subframes assigned to the WTRU when transmitting an UL grant on DCI Format 0/4 to the WTRU (e.g., and/or when transmitting another type of DCI). If the WTRU has already been allocated a subset of subframes for use at another serving site, the WTRU may indicate its current subframe subset pattern for the other site(s) to a serving site from which the WTRU is requesting a new subframe subset. Rather than or in addition to sending an indication of its current subframe subset pattern associated with other serving site(s) when requesting a subframe subset from a different serving site, the WTRU may indicate to the different serving site that it is currently configured for UL transmission with another site during the subframe subset request (e.g., by identifying the other serving sites by serving site ID and/or cell ID). Such an indication may trigger the different serving sites to exchange information related to the current subframe subsets and/or negotiate a new subframe subset for one or more of the serving sites (e.g., over X2, X2bis, or any other interface between the two serving sites).

If the WTRU determines that more or fewer subframes should be allocated to the subframe subset of a given serving site, the WTRU may send a message to the serving site requesting modification of the subframes assigned to the subframe subset for that serving site. The WTRU may send a request to modify the subframe subset for a given serving site to the serving site with the subframe subset to be modified and/or to a different serving site. For example, if the WTRU determines that a large amount of data (e.g., greater than a threshold) is buffered for transmission on a logical channel to be transmitted to a given serving site, the WTRU may determine to request additional subframes be added to the subframe subset associated with that serving site. The request may be transmitted to the serving site with the subframe subset to be modified and/or to a different serving site. The WTRU may transmit a buffer status report and/or an indication of the QoS for one or more (and/or all) UL radio bearers when requesting subframe subset modification. The buffer status report and/or QoS information may be sent to the network when initially requesting a subframe subset and/or periodically/intermittently in order for the network to determine whether to configure the WTRU with subframe subset(s). The network (e.g., one or more serving sites) may used the buffer status report and/or QoS information in order to configure and/or reconfigure the subframe subsets accordingly.

A given serving site may be configured with one or more potential subframe subset. The serving site may indicate the potential subframe subsets to be used in a cell of the serving site using broadcast signaling such as the master information block (MIB) or a system information block (SIB). The WTRU may attempt to access a cell of the serving site using a RACH procedure in subframe within a subframe subset that the WTRU wants to use in the cell. For example, a SIB broadcast in the cell may indicate a first subframe subset includes subframes numbered 0-4 and a second subframe subset includes subframes numbered 5-9. If the WTRU attempts to perform RACH during subframe 5 (e.g., and/or 6-9), the WTRU may be implicitly requesting to be assigned to the subframe subset that includes subframes numbered 5-9. In an example a semi-static configuration including or more subframe subsets may be provided to the WTRU by higher layer signaling (e.g., RRC signaling). The higher layer signaling used to configure the subframe subset of a given serving site may be transmitted from that serving site and/or from a different serving site. In an example, if the WTRU is configured with a DL subframe subset (e.g., a set of subframes in which the WTRU may receive DL transmissions), the WTRU may implicitly determine the UL subframe subset pattern for the serving site based on the assigned DL subframe subset pattern. For example, the UL subframes may be the same as the DL subframes and/or the DL subframe subset may be mapped to a corresponding UL subframe subset.

A configuration of a subset of subframes may also be referred to as a semi-static time division multiplexing (TDM) scheme. For example, a MAC instance may be configured semi-statically through RRC signaling to utilize physical channels in the UL according to a received TDM configuration. As an example, the TDM configuration may include a bitmap that is indicative of the subframes that are assigned to the WTRU as part of the TDM configuration. The bitmap may include a plurality of bits that each represent a subframe and/or frame which may be utilized by a MAC instance for UL transmissions. For example, a first bit may represent a first subframe or frame, and a 1 may indicate that the first subframe or frame is assigned to the WTRU as part of its subframe subset, while a 0 may indicate that the first subframe or frame is not assigned to the WTRU as part of its subframe subset. The bitmap may be specific to a certain MAC instance and/or may be specific to a certain physical channel of the MAC instance. The bits of the bitmap may each correspond to a plurality of subframes, for example subframes in a repeating pattern. For example, a first bit may recommend a first subframe of each frame in the UL. The bitmap may be used for assigning subframes for UL and/or DL transmission to a serving site. In an example, the bitmap may be used to indicate which MAC instance a given subframe is associated with. For example, a first bit of the bitmap may be indicative of whether the subframes associated with the bit (e.g., identified with a subframe number and/or frame number) are associated with a first MAC instance or a second MAC instance. The bitmap configuration may be indicative of a pattern of subframe usage. For example, the series of bits of the bitmap may represent a plurality of sets of predetermined subframe subsets. The WTRU may indicate to the network/serving site a preferred subframe subset, for example using the bitmap. In an example, the TDM configuration may be indicated as one of set of predefined TDM subframe configurations. The predefined subframe TDM configuration(s) may establish for each subframe whether the subframe is used by a first MAC instance or by a second MAC instance. Such configuration may also indicate certain subframes where certain symbols of a subframe are not used for transmission for any MAC instance (e.g., a transmission gap), for instance in case the WTRU is to switch from one MAC instance to another.

The WTRU may determine which site to transmit UCI to and/or when to transmit UCI based on the assigned TDM configuration (e.g., subframe subset configuration). For example, which subframe to use for transmitting UCI may be determined based on the identity of the MAC instance assigned to the subframe and/or the identity of the MAC instance that is associated with the UCI. For instance, the WTRU may determine the maximum number of PDSCH transmissions for which HARQ feedback is to be provided (e.g., on PUSCH and/or PUCCH) in a subsequent subframe based on the assigned TDM configurations for the different MAC instances. If the WTRU determines that more feedback is to be provided in a given subframe than its assigned resources may support (e.g., UCI is to be provided to both a first serving site and a second serving site in a subframe assigned to only the first serving site), the WTRU may determine to multiplex and/or otherwise bundle the UCI/feedback and transmit the bundled UCI/feedback to the single assigned serving site.

In an example, rather than or in addition to being assigned a subframe subset for transmitting to different serving site, the WTRU may be configured to perform dynamic WTRU-autonomous selection of which serving site to transmit to in a given subframe based on a relative priority between MACs instances. For example, the WTRU may not be assigned a subframe subset (e.g., the WTRU may be scheduled for transmission by a plurality of MAC instances in a given subframe) and/or the WTRU may be assigned subframe subsets wherein the subsets assigned to two or more MAC instances/serving sites may overlap for one or more subframes. In such a scenario, the WTRU may determine which serving site to transmit to dynamically based on the type of data being transmitted and/or priority information associated with the plurality of serving sites. For example, the WTRU may be configured to utilize a preemption-based approach where a particular MAC instance or serving site (e.g., a MAC instance that corresponds to a macro eNB) may have absolute priority over one or more other MAC instances or serving sites. If absolute pre-emption is utilized, each MAC instance may be assigned a priority level that may be different than the priority level assigned to other MAC instances. If a higher priority level MAC instance is scheduled for transmission in the same subframe as a lower priority level MAC instance, the higher priority MAC instance may be allowed to use of the physical channel (e.g., such as transmitting over PUCCH and/or PUSCH; receiving from a downlink control channel, etc.) during the subframe and the transmission for the lower priority channel may be dropped and/or transmitted via the higher priority MAC instance. In an example, a lower priority MAC instance may be permitted to use of a physical channels in a given subframe if a higher priority MAC instance is not in Active Time in this subframe. Additional priority rules may be utilized rather than or in addition to an absolute priority between MAC instances. For example, the type of data being transmitted, the identity of the logical channel associated with the transmission, and/or other criteria may be used to determine which MAC instance should be allowed to transmit herein.

In scenarios where the use of one or more physical channels is denied to a MAC instance due to contention (e.g., a higher priority MAC instance is utilizing physical layer resources in a given subframe), the WTRU may send an indication to the serving site corresponding to the MAC instance for which resources were denied (e.g., the lower priority MAC instance). The indication may include identifying information for the MAC instance that was prioritized of the MAC instance receiving the indication and/or may indicate one or more (and/or all) of the subframes assigned to the higher priority MAC instance and/or other higher priority MAC instances utilized by the WTRU. For example, a field in one or more of physical layer signaling (e.g., a PUCCH transmission and/or a PUSCH transmission), MAC layer signaling (e.g., a MAC CE), and/or RRC signaling in order to indicate the identity of the subframe that was the subject of contention and/or the identity of the MAC instance/serving cell that was prioritized. The WTRU may retransmit the information that would have been transmitted to the serving site that was denied transmission resources in a subframe in a subsequent available set of resources for that serving site. The indication regarding the denial of resources (e.g., perhaps with an indication of the MAC instance/serving site that was prioritized) may be included in the subsequent transmission. The subsequent available set of resources may be the first set of resources available for transmitting to the denied serving site (e.g., RACH) after the contention. In an example, the subsequent available set of resources may be the first set of subsequent UL resources that are scheduled for the WTRU (e.g., with a new UL grant), after the subframe during which the contention occurred.

The WTRU may be provided/scheduled with a different set of resources for the transmission of information included in messages that have been dropped due to contention. For example, a WTRU may be configured with an alternate set of PUCCH resources to use when a PUCCH transmission has been dropped due to the MAC instance associated with the PUCCH transmission being of a lower priority.

In some scenarios, DL transmissions and UL transmissions associated with one or more MAC instances may be time duplexed (e.g., time division duplexing (TDD)) while DL transmissions and UL transmissions associated with one or more other MAC instances (e.g., MAC instances associated with another frequency band) may be frequency duplexed (e.g., frequency division duplexing (FDD)). In such scenarios, the TDD and/or FDD scheme(s) may be configured by the network (e.g., the one or more serving sites) such that UL physical channels associated with a FDD MAC instance may be available in subframes where UL transmission does not take place for one or more (and/or all) TDD MAC instances. For example, the UL physical channels associated with a FDD MAC instance may be available in subframes reserved for DL transmission with respect to the one or more (and/or all) TDD MAC instance(s).

In order to switch the physical layer parameters in accordance with the configurations provided by the different MAC instances, the WTRU may be allowed a certain period of time in order to switch between the transmission (and/or reception) for a first MAC instance to that of a second MAC instance. To accommodate the switching time, the last subframe available to a given MAC instance before a change to another MAC instance may be shortened. For example, the WTRU may be configured such that no transmission (and/or reception) is performed on the last $N_1$ symbols of the subframe. If $N_1$ is equal to 1, shortened transmission formats may be used. For example, one or more shortened PUCCH formats may be used. As an example, one or more shortened PUCCH formats similar to the shortened format for transmitting PUCCH with SRS transmission in the last symbol of the subframe may bed used. In an example, rather than or in addition to shortening the final subframe before the transition, the first subframe after the transition may be shortened. For example, the first $N_2$ symbols of the first subframe after a change may be unavailable to the newly active MAC (e.g., for transmission and/or reception). Whether the subframe that is shortened is the subframe prior to the switch and/or the subframe subsequent to the switch may depend on one or more priority rules between the MAC instances.

In some deployments, different serving sites may utilize asynchronous subframe timing. For example, a first serving site associated with a first layer may begin its subframes at a different time than a second serving site associated with a second layer begins its subframes (e.g., a MeNB associated with a Macro layer utilizes different timing alignment than a SCeNB associated with a Pico layer). In another example, one or more cells within a single layer (e.g., associated with a single serving site) may not be time synchronous. If different serving sites operate using asynchronous subframe timing, the MAC instances associated with the different serving sites may have different subframe number offsets. For example, subframe 0 of a given frame in a cell associated with a first serving site may occur during subframe 1 of a frame in a cell associated with a second serving site. Additionally, the start of the subframes for different serving sites may occur at different times. For example, a first subframe associated with a first serving site may start at a different time than a subframe of a second serving site, but the two subframes may partially overlap in time (e.g., one or more symbols for the different subframes may overlap).

If multiple serving sites are not symbol-aligned, time segregation (e.g., a TDM configuration) may still be used. For example, in order to avoid overlapping subframes when the different serving sites are not symbol-aligned, a WTRU may be configured with subframe subsets for the different serving sites that do not include adjacent subframes. The WTRU may recommend subframe subsets to one or more of the serving sites in order avoid being assigned subframes that may have symbol overlap with the subframes assigned to a different serving site. In an example, rather than omitting entire subframes near the transition from a subframe subset in the case on non-symbol aligned serving sites, the subframes may be assigned in an overlapping manner. For example, consider a plurality of symbols that may be used in subframes of a plurality of serving sites (e.g., for purposes of explanation, assume the symbols are numbered 0-52, for example from the perspective of cell A of a first serving site). A WTRU may be configured to transmit/receive for the cell A of a first serving site during a first subframe (e.g., including symbols 0-13), a second subframe (e.g., including symbols 14-27) and a third subframe (e.g., including symbols 28-41). The WTRU may also be configured to transmit/receive for a cell B of a second serving site during a first subframe (e.g., that overlaps with symbols 11-24 of cell A), a second subframe (e.g., that overlaps symbols 24-38 of cell A), and a third subframe (e.g., that overlaps symbols 39-52 of cell A). Cell A may be prioritized over cell B such that if cell A uses its first subframe, then cell B may be unable to use its first subframe, although cell B may still be used for its second subframe (e.g., and/or its first subframe if cell A does not schedule the WTRU).

If a WTRU is assigned a plurality of partially colliding subframe subsets, the WTRU may send an indication to one or more of the serving sites requesting modification of one or more of its currently configured subsets. In an example, the WTRU may indicate to one or more serving sites a symbol offset representing the difference in symbol timing between the serving sites. The serving sites may use the offset information to perform subframe set configuration and/or reconfiguration.

In an example, new types of subframes may be assigned to the WTRU, for examples subframes with a different number of symbols per subframe. The modified subframes may have fewer than 14 symbols, allowing the TDM configuration to avoid overlap in the case of partially overlapping subframes. Encoding (e.g., using rate-matching) may be used by the WTRU in the case of shortened and/or elongated subframes to allow for proper decoding at the receiver, and the network may be aware of which symbols are unused based on the subframe configuration and/or may be informed of which symbols are to be dropped by the WTRU.

In some scenarios, a normal or extended cyclic prefix may be used to account for the overlapping timing between subframes of different MAC instances. However, in other scenarios the overlap may not be properly handled by either normal or extended cyclic prefix. Instead, one or more symbols from one or more of the overlapping subframes may be dropped to ensure proper operation. The location of the dropped symbol(s) (e.g., a first symbol of physical resource block (PRB); the last symbol of a PRB; multiple symbols of a PRB, etc.) may depend on the identity of the MAC instance associated with the subframe for which the symbol(s) were dropped. For example, priority rules may be used to determine which MAC instance drops a symbol in case overlap. In an example, the last symbol of the earlier subframe may be dropped. For example, if there is a subframe collision between two MAC instances, then the MAC instance that is configured to transmit in the earlier starting subframe may drop one or more symbols at the end of its subframe (e.g., the last symbol). In an example, the first symbol of the later subframe may be dropped. For example, if there is a subframe collision between two MAC instances, then the MAC instance that is configured to transmit in the later starting subframe may drop one or more symbols at the beginning of its subframe (e.g., the first symbol).

If the last symbol of a given subframe is to be dropped in order to avoid transmission overlap, the resource element (RE) mapping may be performed for the transport block including the dropped symbol in a manner similar to how the RE mapping is performed when SRS is transmitted on the last symbol of a transmission. If the first symbol of a subframe is being dropped, the RE mapping may be performed for the transport block including the dropped symbol in a manner similar to how the RE mapping is performed when SRS is transmitted on the last symbol of a transmission, although the data may be mapped to later adjacent symbol (e.g., the data that would be mapped to symbol 0 if SRS was transmitted in the last symbol of the subframe may be mapped to symbol 1 instead, the data that would be mapped to symbol 1 if SRS was transmitted in the last symbol of the subframe may be mapped to symbol 2 instead, etc.). If SRS transmission is scheduled for a subframe where overlap occurs, the WTRU may determine to drop the SRS transmission. In an example, if the last symbol of a subframe is dropped in the case of overlap and SRS is also scheduled in an overlapping subframe, rather than dropping the SRS, the data associated with the second to last symbol may be dropped while SRS is transmitted on the second to last symbol of the subframe (e.g., the last symbol used for transmission by that MAC instance as the final symbol may be dropped due to overlap).

The WTRU may be configured to indicate when one or more symbols have been dropped due to subframe overlap. For example, the indication may be sent to the serving site associated with the transmission including the dropped symbol and/or to the serving site associated with the transmission that led to a symbol being dropped in a different transmission. The WTRU may include a reason for the dropped symbol, for example overlap with another transmission. In an example, if the transmission including the dropped symbol is a PUSCH transmission, the WTRU may include an indication of the dropped symbol in the PUSCH transmission. The indication may be included in a flag for the PUSCH transmission. The serving site/eNB may be configured to attempt to blindly decode the PUSCH transmission in order to determine whether or not a symbol may have been dropped. For example, the eNB may first attempt to decode a PUSCH transmission assuming a symbol was dropped. If the eNB detects the flag indicating that the symbol was dropped, it may continue to attempt to decode the PUSCH transmission assuming a dropped symbol. If the flag is not decoded and/or the PUSCH transmission was not successfully decoded assuming a symbol was dropped, the eNB may attempt to decode the PUSCH transmission as if a symbol was not dropped.

In an example, a WTRU may include a request to use reduced symbol transmission in a service request indication sent to a serving site. For example, a WTRU may include a list of subframes and/or an indication of which subframes it is requesting to use a reduced number of symbols for.

In an example, a WTRU may semi-statically indicate (e.g., via RRC signaling) a list of subframes where a symbol (e.g., first, last, etc.) may be dropped. The indication may be specific to each MAC instance. For example, the WTRU may send a first message/indication to a first serving site associated with a first MAC instance that indicates a first plurality of subframes which may be used for reduced symbol transmissions, and a second message/indication to a second serving site associated with a second MAC instance that indicates a second plurality of subframes which may be used for reduced symbol transmissions. The indication may also be transmitted using MAC and/or physical layer signaling.

In an example, a WTRU may indicate to the network (e.g., one or more serving sites) that there may be overlap in some subframes between two MAC instances. The network may determine which MAC instance(s) may drop symbols and may configure the WTRU with such information. For example, the eNBs associated with the different serving sites may negotiate which MAC instance(s) should be utilized for dropping symbols. The WTRU may provide a list and/or indication of possible subframes where such an overlap may occur. The determination of which MAC instance may expect a dropped symbol may be performed by a centralized control entity and/or at one or more of the serving sites. For example, the different serving sites may communicate via an X2 interface to determine which of the serving sites should expect one or more transmissions with dropped symbols. In an example, the indication that a symbol may be dropped (e.g., and perhaps an indication of which symbol(s) may be dropped) may be provided to the WTRU in DCI including a UL grant. For example, a field in the UL grant may indicate the grant is for a transmission with a dropped symbol(s) and may specifically indicate which symbol(s) should be dropped.

In an example, the WTRU may autonomously determine which MAC instance(s) should expect a dropped symbol in a DL transmission and/or should drop a symbol in the uplink. The determination of which transmission should be used to drop a symbol may be based on one or more factors such as the QoS associated with data included in the transmission, buffer status for one or more logical channels associated with the transmission, a priority order between MAC instance, etc. After determining which MAC instance(s)/serving site(s) should use dropped symbols for one or more transmissions, the WTRU may then indicate to the appropriate serving site that in future UL grants, the MAC instance at the serving site may assume a reduction of symbols in an indicated set of subframes.

In an example, physical channels for more than one MAC instance/serving site may be used for transmissions in the same subframe. As an example, physical channels associated with different MAC instances may be used in the same subframe if the transmission/reception of the physical channels occurs in different frequency channels and/or frequency bands (e.g., a first physical channel associated with a first MAC instance is transmitted to a first serving site in a first frequency band, and a second physical channel associated with a second MAC instance is transmitted to a second serving site in a second frequency band). In an example, physical channels associated with different MAC instances may be used in the same subframe if the transmission/reception of the physical channels occurs in different resource blocks (e.g., a first physical channel associated with a first MAC instance is transmitted to a first serving site in a first resource block, and a second physical channel associated with a second MAC instance is transmitted to a second serving site in a second resource block). In an example, physical channels associated with different MAC instances may be used in the same subframe if the transmission/reception of the physical channels involves transmission of different types of physical channels (e.g., PUCCH for one serving site and PUSCH for another serving site). In an example, physical channels associated with different MAC instances may be used in the same subframe if the transmission/reception of the physical channels may be separated using one or more transmission properties (e.g., cover code for PUCCH, orthogonal DM-RS, etc.).

As an example, frequency segregation may be performed in order to transmit to multiple serving sites in the same subframe. Frequency segregation may be used in addition to time segregation and/or without time segregation. For example, if a partially overlapping time segregation scheme is utilized, frequency segregation may also be utilized, for example for subframes for which there is partial overlap and/or for all subframes. For example, a WTRU may be configured with one of more frequency subband subsets for one or more serving sites. For example, if s first cell of a first serving site operates in the same frequency band and/or component carrier of a second cell of a second serving site, the MAC instances associated with the different serving sites may be configured to use different subband subsets within the frequency band/component carrier. In an example, the bandwidth (BW) utilized by the different serving sites may be divided into a plurality of BW parts. Each serving site may be configured to utilize one or more of the BW parts for communicating with the WTRU. For example, each BW part may be treated as a component carrier in carrier aggregation. For example, each BW part may include corresponding PUCCH and PUSCH resources. Some bandwidth parts may include PUCCH without a PUSCH (e.g., for CSI reporting to a serving site) and/or PUSCH without PUCCH.

One or more physical channels and/or types of transmission (e.g., PUSCH, PUCCH, SRS, etc.) may be configured with an RB offset. The RB offset may represent a frequency guard and/or other type separation between frequency bands used for transmitting to different serving sites. The RB offset may ensure frequency segregation for UL transmissions destined for different serving sites. The RB offset may be configured by the network (e.g., one or more of the serving sites) signaled to the WTRU. In an example, the WTRU may determine an RB offset for a given cell based on the cell ID (and/or virtual cell ID) of cell being accessed in a given serving site.

A WTRU may be configured to transmit signals that span multiple BW parts. For example, a single SRS sequence may be transmitted over a full BW of a cell and/or serving site, which may span a plurality of BW parts. In an example, a WTRU may transmit different SRSs (e.g., each with its own set of parameters) for each BW part.

The transmission power utilized by the WTRU may be specific to which BW part is used for transmission. For example, a WTRU may be configured with an independent maximum transmit powers (e.g., $P_{CMAX}$) per BW part. For example, the WTRU may be perform UL transmission power control independently for each BW part. In another example, the WTRU may be configured with a single maximum transmit power value (e.g., $P_{CMAX}$) for the entire BW. For example, if the maximum transmit power is determined across the whole BW, the WTRU may first determine the power to be utilized for PUCCH transmission in a given subframe, and may then allocate remaining power below the maximum transmit power for use transmitting the PUSCH. The PUCCH and PUSCH may be configured for transmission using power control parameters that are specific to the serving site associated with the channel transmission.

If multiple PUCCHs are to be transmitted in a given subframe (e.g., a first PUCCH transmission to a first serving site, a second PUCCH transmission to a second serving site, etc.), a priority ranking for the PUCCHs and/or for the serving sites may be provided by higher layer signaling. For example, the WTRU may determine the transmission power used for transmitting a highest priority PUCCH/serving site first, then determine the transmission power to be allocated to the next highest priority PUCCH/serving site second, and so on. Once the PUCCH resources/transmission power for the serving sites used for PUCCH transmission in the subframe have been allocated transmission power levels, the remaining power may be used for one or more PUSCH transmissions. For example, if multiple PUSCH transmissions are to occur, the power allocated for each transmission may be determined as if the WTRU has full transmission power (e.g., PUCCH is not transmitted), and the determined power levels may be scaled according to the power remaining after the total PUCCH power level(s) has been assigned.

If the maximum transmit power is allocated across the entire BW used by the WTRU (e.g., a single $P_{CMAX}$ is used for the entire BW), a single power headroom report (PHR) may be reported by the WTRU for reporting power information related to the entire BW. For the scenarios where WTRU is configured with an independent maximum transmit power (e.g., $P_{CMAX}$) per BW part and/or carrier, the WTRU may be configured to send PHRs per BW part and/or carrier. The PHR may be transmitted to one or more of the serving sites. For example, the PHR for a given BW part and/or carrier may be reported the serving site associated with transmissions sent from the WTRU over the given BW part and/or carrier. In another example, the PHR of a given BW part and/or carrier may be reported to a serving site that does not receive transmissions from the WTRU using that BW part and/or carrier. In an example, the PHR for a given BW part and/or carrier may be reported to all serving sites utilized by the WTRU. In another example, each serving site may receive PHRs for all of the BW parts and/or carriers used by the WTRU.

The WTRU may perform scaling of its transmissions. For example, if the WTRU is expected to perform uplink transmissions (e.g., on one or more PUCCH resource(s) and/or one or more PUSCH resource(s)) at the same time (e.g., in the subframe and/or over one or more overlapping symbols) to a plurality of serving sites, the WTRU may allocate transmission power according to a priority. For example, transmissions corresponding to the data path of a MeNB serving site may be prioritized over transmissions for a data path including an SCeNB serving site. For example, after allocating power to the transmission associated with the MeNB serving site, remaining power may be allocated for transmission to the SCeNB serving site.

A first serving site (e.g., and/or a first cell of a first serving site) may have a timing configuration that differs from another a second serving site (e.g., and/or a second cell of a second serving site). Therefore, if the timing difference between the cells/serving sites is greater than a predetermined threshold, frequency segregation may be difficult to implement. Thus, the WTRU may determine the timing difference between two cells/serving sites and check if the timing difference is within a preconfigured range. If the timing difference is within the range the WTRU may determine that frequency segregation may be utilized and may indicate that frequency segregation may be used to the network (e.g., one or more of the serving sites). If the timing difference is outside the preconfigured range, the WTRU may determine not to use frequency segregation and may indicate that frequency segregation may be used to the network (e.g., one or more of the serving sites). The WTRU may determine a timing advance value to be used in subframes where frequency segregation is configured by averaging the timing advance values of each of the cells/serving sites for which transmission is performed. In another example, the WTRU may determine to use the largest timing advance value of the timing advance values of each of the cells/serving sites for which transmission is performed. In another example, the WTRU may determine to use the smallest timing advance value of the timing advance values of each of the cells/serving sites for which transmission is performed. In another example, the WTRU may determine to use the timing advance value associated with a highest priority serving site/cell for transmissions to each of the cells/serving sites.

The WTRU may determine the configuration of the different BW parts and/or the network (e.g., one or more serving sites) may determine the configuration of BW parts. For example, the BW parts may be configured in a manner similar to subframe subsets are configured for time segregation. For example, any of the methods described herein for configured a subframe subset may be used for configuring a BW part for a given serving site and/or set of serving sites.

The WTRU may allocate transmit power for the transmission of a plurality of PUCCH transmission (e.g., to different serving site) in one or more ways. For example, the WTRU may be configured to allocate power based on the total amount of power available in a given subframe. For example, the maximum transmit power (e.g., $P_{CMAX}$) may represent the maximum/total transmit power that may be used for transmissions by the WTRU (e.g., within a given subframe). The WTRU may be configured to evenly divide the maximum transmit power among a plurality of PUCCH transmissions to different serving sites. For example, the WTRU may determine a value $P_{CMAX,c}$, which may represent the maximum WTRU output power. The WTRU may divide $P_{CMAX,c}$ evenly among the number of PUCCH transmissions (e.g., n PUCCH transmissions in a given subframe). For example, the uplink power of each PUCCH transmission may be set to a maximum of $P_{CMAX,c}/n$, where n may be the number of PUCCH transmissions in the subframe.

In an example, each MAC instance/serving site may be configured with a MAC-specific maximum output power. For example, the value $P_{CMAX,c,i}$ may represent the maximum transmit power for MAC instance i and/or serving site i. The PUCCH transmission ins serving site i may be allocated $P_{CMAX,c,i}$. The values of $P_{CMAX,c,i}$ may be different for different MAC instances/serving site (e.g., values of i).

In an example, the WTRU may be provided with a WTRU-specific value for $P_{CMAX,c}$ and a priority list and/or indication for PUCCH transmissions. The transmit power for the different PUCCH transmission may be allocated according to the priority list. For example, power may be first allocated to the highest priority PUCCH transmission (e.g., total requested power), then use the remaining power (e.g., $P_{CMAX,c}-P_{PUCCH,i}$, where $P_{PUCCH,i}$ may represent the power allocated to the highest priority PUUCH) as a new $P_{CMAX,c}$ value and allocate power to the second highest priority PUCCH transmission, and so on. In this example, if he WTRU allocates the total request power to the higher priority PUCCH transmission, the WTRU may have insufficient power to be able to transmit one or more PUCCH transmissions to lower priority serving sites.

In an example, the WTRU may allocate power to different PUCCH transmissions independently. For example, after allocating transmission power to each of the PUCCHs to be sent in a given subframe, if the sum of the transmission powers exceed the maximum transmit power (e.g., $P_{CMAX,c}$), the WTRU may scale the transmission in order to avoid exceeding its maximum transmit power.

If the different MAC instances/serving sites are associated with different component carriers, the total transmission power summed over each of the carriers may be fixed. For example, each carrier may have an independent value of $P_{CMAX,c}$, which for example may be set based on priority rules for transmission of PUCCH on each carrier. If a PUCCH transmission is not performed on one or more of the component carriers and/or if the power allocated for a PUCCH transmission on a component carrier is less than the corresponding value of $P_{CMAX,c}$ for that carrier, then the value of $P_{CMAX,c}$ for that component carrier may be decreased by a preconfigured amount. The unused power and/or the amount of the decrease may be reallocated to other carriers to use for PUCCH transmissions.

In an example, the actual power used by each of the PUCCH transmissions in a subframe may be summed and any remaining power may be used for one or PUSCH transmissions to one or more of the serving sites. The power used for PUSCH transmissions may be configured/allocated independently for the different serving sites. Scaling of transmit power between the different serving sites for a PUSCH transmission may depend on a pre-configured priority rule. For example, the remaining power per carrier ($P_{CMAX,c}$ if there is no PUCCH transmission and $P_{CMAX,c}-P_{PUCCH}$ for simultaneous PUSCH-PUCCH transmission on the carrier) may first be allocated to the highest priority PUSCH. Any remaining power may then be allocated to the next highest priority PUSCH, and so on. Similar priority based rules may be used for PUSCH transmission as are described with respect to PUCCH transmission. For example, the configuration of priority rules for PUSCH transmission may be implicitly determined based on the priority rules applied for PUCCH transmission (or vice versa).

In order for a WTRU to receive multiple DL transmissions on the same carrier (or on different carriers), the WTRU may be configured with time segregation or frequency segregation for DL transmissions in a manner similar to that as described for UL transmission. For example, a serving site/cell may indicate to the WTRU the amount of traffic it has buffered for that WTRU. The WTRU may obtain such the buffer metrics for each serving site. The WTRU may use the metric to determine ratio of resources (e.g., time resources, frequency resources, etc.) to be allocated for each serving site. The WTRU may request the appropriate amount of resources from each sites. If there was a previous allocation of resources that is still active, the WTRU may request modification of resources (e.g., fewer subframes assigned to a first serving site and/or a larger number of subframes assigned to a second serving site; fewer BW parts assigned to a first serving site and/or a larger BW parts of subframes assigned to a second serving site; etc.).

A WTRU may be configured with a different C-RNTI for each serving site. The WTRU may detect and attempt to decode PDCCH transmissions scrambled with any of its assigned C-RNTIs. The C-RNTI used may indicate to the WTRU which serving site/MAC instance is associated with the DL transmission (e.g., a PDCCH transmission of a first site being decoded with a C-RNTI associated with a second serving site may indicate that the PDSCH transmission/PUSCH transmission allocated by the PDCCH transmission is to sent/received on the second serving site). The C-RNTI used to decode a DL transmission (e.g., PDCCH transmission, PUSCH transmission, etc.) may indicate the resources/serving site to be used for UL feedback for the DL transmission.

A PDCCH may be segregated in time and/or frequency. For example, if frequency segregation is used, a serving site may segregate one or more specific control channel elements (CCEs), for example CCEs included in WTRU-specific BW parts, to WTRUs who may be configured with frequency segregation. Such frequency segregation may affect the search-space to be used by a transmission point for a given WTRU.

A serving site may configure the WTRU to monitor unique ePDCCH resources. For example, each ePDCCH may use different resources (e.g., different RB(s) and/or different subframe configurations, etc.). The resources used for ePDCCH may indicate to the WTRU the appropriate resources to use in UL for that site. For example, there may be an implicit mapping between the DL resources used for ePDCCH transmission and the UL resources to be used for transmitting over to a given serving site.

Time segregation in the downlink may be implemented in a manner similar to enhance inter-cell interference coordination (eICIC). For example, the WTRU may determine contents and/or type of feedback to transmit at a given feedback instance (and/or one or more serving site-specific parameters to use for such feedback) based on the identity of the subframe during which an aperiodic feedback is triggered. For example, if feedback is triggered in a subframe that is not included in the TDM configuration for the serving site, the WTRU may wait until the next available subframe that is associated with the relevant site in order to transmit the feedback (e.g., aperiodic CSI feedback).

A WTRU may perform random access procedure on one or more (and/or any) of the serving sites/cells associated with the serving sites. For example, when establishing an initial radio link to a serving site, a WTRU may have already established a radio link to another serving site on the same carrier or a different carrier. For example, the WTRU may already have an established RRC connection to another site (e.g., to a MeNB). The WTRU may inform the serving site that it is attempting to access (e.g., a SCeNB) that the WTRU has a radio link to another serving site (and/or multiple other serving sites). For example, the WTRU may include an indication in a message exchanged in the random access procedure (e.g., such as in message 3) that indicates that the WTRU has a previously established connection to a different serving site. The serving site that the WTRU is attempting to access via RACH may provide dedicated PRACH resources and/or dedicated PRACH preambles for WTRUs that have established connections to other serving sites.

In an example, an RRC message similar to a handover command may be received from a first serving site to which the WTRU is already connected, and the message may trigger the WTRU to perform an initial access procedure to a second serving site. For example, the RRC message may include dedicated PRACH resources and/or a dedicated preamble to be used for the RACH on the PRACH resources of the second serving site. The subbands (and/or BW part) within which a WTRU mat attempt RACH may implicitly indicate whether or not the WTRU has an established radio link to another serving site (e.g., if RACH is performed in a first BW part the WTRU may have an established connection to a different serving site, if the WTRU attempts RACH in a second BW part the WTRU may lack a connection to another serving site). The PRACH resource used for the transmission of a preamble may indicate whether or not it has a radio link to another site. For example, certain dedicated RAC preambles and/or certain PRACH resources may be reserved for access attempts performed by WTRUs with an established connection to a different serving site. The WTRU may indicate whether the RACH is for the establishment of a secondary RRC connection or a primary RRC connection.

When attempting random access to a serving site, the WTRU may report a set of IDs (e.g., MAC instance IDs, serving cite ID, cell IDs, etc.) to indicate the set of one or more serving sites with which the WTRU may have a radio link. This may allow the new serving site to begin a procedure to establish a backhaul connection to other serving site(s) utilized by the WTRU (e.g., via X2, X2bis, and/or any other interface). A WTRU may indicate the ratio of resources it would like from the serving site (e.g., a subframe density or ratio for TDM operation, ect.) during the random access procedure. For example, the indication may be included in RACH messages when the WTRU sends a scheduling request to a second serving site for UL traffic. For example, the WTRU may be transmitting UL traffic to a first serving site and based on the desired QoS (e.g., of one or more transmissions) the WTRU may request ratio of resources to be utilized between the first serving site and the second serving site.

A WTRU may concurrently transmit UL channels to multiple serving sites by using different orthogonal cover codes (OCCs) for each of the serving sites. For example, a WTRU may be configured for transmitting PUCCH to multiple serving sites (e.g., a first PUCCH to a first serving site, a second PUCCH to a second serving site, etc.). The WTRU may be configured with one or more serving site (and/or MAC instance) specific OCCs. The OCC to be used for a given serving site may be a function of a cell ID (and/or virtual cell ID) associated with a serving site, a C-RNTI associated with the serving site, a serving site ID associated with the serving site, a MAC instance ID associated with the serving site, and/or the like.

The configuration of the OCC to be used at a given serving site may be performed in a manner similar to those described with respect to configuring subframe subsets for a serving site (e.g., time segregation) and/or BW parts of the serving site (e.g., frequency segregation). Code segregation for a given serving site may be performed in addition to time segregation and/or frequency segregation. A WTRU may be configured with an OCC to be used for PUCCH transmissions. The OCC may be indicated in the initial PUCCH configuration for the serving site. The OCC to be used for a PUCCH transmission may depend on the type of PUCCH format used for the PUCCH transmission. In an example, the OCC to be used for PUCCH for transmitting HARQ feedback may be assigned based on the DCI used for downlink assignment. For example, the OCC to be used may be implicitly mapped to the number of the first CCE that included the CDI. In an example, the OCC may be obtained as a function of the cell ID (and/or virtual cell ID) of a cell of the serving site and/or a WTRU-specific parameter or ID.

Figure 2:
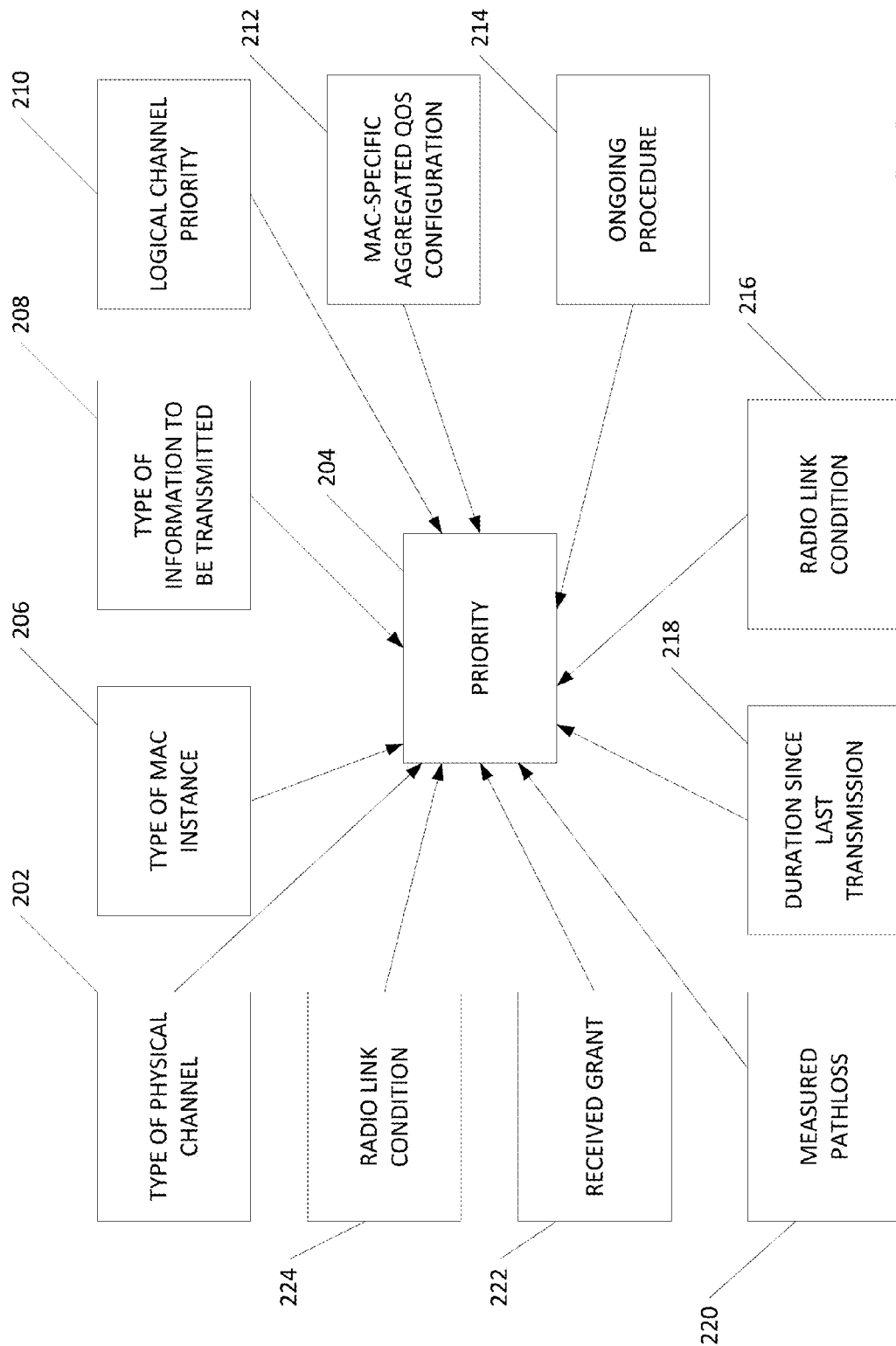
FIG. 2 is a block diagram conceptually illustrating priority rules that may be used to resolve contention between MAC instances.

As shown in FIG. 2, a variety of priority rules may be used to select between MAC instances in cases of contention of resources. For example, a plurality of priority rules may be used to determine the appropriate serving site to use for a transmission. The priority rules may be tiered. For example, if two serving sites/MAC instances have a same priority level for a first priority tier, then a second priority tier may be considered for determining with MAC instance should be granted the physical resources. Multiple priority rules can be used to determine priority between MAC instances. An order of precedence may be defined between different priority rules.

As shown in FIG. 2, the priority level of a given serving site/MAC instance may be determined based on one or more of the type of physical channel (202), the type of MAC instance (206), the type of information to be transmitted (208), the logical channel priority (210), the MAC-specific aggregated QoS configuration (212), the identity of an ongoing procedure (214), a radio link condition (216), a duration since the last transmission (218), a measured pathloss (220), a received grant (222), a radio link condition (224), and/or other factors. The various factors used to determine the priority may be tiered, and some factors may be the primary factors used to determine a priority while other factors may be used for a secondary priority (and/or third, fourth, fifth levels of priority and so on).

In an example, a priority level for transmitting using a given MAC instance/serving site may be determined based on a type of physical channel to be used for transmission by the MAC instance. For example, a first MAC instance transmitting PUSCH to a first serving site may have higher priority than a second MAC instance transmitting PUCCH to a second serving site (or vice versa).

In an example, a priority level for transmitting using a given MAC instance/serving site may be determined based on a type of the MAC instance/serving site. For example, the priority rule may be defined based on the serving site associated with the MAC instance (e.g., whether the serving site corresponds to a MeNB or a SCeNB). For example, a transmission to a MeNB may be prioritized over a transmission to an SCeNB (or vice versa). In an example, a serving site that serves as a mobility anchor for the WTRU may be prioritized over a serving site that is not a mobility anchor. The configuration of the MAC instance may include an index that corresponds to a priority level for that MAC instance. In an example, a primary MAC instance may be prioritized over a secondary MAC instance.

In an example, a priority level for transmitting using a given MAC instance/serving site may be determined based on a type of the information that is to be transmitted. For example, a priority rule defined based on the type of information to be transmitted may prioritize UCI and/or a certain type of UCI (e.g., HARQ A/N, SR, periodic or aperiodic CSI, etc.) over user data. Certain types of UCI may be prioritized over other types of UCI. For example, a MAC instance attempting to transmit HARQ A/N may have a higher priority than a MAC instance attempting to transmit CSI and/or a MAC instance attempting to transmit user data. In another example, a MAC instance that is dynamically scheduled for PUSCH transmission may have higher priority than a MAC instance that is not scheduled for PUSCH transmission. In an example, a MAC instance for which an adaptive or non-adaptive retransmission is scheduled may have higher priority than a MAC instance for which a new transmission is scheduled. In an example, a first message type (e.g., an RRC request and/or an RRC response message) may be given higher priority than other types of messages.

In an example, a priority level for transmitting using a given MAC instance/serving site may be determined based on the logical channel priority of the logical channel to be transmitted using a given MAC instance. For example, the MAC instance attempting to transmit data for the higher priority logical channel may be given priority over a MAC instance attempting to transmit data for a lower priority logical channel. In an example, the QoS of the corresponding radio bearer associated with a MAC instance may be used to determine the relative priority of the MAC instance. For example, a MAC instance being used to transmit data of a radio bearer with more stringent QoS requirements may be prioritized over a MAC instance being used to transmit data of a radio bearer with less stringent QoS requirements. In an example, a priority level for transmitting using a given MAC instance/serving site may be determined based on the prioritized bit rate (PBR) of the logical channel associated with a MAC instance. For example, the WTRU may prioritize a MAC instance being used to transmit a logical channel whose PBR has not been met over a MAC instance being used to transmit a logical channel whose PBR has been met. For example, a transmission may be allocated for a logical channel of a MAC instance whose PBR has been satisfied if the PBR of the other logical channels of other MAC instance(s) have been met. If there is a logical channel whose PBR has not been met, the MAC instance transmitting that logical channel may be prioritized.

In an example, a priority level for transmitting using a given MAC instance/serving site may be determined based on MAC-specific aggregated QoS configuration. For example, a WRTU may be configured with a set of one or more QoS parameters for a given MAC instance. In an example, the WTRU may determine the set of one or more QoS parameters for a given MAC instance as a function of the configuration of the individual logical channels (LCHs) and/or logical channel groups (LCGs) for the MAC instance. Examples of QoS parameters may include one or more of a PBR (e.g., such as a PBR value aggregated across a plurality of LCHs/LCGs of the concerned MAC instance), a minimum latency value (e.g., such as the most stringent discard timer value across a plurality of LCHs/LCGs of the concerned MAC instance and/or a threshold for the maximum head of queue delay and/or the smallest value of the discard timer for a given SDU in the WTRU buffer), a priority threshold (e.g., such that the WTRU may determine the MAC-specific QoS parameters taking into account LCHs/LCGs of a priority equal to or above the threshold), and/or the like.

In an example, a priority level for transmitting using a given MAC instance/serving site may be determined based on the identity of an ongoing procedure associated with a MAC instance/serving site. For example, a WTRU may initiate a procedure such as a RRC procedure that may have higher priority than other procedures such as the transmission of data (e.g., transfer of user plane data). Examples of procedures that may be prioritized over dynamically scheduled data transfers may include one or more of a semi-persistent transmission, the transmission or retransmission of a bundle, a preamble transmission in a RACH procedure, another type of transmission in a RACH procedure, an RRC procedure (e.g., transmission of a measurement report, a reconfiguration with mobility procedure, and/or the like) a procedure related to connectivity management, etc. When the WTRU initiates a procedure that is of higher priority than dynamically scheduled user data transmissions, the WTRU may prioritize transmission for a MAC instance that corresponds to the prioritized procedure such that the MAC instance is allocated more power in case of contention for the allocation of power with other transmission(s) of the WTRU.

In an example, a priority level for transmitting using a given MAC instance/serving site may be determined based on radio link conditions. For example, a WTRU may determine that the radio link condition may be below a given threshold for transmissions associated with a given MAC instance. For example, the WTRU may detect radio link problems as part of a radio link monitoring procedure. The WTRU may prioritize a MAC instance experiencing stronger radio link conditions or a MAC instance associated with poorer radio link conditions. In an example, the WTRU may prioritize a MAC instance based on a determined pathloss for the serving site associated with the MAC instance. For example, if the pathloss associated with a given MAC instance exceeds a given threshold, the WTRU may determine to prioritize other MAC instances that are associated with a lower pathloss. In an example, the WTRU may determine that one or more cells associated with a given MAC instance is experiencing radio link failure (RLF). The WTRU may prioritize MAC instances that are associated with cells that are not experience RLF over cells that are experiencing RLF. In an example, one or more of UL RLF and/or DL RLF may be considered. In an example, the WTRU may determine that RRC timer T310 is running for a given MAC instance. The WTRU may prioritize a MAC instance whose T310 timer is not running over a MAC instance whose T310 timer is running.

In an example, if a given MAC instance is not used for connectivity (e.g., a MAC instance that is not the primary MAC instance and/or is not used for transmitting RRC messages), the WTRU may associate a specific (e.g., possibly lower and/or absolute lowest) priority to transmissions for the concerned MAC instance. For example, ifs first MAC instance is used for connectivity (e.g., if the first MAC instance is the primary MAC instance and/or is used for maintaining the RRC connection), the WTRU may associate a specific (e.g., possibly higher and/or absolute highest) priority to transmission for that MAC instance. The WTRU may assign a higher priority (and/or absolute highest priority) to a MAC instance whose RRC timer(s) T301, T302, T304 and/or T311 is/are running (e.g., which may indicate an ongoing procedure related to connectivity, mobility, and/or re-establishment is being performed).

In an example, a priority level for transmitting using a given MAC instance/serving site may be determined based on a time since a last transmission was performed for a given MAC instance. For example, a priority rule may be defined based on a duration since the last subframe that was available to the MAC instance and/or a duration since the last subframe that was actually used by the MAC instance for transmission. For example, a AMC instance associated with a longer duration may be assigned a higher relative priority than a MAC instance with a shorter duration.

In an example, a priority level for transmitting using a given MAC instance/serving site may be determined based on a determined pathloss for the MAC instance. For example, an estimated pathloss for a serving cell, such as a PCell, of a MAC instance may be determined by the WTRU. The WTRU may prioritize a MAC instance for which the pathloss is lower over a MAC instance for which the pathloss is higher. As another example, rather than or in addition to a determined pathloss, the priority determination may be made based on one or more of an estimated downlink channel quality, for example based on CSI and/or measured reference signal received power (RSRP).

In an example, a priority level for transmitting using a given MAC instance/serving site may be determined based on the received grant of the MAC instance. For example, the priority rule may be defined based on the absolute received grant and/or based on a grant to power ratio. For instance, a MAC instance for which a higher grant has been signaled may have higher priority. As another example, the priority rules may be based on an estimated UL packet error rate for each MAC instance and/or based on available headroom for a given MAC instance. For example, the MAC instance with the lower packet error rate and/or the MAC instance with the highest power headroom may be given higher priority.

In an example, a priority level for transmitting using a given MAC instance/serving site may be determined based on past priority enforcement. For example, the priority of a serving site and/or physical channel of a serving site may change based on whether a previous transmission for the serving site was dropped based on the transmission having a lower priority than a transmission of another MAC instance. For example, if a WTRU drops PUSCH to a first serving site based on a to transmission of PUCCH to a first serving site having priority, one or more of a PUSCH transmission and/or a first serving site transmission (or the combination of the two) may be given a higher priority in the next overlapping subframe. The new, heightened priority may be applicable until the specific signal that was dropped has been transmitted. For example, if a PUSCH transmission to a first serving site was dropped based on the PUSCH transmission having a lower priority than another transmission associated with a different MAC instance, but in a future non-overlapping subframe the WTRU is able to transmit this PUSCH to the first serving site (e.g., before it overlaps a second time with the MAC instance that was prioritized over it), the priority rule may revert back to the original configuration.

Various combinations of the priority rules may be used. For example, the WTRU may prioritize a transmission on a PUSCH associated with a serving cell of a prioritized MAC instance (e.g., a primary MAC) over a transmission on the PUCCH associated with a serving cell of a secondary MAC that has a with lesser priority.

In an example, rather than or in addition to WTRU-autonomous priority rules, the WTRU may receive one or more explicit indications from the network (e.g., one or more serving sites) for selecting between MAC instances in case of contention. The network based priority indications may be applicable to one or more of non-simultaneous and/or simultaneous use of physical resources. The explicit indication of priority may be received via one or more of L1 signaling (e.g., PHY signaling such as the PDCCH and/or E-PDCCH), L2 signaling (e.g., MAC), and/or L3 signaling (e.g., RRC).

For example, the WTRU may receive L1 signaling include DCI via one or more of the PDCCH and/or E-PDCCH (e.g., for dynamic and/or semi-persistently scheduled grants). The DCI may include a flag and/or other indication of a priority value that may be associated with the grant included in the DCI. For example, the flag and/or other indication may indicate that the grant will have a specific priority, for example a priority that is different that a default priority for a typical grant of the given type. The WTRU may use the indication of priority when performing logical channel prioritization such that data with a corresponding priority may be included in the MAC PDU that may be transmitted in the transport block that corresponds to the received grant. In an example, the WTRU may receive DCI that triggers the transmission of a preamble (e.g., a PDCCH order for random access and/or for the purpose of proximity detection). The DCI may include a flag and/or other indication of a priority value for the preamble transmission (and/or possibly any WTRU-autonomous preamble retransmission for the concerned procedure). Flags or indications of priority in DCI may indicate that the grant is of higher priority than a grant that does not include the flag or indication. The WTRU may implicitly determine that such priority may be applied to the preamble transmission as a function of the indicated PRACH parameter (e.g., preamble index, PRACH mask index, etc.) and or associated PRACH resource (e.g., in case partitioning or PRACH is configured).

In an example, the WTRU may receive DCI via L1 signaling that may activate a specific prioritization rule for the concerned MAC instance. For example, the activation of the priority rule may be time-limited, and an indication of the length of time the priority rule should be used be may also be signaled in the concerned DCI. For example, the DCI may indicate that transmission associated with a first MAC instance may have higher priority than transmissions for another MAC instance for a specified period of time. The WTRU may transmit a HARQ feedback acknowledgement when it receives such DCI. In another example, the DCI may trigger the WTRU to begin using (and/or stop using) one or more of the priority criteria described with respect to FIG. 2.

L2 signaling may be used to explicitly signal a priority for a given MAC instance. MAC CEs may be an example of L2 signaling. For example, the WTRU may receive a MAC CE that activates a specific prioritization rule for the concerned MAC. For example, the activation of the priority rule may be time-limited, and an indication of the length of time the priority rule should be used be may also be signaled in the concerned MAC CE. For example, the MAC CE may indicate that transmission associated with a first MAC instance may have higher priority than transmissions for another MAC instance for a specified period of time. In another example, the MAC CE may trigger the WTRU to begin using (and/or stop using) one or more of the priority criteria described with respect to FIG. 2.

L3 signaling may be used to explicitly signal a priority for a given MAC instance. RRC PDUs may be an example of L3 signaling. For example, the WTRU may receive an RRC PDU that may initiate a procedure that may activate a specific prioritization rule for MAC associated with transmissions of RRC PDUs (e.g., a SRB) corresponding to the concerned procedure. An RRC PDU may include an explicit flag and/or a priority value indicating that subsequent PDUs for this procedure shall have a specific (e.g., higher) priority. When the WTRU initiates the prioritized procedure, the WTRU give priority to a MAC instance that corresponds to the concerned procedure (e.g., may be allocated more power in case of contention for the allocation of power with other transmission(s) of the WTRU and/or may be transmitted rather than dropped in the case of a conflict where time segregation is used). An indication of priority included in an RRC PDU may include a flag that indicates an alternative and/or an absolute priority rule, an index that indicates a specific priority rule, and/or an offset or a weight value to apply to the prioritization process.

Combinations of these priority rules, and possibly also with WTRU-autonomous methods described herein may be used. For example, the WTRU may be configured to implement autonomous priority rules but such autonomous prioritization rules may be overridden by explicitly signaled network-controlled priority rules.

In an example, certain physical layer procedures may be different and/or modified when a multi-site configuration is enabled as compared to when a single serving site is utilized. For example, a WTRU may receive a Physical HARQ Indicator Channel (PHICH) from multiple sites when a multi-site configuration is enabled. The PHICHs of the different serving sites may be time-segregated, frequency-segregated, and/or code-segregated. If PHICH is code-segregated per site, a WTRU may indicate to each site a site index. In an example, the site index may be exchanged between sites via an interface such as the X2 interface. The value of the site index may be used in determining the PHICH sequence number of the PHICH, thus ensuring that each site has an orthogonal PHICH. In an example, the sites may explicitly indicate to each other via an interface such as the X2 interface the PHICH sequence number that the serving site is using, for example to ensure orthogonality of the PHICH of the different serving sites.

If frequency segregation of serving sites is utilized, each site may use a different PHICH group number. For example, the serving sites may be associated with a WTRU-indicated site index to be used for determining the PHICH group number. In an example, the site index may be exchanged between the sites via an interface such as the X2 interface. In an example, the PHICH group number may be explicitly exchanged between sites to ensure that PHICH group numbers are not reused between serving sites.

If time segregation of serving sites is utilized, each site may include one or more subframes of a subframe subset where PHICH may be transmitted. In order to ensure that each serving site has access to PHICH resources in subframe $(n+k_{PHICH})$ for a WTRU that transmitted PUSCH in subframe(n), the WTRU may be configure with a serving site-specific value of $k_{PHICH}$. In another example, the WTRU may be aware of the subframes in the subsets that may be used for PHICH for each serving site. For example, when determining a subframe where a WTRU may expect PHICH (e.g., subframe$(n+k_{PHICH})$), the WTRU may count valid subframes assigned to the concerned serving site (e.g., subframes within each site's PHICH subframe set) when determining a appropriate number of subframes (e.g., $k_{PHICH}$ subframes) has elapsed.

In an example, the value of $k_{PHICH}$ used for a given serving site may depend on the identity of subframe(n) in which the WTRU transmitted on the PUSCH. For example, a set of values for $k_{PHICH}$ may be pre-configured. The WTRU may select a value that will result in PHICH being transmitted in a valid subframe for the serving site. For example, the set of $k_{PHICH}$ per subframe(n) may be jointly configured with a subframe set of valid PUSCH subframes to a given site.

In an example, HARQ-ACK bundling may be used on PHICH. For example, the network may bundle a plurality of HARQ-ACK indications onto single PHICH transmission occurring at subframe(n+$k_{PHICH}$). The PHICH may include HARQ ACK/NACK indication for each PUSCH transmission occurring in subframe(n) or earlier that has not yet been ACKed/NACKed. For example, an indicator bitmap may be transmitted by the network to indicate how many PUSCH transmissions the HARQ-ACK bundle is for (e.g., one bit for each PUSCH transmission). In an example, multiplexing of HARQ-ACK may be used. For example, a given serving site may accumulate HARQ-ACK until a configured subframe (m) in its PHICH subframe set occurs. Upon reaching the configured subframe, each of the HARQ-ACK/NACKs for PUSCH transmissions from subframe(m-$k_{PHICH}$) or earlier that have not yet been ACK/NACKed may be transmitted. Each HARQ-ACK may use a different orthogonal code, for example as determined by the PHICH sequence number. In such a case, each PUSCH transmission may be given an index and the index may be used in the PHICH sequence number formulation.

In an example, the WTRU may be configured to operate using multiple sets of transmission parameters and may select one or more appropriate set(s) of transmission parameters to use in a given subframe based on various criteria. For example, if a given subframe is to be used by the WTRU in order to perform a plurality of uplink transmissions (e.g., transmissions to different serving sites), the WTRU may determine a set of transmission parameters to use for one or more PUSCH transmissions based on criteria such as the transmission requirements across a plurality of layers/serving sites. As an example, the transmission power requested and/or configured for each transmissions site may be considered by the WTRU when selecting appropriate transmission parameters to apply for transmissions sent to one or more of the serving sites. The sets of transmission parameters that may be used by the WTRU may be obtained by the WTRU in a number of ways. For example, the WTRU may receive one or more parameters (e.g., and/or one or more sets of parameters) via downlink control signaling such as a PDCCH transmission. In an example, the WTRU may receive one or more parameters (e.g., and/or one or more sets of parameters) as a semi-static configuration (e.g., for a configured grant such as a semi-persistent scheduling (SPS) grant, a configuration of alternate parameters, an RRC configuration of parameters, etc.). In an example, the WTRU may implicitly determine one or more parameters (e.g., and/or one or more sets of parameters). For example, the WTRU may implicitly determine one or more one or more parameters (e.g., and/or one or more sets of parameters) for a first layer/serving site based on one or more parameters (e.g., and/or one or more sets of parameters) that are applied at a second layer/serving site.

For example, the WTRU may determine one or more transmission parameters to be applied for a given uplink grant in a first layer (e.g., associated with a first serving site and/or a first MAC instance) based on the parameters applied to an uplink transmission in a second layer (e.g., associated with a second serving site and/or a second MAC instance). For example, for a subframe during which concurrent/simultaneous UL transmission is to be performed for more than one MAC instance/layer, the WTRU may be configured to select one or more transmission parameters to use for a PUSCH transmission in a first layer associated with a first serving site (e.g., and/or MAC instance) based on the existence of a transmission in a second layer associated with a first serving site (e.g., the parameters used in the first layer may change depending on whether or not a transmission in a second layer is to occur concurrently) and/or based on one or more characteristics of UL transmission on the second layer. For example, one or more of a modulation and coding scheme (MCS), a redundancy version, a total number of allocated PRBs, a number of coded symbols for control information, and/or the transport block size used for transmission in a first layer associated with a first serving site may be selected based on whether or not transmission is to be sent to a second serving site concurrently. In an example, one or more of an MCS, a redundancy version, a total number of allocated PRBs, a number of coded symbols for control information, and/or the transport block size used for transmission in a first layer associated with a first serving site may be selected based the identity of one or more uplink transmission parameters to be used for concurrent transmission to a second serving site (e.g., an MCS, a redundancy version, a total number of allocated PRBs, a number of coded symbols for control information, and/or the transport block size used for transmission to the second serving site).

Transmission parameters for use for transmission(s) sent to first serving site may be selected based on parameters related to transmissions to a second serving site in order to maintain predictability of block error rate performance, for example when the available transmission power for a given serving site is uncertain due to potential transmissions to other serving sites. Examples of different criteria the WTRU may use to select transmission parameters to be applied for transmissions to be sent to a first serving site based on one or more parameters associated with uplink transmissions for a second serving site are described in more detail below.

For example, the WTRU may select a first set of transmission parameters for PUSCH transmitted in a first layer associated with a first serving site as a function of whether or not the WTRU is to perform multi-layer transmission (e.g., concurrent transmission to multiple serving sites in the same subframe) in a given subframe. The WTRU may select a first set of one or more uplink transmission parameters to apply for transmission to a first serving site if the WTRU is not transmitting to a second serving site in the same subframe as the transmission to the first serving site and/or the WTRU may select a second set of one or more uplink transmission parameters to apply for transmission to the first serving site if the WTRU is transmitting to the second serving site in the same subframe as the transmission to the first serving site.

In an example, the WTRU may determine the transmission parameters to apply for transmission to a given serving sites based on DCI contents received for one or more of the serving sites. As an example, the WTRU may receive DCI applicable to a PUSCH transmission to a given serving site for one or more subframes (e.g., a dynamic grant on PDCCH, an SPS configuration, an SPS activation message, etc.). The DCI may indicate multiple values for one or more transmission parameters (e.g., an MCS, a redundancy version, a total number of allocated PRBs, a number of coded symbols for control information, a transport block size, etc.), and the WTRU may select which of the values should be applied based on whether the WTRU is concurrently transmitting to another serving site in the same subframe as the PUSCH transmission. For example, a received grant may include two values for the MCS, where one MCS value is applicable to transmissions where the WTRU is not performing concurrent transmissions to multiple serving sites in the same subframe and a second is applicable to transmissions where the WTRU is performing concurrent transmission to multiple serving sites in the same subframe.

In an example, the WTRU may determine the transmission parameters to apply for transmission to a given serving site based on the identity of one or more transmission parameters applied for transmission to another serving site. For example, the WTRU may be preconfigured and/or receive RRC signaling that configures one or more parameters that the WTRU should apply for transmissions to a second serving site based on the parameters/configurations applied to a first serving site. As an example, the second set of parameters to be used for a transmission to a second serving site may be determined and/or derived from a first set of parameters that are indicated in DCI for a first serving site. The WTRU may have a predefined configuration and/or may receive a configuration via higher layer signaling that indicates which parameters are used for transmission to a second serving site when certain other parameters are being used for a concurrent transmission to a first serving site in the same subframe. As an example, an MCS index to use for the second set of parameters (e.g., for a transmission to a first serving site) may be determined function of an MCS indicated to be used for transmission to the first serving site (e.g., in DCI). The MCS index (and/or other transmission parameter) to use for transmission to the second serving site may be selected based on the MCS index associated with the transmission to the first serving site and an offset value. For example, the MCS index of the second serving site may be selected as the MCS value of the first serving site minus the offset value (e.g., subject to a minimum). The offset value may be predefined, received from higher layer (e.g., RRC) signaling and/or indicated in DCI. As another example, the total number of allocated PRBs for transmission to the second serving site (and/or some other parameter of the second set of uplink transmission parameters) may be determined to be the number of PRBs allocated for transmission to the first serving set reduced by a predetermine number or factor (e.g., rounded up or down to a valid number of allocated PRBs).

In an example, the WTRU may determine the transmission parameters to apply for transmission to a given serving site based on the identity of one or more transmission parameters applied for transmission to another serving site and the available transmit power for the subframe. For example, a second set of one or more transmission parameters to be applied to a transmission to a second serving site may be determined and/or derived based on a first set of one or more transmission parameters to be applied in a transmission to a first serving site (e.g., as indicated in a received DCI) and one or more of the transmission power to be applied in the first layer if transmission in the second layer occurs in the same subframe and/or the transmission power to be applied in the first layer in the absence of transmission in the second layer in the same subframe. As an example, the MCS index and/or the number of allocated PRBs (and/or some other uplink transmission parameter) of a second set of parameters to be applied to transmission to a second serving site may be determined and/or derived based on the corresponding parameter applied for the first set of parameters used for transmission to the first serving site (e.g., MCS index, number of allocated PRBs, etc.) and a ratio of the available transmission power if a transmission is sent to a single serving site (e.g., the first serving site) in a given subframe and the available transmission power if a transmission is sent to multiple serving sites (e.g., the first serving site and the second serving site) in the subframe. For example, a function of the ratio of the available transmission powers with no transmission in a second layer in a given subframe to the available transmission power with transmission in the second layer in the subframe may be used to scale a parameter associated with transmission to the first serving site for use transmitting the second serving site. As an example, a second set of one or more transmission parameters to be applied to a transmission to a second serving site may be determined and/or derived based on a first set of one or more transmission parameters to be applied in a transmission to a first serving site (e.g., as indicated in a received DCI) and the available transmission power if the second serving site is determined to of higher priority than the first serving site.

In an example, the WTRU may determine the transmission parameters to apply for transmission to a given serving site based on a second set of DCI that is received for the subframe. For example, first DCI may be received and may define a set of transmission parameters to be applied for transmitting to the first serving site, and second DCI may be received and may define a set of transmission parameters to be applied for transmitting to the second serving site. The DCI for the first serving site may be received via a PDCCH and/or E-PDCCH transmission from the first serving site, and the DCI for the second serving site may be received via a PDCCH and/or E-PDCCH transmission from the second serving site. In another example, the DCI for both serving sites may be received from one of the serving sites. In a subframe during which the WTRU successfully decodes a plurality of DCI messages indicating an uplink grant for the same PUSCH, the WTRU may select which set of parameters (e.g., which DCI) to use for the uplink transmission as a function of the grant that would maximize the transmission of data and the use of the WTRU's transmission power. In an example, the WTRU may select which set of parameters (e.g., which DCI) to use for the uplink transmission as a function of the grant that would maximize the transmission of data and the use of the WTRU's transmission power while minimizing (and/or avoiding) the application of power reduction and/or power scaling for the allocated PUSCH transmissions.

One or more sets of transmission parameters to be applied during periods of concurrent transmission to different serving sites in the same subframe may be applicable for a predetermined period of time and/or bounded in time. The WTRU may determine when to start and/or stop deriving a second set of transmission parameters for a given MAC instance or for a specific PUSCH according various criteria. For example, the WTRU may determine whether or not to utilize separate transmission parameters for transmissions to different serving sites and/or for how long the separate parameters should be used based on explicit signaling. The WTRU may receive control signaling that indicates to the WTRU that the WTRU should determine separate sets of transmission parameters for the serving cells of different serving sites. The explicit signaling may indicate for how long the WTRU should continue to derive separate sets of parameters (e.g., a specific number of subframes; until explicit signaling indicates that separate parameters should no longer be used, etc.) and/or may explicitly indicate the second set of parameters. The explicit control signaling that indicates that separate sets of transmission parameters should be used may be received by Layer 3 (e.g., RRC) signaling, for example as part of a procedure that adds and/or modifies a given MAC instance. In an example, explicit control signaling that indicates that separate sets of transmission parameters should be used may be received by Layer 2 (e.g., MAC CE) signaling, for example as part of an indication for the concerned MAC instance or for one or more of the serving cells of the MAC instance. In an example, explicit control signaling that indicates that separate sets of transmission parameters should be used may be received by Layer 1 DCI, for example in DCI that activates a second MAC instance/second set of transmission parameters. The WTRU may transmit HARQ feedback for the Layer 1 DCI. Explicit signaling (e.g., via Layer 1, Layer 2, and/or Layer 3) may be used to indicate to the WTRU that it should stop determining separate transmission parameters to be applied for different MAC instances.

The WTRU may determine when to begin and/or stop determining and/or utilizing a second, separate set of transmission parameters for a given MAC instance and/or for a specific PUSCH based on the activation of MAC instance and/or the deactivation of a MAC instance. For example, the WTRU may be triggered to begin determining a separate set of transmission parameters for a given MAC instance based on the activation of the given MAC instance and/or the activation of a different MAC instance. The WTRU may be triggered to stop determining a separate set of transmission parameters for a given MAC instance based on the deactivation of the given MAC instance and/or the deactivation of a different MAC instance.

The WTRU may determine when to begin and/or stop determining and/or utilizing a second, separate set of transmission parameters for a given MAC instance and/or for a specific PUSCH based on whether power scaling is to be applied in a given transmission. For example, the WTRU may determine to use and/or derive a second set of transmission parameters to use for a given MAC instance and/or PUSCH upon determining that power scaling may be required in order to transmit to a second serving site if a first set of transmission parameters are used for transmitting to a first serving site. The determination regarding whether the second set of parameters should be derived and/or used for a given transmission may be determined on a per subframe basis. In an example, the WTRU may determine to begin determining and/or deriving the second set of transmission parameters based on having applied power scaling for a predetermined (e.g., a preconfigured and/or higher layer configured) number of subframes, a predetermined (e.g., a preconfigured and/or higher layer configured) number of transmission, and/or for predetermined (e.g., a preconfigured and/or higher layer configured) period of time. The WTRU may determine to begin determining and/or deriving the second set of transmission parameters based a corresponding PHR being triggered and/or transmitted. Similarly, the WTRU may determine when to stop determining and/or utilizing a second, separate set of transmission parameters for a given MAC instance and/or for a specific PUSCH based on a determination that power scaling would no longer be needed if the first (e.g., single) set of transmission parameters would be used.

The WTRU may determine when to begin and/or stop determining and/or utilizing a second, separate set of transmission parameters for a given MAC instance and/or for a specific PUSCH based on the QoS not being met in a given MAC layer/instance. For example, the WTRU may determine to use and/or derive a second set of transmission parameters to use for a given MAC instance and/or PUSCH upon determining that one or more QoS requirement(s) are not being met for one or more LCH of mapped to a MAC instance. The determination of whether to utilize separate transmission parameters for different MAC instances based on QoS requirements may be performed on a per subframe basis, on a scheduling period basis (e.g., once per scheduling period), and/or after the QoS requirement has not met for a predetermined and/or configurable period of time. The WTRU may determine to begin determining and/or deriving the second set of transmission parameters in the subframe in which a corresponding QSR is triggered and/or transmitted. Similarly, t the WTRU may determine when to stop determining and/or utilizing a second, separate set of transmission parameters for a given MAC instance and/or for a specific PUSCH based on the corresponding QoS requirement once again being met.

The WTRU may determine when to begin and/or stop determining and/or utilizing a second, separate set of transmission parameters for a given MAC instance and/or for a specific PUSCH based on the expiration of a timer. For example, the WTRU may set a timer upon beginning to use a second, separate set of transmission parameters for a given MAC instance and/or for a specific PUSCH (e.g., based on receiving explicit signaling to use separate parameters and/or implicitly determining to start using implicit parameters). The WTRU may determine to stop determining and/or utilizing a second, separate set of transmission parameters for a given MAC instance and/or for a specific PUSCH based on expiration of the timer. The WTRU may restart the timer based on meeting one or more of the criteria described herein for triggering the WTRU to begin deriving the separate transmission parameters (e.g., receiving explicit signaling, activation of a MAC instance, application of power scaling, QoS not being met, etc.). The WTRU may stop using the second set of transmission parameters when the timer expires.

The WTRU may be configured to indicate the set of transmission parameters used for a PUSCH transmission in the PUSCH transmission. For example, the WTRU may be configured to multiplex UCI with the PUSCH data being transmitted, and the UCI may indicate one or more of the transmission parameters that were used by the WTRU to send the PUSCH transmission. For example, in a PUSCH transmission where the WTRU may select between two or more sets of PUSCH transmission parameters, the WTRU may indicate which set of parameters has been selected and/or which values were used for certain parameters. The selection may be encoded and multiplexed as UCI with UL-SCH data into the PUSCH transmission in predetermined resource elements. For example, one bit may be reserved in the PUSCH transmission for representing the selected set of transmission parameters, for example if there are two sets of transmission parameters the WTRU may select from (e.g., a 0 may indicate that the transmission parameters utilized are that same for multiple MAC instances and/or a 1 may indicate that different sets of transmission parameters are used for different MAC instances). The indication regarding which transmission parameter(s) are used may be appended to HARQ-ACK bits sent on the PUSCH and/or may be encoded in manner similar to HARQ-ACK bits sent on the PUSCH.

PDSCH procedures applied by the WTRU may depend on whether the WTRU is performing multi-serving site transmission (e.g., in the uplink) and/or reception (e.g., in the downlink). For example, a WTRU may be configured with one or more pattern for performing UL transmission for each MAC instance (e.g., time segregation, frequency segregation, code segregation, etc.). For DL reception (e.g., via the PDSCH), the different serving sites (e.g., a first eNB such as a MeNB for the first serving site and a second eNB such as an SCeNB for the second serving site) may determine a DL time segregation pattern to be used for transmitting to the WTRU while ensuring the applicable QoS parameters for the different bearers are met. For example, the different serving sites may configure and/or negotiate a time segregation pattern for transmitting to the WTRU in the downlink using the X2 interface (e.g., X2' interface, X2bis interface, etc.). In an example for time segregation, the UL subframe subsets utilized by the WTRU may be configured independently of one or more DL subframe subset that may be used by the different serving sites for transmitting to the WTRU. Independently configured UL and DL subframe subsets may be referred to as decoupled UL and DL time segregation. When decoupled UL and DL time segregation is used, the subframe subset configured for use may be determined based on the applicable conditions of the corresponding link without having to take into consideration the applicable link conditions in the reverse link. In another example, the UL and DL subframe subsets may be coupled and/or otherwise configured together such that UL subframe subsets are jointly configured with and/or mapped to DL subframe subsets.

For a given configured subset of UL subframes and a given configured subtest of DL subframes associate with a MAC instance, HARQ feedback for PDSCH transmission received in subframe(n) may be transmitted in subframe(n+k). The value of k may be determined based on the subframe index n and the configuration of the subset of subframes available for UL operation. For example, k may be set to a value that ensures that subframe (n+k) is a subframe that is in the configured subset of subframes available for transmission to the serving site that transmitted the PDSCH transmission in subframe(n). In an example, the value of k may be determined to ensure that subframe(n+k) is available for UL transmission while still allowing for sufficient processing time to be available for the decoding of the PDSCH transmission. For example, k may be set to the smallest value greater than or equal to a predetermined minimum HARQ latency k0 (e.g., k0 may be equal to 4 subframes) such that subframe(n+k) is included in the subframe subset that is configured for UL transmission for the associated MAC instance.

As an example, a PDSCH for a MAC instance may be configured to be received in any subframe, while UL transmissions (e.g., including one or more of PUSCH and/or PUCCH) may be configured to be transmitted in a subset of subframes. For example, the UL subframe subset for the MAC instance may correspond to even-numbered subframes (e.g., subframes 0, 2, 4, 6, and 8 of a frame). In such scenarios, the HARQ feedback for PDSCH transmissions received in subframes 0, 2, 4, 6 and 8 may be transmitted four subframes later (e.g., in subframes 4, 6, and 8 of the current frame, and subframes 0 and 2 of the next frame, respectively), HARQ feedback for PDSCH transmissions received in subframes 1, 3, 5, 7, and 9 may be transmitted in five subframes later (e.g., the minimum number of subframes that is greater than the HARQ processing time of four subframes that still ensures the HARQ feedback is transmitted in a subframe in the UL subset for the MAC instance). For example, for PDSCH transmissions received in subframes, 1, 3, 5, 7, and 9, the HARQ feedback may be transmitted in subframes 6 and 8 of the current frame and subframes 0, 2, and 4 of the next frame, respectively.

In an example, coupled UL/DL time segregation may be performed in order to ensure the proper operation of HARQ. For example, a DL subframe pattern that allows for DL transmission from a serving site to a WTRU in subframes a, b, c, and d, may be tied or otherwise mapped to a UL subframe pattern that allows for UL transmission by the WTRU to the same serving site in subframes a+4, b+4, c+4, and d+4. In this manner, previous release FDD HARQ rules may be applied while still allowing for segregation of transmission to different serving sites.

In an example, the WTRU may be configured to treat each of the UL and/or DL subframe subsets as a block of "virtually continuous" subframes. For example, in this manner the legacy HARQ timing relationships may be maintained across "virtually continuous" subframes even though the actual subframe subsets may be non-contiguous. For example, if a given MAC instance is configured with a subset of subframes that include subframe numbers 0, 1, 2, 3, 4, and 5 for both UL and DL transmission in all radio frames, the WTRU may apply the HARQ timing as if a frame included s subframes instead of 10 (e.g., the WTRU would treat subframe 5 as if it was adjacent to subframe 0 for the next frame for the purposes of HARQ transmission). As an example, HARQ timers and timing relationships may be applied by the WTRU as if each virtual frame included the first six subframes of each actual radio frame. For example, if the WTRU receives a DL transmission in subframe #4 of a first radio frame, the WTRU may transmit the corresponding UL HARQ feedback in virtual subframe (n+4), which may correspond to corresponding to subframe #2 of the following frame.

For some coupled and/or decoupled UL and DL time segregation, the UL and DL subframe subsets may be set such that reuse of FDD HARQ procedures and timing may be infeasible. For example, if decoupled UL and DL time segregation is utilized, the allocation of UL subframes may be much different that the allocation of DL subframes, HARQ operation using previous timing relationships unavailable.

As an example, consider a case where a WTRU is connected to two cells: a first cell associated with a first serving site (e.g., Cell A) and a second cell associated with a second serving site (e.g., Cell B). Cell A may have buffered a relatively large amount downlink data to be delivered to the WTRU. Therefore, the subframe subsets may be configured such that 80% of the available DL subframes are included in the subframe subset associated with Cell A. Assuming a case where there is no overlap of subframe sets between different serving sites, the subframe subset allocated for Cell B may include the remaining 20% of the available DL subframes. However, in the uplink the WTRU may have a relatively large amount of data buffered for transmission to Cell B, while having a relatively little amount of data buffered for transmission to Cell A. In such a case, Cell A may be allocated 20% of the UL subframes and Cell B may be allocated 80% of the UL subframes. As a result, Cell A may transmit DL data to the in 80% of subframes, while the WTRU would transmit in the UL to Cell A in 20% of subframes. The FDD HARQ procedures and timing (e.g., transmitting HARQ-ACK in subframe(n+k), where k=4 for DL data in subframe(n)) may be unworkable in such a case.

In an example, a WTRU may be configured to receive PDSCH from both MAC instances (e.g., receive PDSCH transmission from multiple serving sites) in each subframe, while UL transmissions for the corresponding MAC instances may occur in separate sets of subframes. For example, the WTRU may be configured to transmit using a first MAC instance in subframes 0, 1, 2, 3 and/or 4 of each frame and to transmit using a second MAC instance in subframes 5, 6, 7, 8, and/or 9 of each frame. If the PDSCH may be received in any subframe but the uplink transmission path is limited to a subset of subframes, then the timing relationship between PDSCH and the transmission of corresponding HARQ-ACK may be defined in a number of ways. For example, for the first MAC instance, HARQ-ACK for PDSCH received in subframes 1 and/or 2 may be reported in subframe 0 of the next frame, HARQ-ACK for PDSCH received in subframes 3 and/or 4 may be reported in subframe 1 of the next frame, HARQ-ACK for PDSCH received in subframes 5 and/or 6 may be reported in subframe 2 of the next frame, HARQ-ACK for PDSCH received in subframes 7 and/or 8 may be reported in subframe 3 of the next frame, HARQ-ACK for PDSCH received in subframe 9 and/or subframe 0 of the next frame may be reported in subframe 4 of the next frame. In this example, the HARQ timing rules may be defined such that the time delay between PDSCH and the corresponding HARQ-ACK is at least at least 4 subframes, but the value of the time delay may vary according to the subframe in which PDSCH is received. To ensure that continuous transmission of PDSCH transmission without stalling the transmissions due to lack of HARQ acknowledgements, the maximum number of HARQ processes may be increased from 8 to a higher number, such as 12. This may be enabled by increasing the size of the HARQ process fields, in the downlink control information from 3 bits to 4 bits.

The WTRU may thus be configured to use a different subframe offset for HARQ-ACK for different subframe subset configurations. For example, the WTRU may be preconfigured with multiple different value of k that may be used for determining the subframe(n+k) that is used for transmitting HARQ-ACK to a serving site that transmitted a DL transmission in subframe(n). Which value of k should be used for a given DL transmission may be dynamically indicated in the DCI that includes the downlink assignment for subframe(n). In an example, the WTRU may be configured to transmit the HARQ-ACK in any valid UL subframe (e.g., the first valid UL subframe) on or after subframe(n+k).

In an example, a WTRU may be preconfigured with a set of multiple values for k, and each DL subframe may be associated with a corresponding (e.g., semi-statically configured) value for k. For example, subframe(0) of a frame may use a first value for k that results in a valid UL subframe for transmitting HARQ-ACK, while subframe(1) of a frame may use a second value for k that results in a valid UL subframe for transmitting HARQ-ACK, etc. In an example, for each DL subframe a different set of PUCCH resources may be used. For example, the WTRU may be preconfigured with a set of PUCCH resources (e.g., $N_{PUCCH}^{(1)}$) that are specific to a given DL subframe.

In an example, the value of $N_{PUCCH}^{(1)}$ used for a given subframe may be tied and/or otherwise mapped to the value of k used. For example, if for a DL transmission in subframe (n) the WTRU is configured to send HARQ-ACK in a valid UL subframe corresponding to subframe(n+k) or later, the actual offset between subframe(n) and the HARQ-ACK subframe may be used to determine the identity of the specific PUCCH resources utilized in the subframe (e.g., mapped to the value of $N_{PUCCH}^{(1)}$ that is used).

In an example, a WTRU may be configured with different and/or independent values of k for each serving site. For example, the WTRU may transmit HARQ-ACK for a DL transmission received in subframe(n) from serving site i in subframe(n+$k_i$). The WTRU may transmit HARQ-ACK for a DL transmission received in subframe(m) from serving site j in subframe(m+$k_j$). Each serving site may configure the WTRU with one or more values of $k_i$ for example different values of $k_i$ that may be used for different subframes.

In an example, the WTRU may report HARQ-ACK feedback in subframe(n+4). However, in determining which UL subframe corresponds to subframe(n+4), the WTRU may count valid UL subframes for the serving site to which the HARQ-ACK transmission is sent, not UL subframes that are not configured in the subset for the serving site that transmitted the DL data.

Depending on the HARQ timing utilized at a given serving site and the configuration of the subframe subsets, situations may arise where the WTRU is configured to transmit multiple HARQ-ACKs in the same subframe. If the different HARQ feedback transmissions are being sent to different serving sites, the WTRU may be configured to drop all but one HARQ-ACK transmission (e.g., and transmit the undropped HARQ feedback in the determined subframe), while transmitting the dropped HARQ feedback value(s) in the next allowed subframe(s). Which HARQ feedback should be dropped in a given subframe is to be dropped may be determined based on a priority ranking. The priority ranking may be preconfigured and/or may be determined based on a characteristic of the DL data included in the transmission for which the HARQ feedback is being sent. For example, the priority ranking may be based on one or more of the identity of the bearer associated with the DL transmission, the message type of the DL transmission, the amount/number of subframes since the data was originally transmitted, and/or the like.

When transmitting the HARQ feedback, the WTRU may include a bit field to indicate whether or not HARQ-ACK was dropped in order to accommodate the current HARQ feedback transmission. Further, a HARQ-ACK may be identified with an index to indicate if it was to be delivered in another subframe but was dropped (e.g., for example due to lower priority).

In an example, a WTRU may be configured to bundle HARQ-ACKs to be transmitted. For example, ACK-NACK bundling similar to those used for TDD HARQ operation may be used for a time segregation multi-serving site FDD operation. In an example, multiplexing of HARQ-ACKs may be used in the case of a collision between multiple HARQ-ACKs in the same subframe.

In an example, a first HARQ-ACK to be transmitted in a given subframe may be sent using a first set of PUCCH resources, while a second HARQ-ACK to be transmitted in the given subframe may be sent using a second set of PUCCH resources. The determination of which HARQ-ACK should be assigned to a given PUCCH resource may be preconfigured and/or may be determined based on a priority rule. For example, the priority may be based on which PDSCH transmission was received first in time by the WTRU. In an example, if a single HARQ-ACK is to be transmitted in a given subframe then the a single HARQ-ACK may be sent using a first set of PUCCH resources, and if two or more HARQ-ACKs are to be sent in the subframe, the two or more HARQ-ACKs may be bundled or multiplexed that are sent using another set of PUCCH resources. In an example, the number of PUCCH resources included in a bundle may be used to determine which PUCCH resource should be used. For example, one HARQ-ACK (e.g., unbundled) may be sent using a first set of PUCCH resources, two bundled HARQ-ACKs may be sent using a second set of PUCCH resources, three bundled or multiplexed HARQ-ACKs may use a third set of PUCCH resources, and so on.

In an example where there may be overlap of UL subframes to multiple different serving sites, multiple HARQ-ACKs to different sites may be configured to be transmitted in the same subframe. If the WTRU determines that HARQ feedback is scheduled to be transmitted to multiple serving sites in the same UL subframe, the WTRU may use a priority rule to determine a single HARQ-ACK to transmit while other HARQ feedback may be dropped for that subframe. The priority rule may be preconfigured and/or may depend on the identity of the serving site that transmitted the DL data. In an example, the HARQ-ACKs for multiple serving sites may be bundled or multiplexed and sent to a single serving site. For example, each HARQ-ACK may have an identifier to indicate for which serving site the HARQ information is applicable to.

In an example, the WTRU may be configured to report Power Headroom (PH) and/or other power-related information such that the transmissions to different serving sites may be taken into consideration for power control procedures implemented by the different serving sites. For example, the WTRU may be configured to send one or more power headroom reports (PHRs) to a serving cell of a given serving site/layer that includes PH information for that serving site layer as well as PH information related to transmission to a different serving site at a different serving site/layer.

For example, if the WTRU is transmitting a PHR that includes information related to multi-layer operation, the PH and/or power-related information included in the PHR may be applicable to the subframe during which a transport block that includes the report is transmitted. The PHR may be generated taking into consideration any actual transmission that is performed in the concerned subframe. The PHR may be generated taking into consideration one or more hypothetical (and/or virtual) transmissions that could have been performed in the concerned subframe. For example, a PHR may be generated by the WTRU taking into consideration a UL transmission that may have been sent to an activated serving cell for another serving site even if such a transmission was not actually sent in the subframe. If the transmission is not actually sent, then the WTRU may use a predefined set of transmission parameters for a hypothetical power usage determination and/or may use the transmission parameters that correspond to the last transmission performed for the concerned PUSCH. If a previous transmission has not yet occurred since the other cell was activated, the WTRU may determine to not include a virtual transmission for such a PUSCH in the report and/or use a predefined set of parameters for estimating power information related to a hypothetical PUSCH transmission.

In an example, the PH and/or power-related information included in the report may be applicable to WTRU operation in one or more subframe(s). For example, the PH and/or power-related information included in the report may be applicable to the subframe in which the PH report is transmitted to the serving cell of a given serving site/layer. For example, sf0 may be used to represent the subframe during which the report is transmitted. In an example, rather than or in addition to the PH and/or power-related information included in the report being applicable to subframe sf0, the PH and/or power-related information included in the report may be applicable to last subframe before or at subframe sf0 that satisfied one or more conditions. For example, the PH and/or power-related information included in the report may be applicable to last subframe before or at subframe sf0 that was available for UL transmission to a second (e.g., different) serving site/layer. In an example, the PH and/or power-related information included in the report may be applicable to last subframe before or at subframe sf0 that was available for UL transmission to both the first serving site/layer (e.g., the serving site/layer to which the report is being sent) and a second (e.g., different) serving site/layer. In an example, the PH and/or power-related information included in the report may be applicable to a subframe in which a PUCCH transmission took place a second (e.g., different) serving site/layer (e.g., possibly for PH type 2, but not other PH types). In an example, the PH and/or power-related information included in the report may be applicable to a subframe during which a PUSCH transmission was sent to a second (e.g., different) serving site/layer (e.g., possibly for PH type 1, but not other PH types). In an example, the PH and/or power-related information included in the report may be applicable to a subframe during which UL transmissions to both the first serving site/layer (e.g., the serving site/layer to which the report is being sent) and a second (e.g., different) serving site/layer actually took place. The PH and/or power-related information included in the report may be applicable to the last N subframe(s) before or at subframe sf0 that satisfied one or more of conditions such as those described above, where the number of subframes N may be predefined and/or configured by higher layers. The PH and/or power-related information included in the report may be applicable to the set of subframes within a period (e.g., scheduling period) ending before or at subframe sf0 that satisfy one or more conditions such as those disclosed above.

If the number of subframes satisfying the criteria used for triggering a PHR is more than one, the value of the PH to be reported by may be determined as an average (e.g., linear or dB) of the PH values obtained from the individual subframes. In an example, rather than or in addition to indicating the average value of the PH values for subframes that satisfied the reporting criteria, the WTRU may report a maximum PH value for the two or more subframes and/or a minimum value for the two or more subframes. In an example, the WTRU may use one or more of an average value, a maximum value, and/or minimum value of the PUSCH power and/or PUCCH power used in each subframe for which the reporting condition was satisfied when determining the PH and/or power-related information to include in the report. By using one or more of an average value, a maximum value, and/or minimum value of the PUSCH power and/or PUCCH power used in each subframe for which the reporting condition was satisfied when determining the PH and/or power-related information to include in the report, the scheduling entity in a given serving site to use the information to make scheduling decisions taking into account the possibility that the scheduling entity in the other serving sites may schedule a transmission in the same subframe, even if the PHR was scheduled in a subframe in which transmission from a single layer took place.

In an example, the PH and/or power-related information included in the report sent to a serving cell of a given layer/serving site may include a type 1 PH and/or type 2 PH determined for the serving cell assuming transmissions(s) to the serving cell to which the report is sent without accounting for transmissions to serving cells located at other serving sites (e.g., using legacy PH determination methods). In an example, the PH and/or power-related information included in the report sent to a serving cell of a given layer/serving site may include the total transmission power on all serving cells of a given layer (e.g., $P_{ltot,1}$). In an example, the PH and/or power-related information included in the report sent to a serving cell of a given layer/serving site may include a PH that is determined for a given layer taking into account transmissions from all serving cells (and/or activated serving cells) of the layer. For example, the PH and/or power-related information included in the report may include a ratio and/or difference in dB between a total configured maximum output power for the WTRU (e.g. $P_{cmax}$) and the total transmission power on all serving cells of a given layer (e.g., $P_{ltot,1}$). The PH and/or power-related information included in the report may include a ratio and/or difference in dB between a total configured maximum output power for a given layer (e.g., $P_{lmax,1}$) and the total transmission power on all serving cells of a given layer (e.g., $P_{ltot,1}$).

In an example, the PH and/or power-related information included in the report may include a new type of PH information determined for a serving cell of a first serving site/layer taking into account transmissions sent to a second serving site/layer. For example, a modified type 1 (and/or type 2) PH may be determined based on an adjusted value of the configured WTRU transmit power in subframe i for serving cell c that takes into account a possible reduction of available power in the first layer due to potential and/or actual transmissions in the second layer ($P^a_{cmax,c(i)}$, for rather than the using the total configured WTRU transmit power in subframe i for serving cell c (e.g., $P_{cmax,c(i)}$). For example, the adjusted value $P^a_{cmax,c(i)}$ may be a minimum between the total configured WTRU transmit power in subframe i for serving cell c (e.g., $P_{cmax,c(i)}$) and the remaining available power for a layer in subframe I (e.g., $P_{avail,l(i)}$). The remaining available power for a given layer may be determined in linear units as $P\hat{}_{cmax}-P\hat{}_{ltot,m}$, where $P\hat{}_{cmax}$ may represent the total configured maximum output power for the WTRU (e.g., in linear units) and $P\hat{}_{ltot,m}$ may represent the total transmission power of each configured serving cells of a second layer m (and/or on all layers m other than first layer in case more than two layers are configured). The value of total transmission power of each configured serving cells of a second layer m (e.g., $P\hat{}_{ltot,m}$) may be determined using one or more different methods. For example, the value of total transmission power of each configured serving cells of a second layer m (e.g., $P\hat{}_{ltot,m}$) may be determined as the sum (e.g., in linear units) of each actual transmission on each of the configured serving cells of layer m. In an example, the value of total transmission power of each configured serving cells of a second layer m (e.g., $P\hat{}_{ltot,m}$) may be determined the sum of all actual and/or potential transmissions on each activated serving cell of layer m. In making the determination, a potential (and/or virtual) transmission of PUSCH and/or PUCCH (e.g., possibly according to predetermined parameters) may be assumed if an actual transmission was not performed in subframe i for one or more serving cells of layer m. In an example, the value of total transmission power of each configured serving cells of a second layer m (e.g., $P\hat{}_{ltot,m}$) may be determined as the total configured maximum output power for layer m (e.g., $P\hat{}_{lmax,m}$ in linear units).

The WTRU may include PH information for each configured and/or activated MAC instance in a PHR transmitted to a specific serving site. In an example, the PH information may be reported for transmissions related to a PCell of each MAC instance, but not to SCells associated with the MAC instances.

In an example, the WTRU may be triggered to send PHRs to one or more serving sites based on various criteria. For example, the WTRU may be triggered to send a PHR to one or more serving sites based on one or more of MAC instance/layer activation, MAC instance/layer deactivation, applying power scaling to a transmission in a given layer, a QoS requirement not being met in a given layer, and/or the like.

For example, the WTRU may be triggered to send a PHR to one or more serving sites based on a MAC instance/layer being activated and/or deactivated. For example, the WTRU may trigger a PHR to be sent based on WTRU receiving control signaling that configures a MAC instance of the WTRU configuration. In an example, the WTRU may be triggered to send PHRs to one or more serving sites based on the WTRU removing a MAC instance that the WTRU was previously using and/or configured to use (e.g., following reception of control signaling deactivating the layer; the WTRU determining RLF for the concerned layer; other impairment events for the concerned layer; etc.). As an example, the WTRU may be triggered to send PHRs to one or more serving sites based on the WTRU receiving control signaling that activates a MAC instance of the WTRU configuration. In an example, the WTRU may be triggered to send PHRs to one or more serving sites based on the WTRU deactivating a MAC instance of the WTRU configuration. The deactivation may be based on reception of control signaling indicating the layer should be deactivate and/or following the expiration of a timer indicting deactivation (e.g., WTRU-autonomous deactivation). In an example, the WTRU may be triggered to send PHRs to one or more serving sites based on the WTRU receiving control signaling that schedules the first transmission for a concerned MAC instance after the concerned MAC instance was last configured and/or activated (e.g., the first PUSCH transmission). In an example, the WTRU may be triggered to send PHRs to one or more serving sites based on the WTRU receiving control signaling that schedules the first transmission for a MAC instance/layer since the WTRU last deactivated, removed, and/or otherwise invalidated one or more other MAC instances (e.g., the first scheduled PUSCH transmission).

In an example, the WTRU may be triggered to send PHRs to one or more serving sites based on applying power scaling to one or more transmissions to a given serving site/in a given layer. In an example, rather than or in addition to being triggered to send the PHR based on a single occurrence of power scaling, the determination of whether or not to trigger a PHR may be determined based on transmissions occurring over a given period (e.g., for a scheduling period and/or for a configured amount of time) during which power scaling has applied. For example, if the WTRU scales a certain number of consecutive transmissions and/or scales each transmission to a given serving site that occurs within a predetermined time period, the WTRU may determine to send one or more PHRs. In an example, the PHR may be triggered due power scaling on condition that the power scaling is applied to transmissions for a LCH and/or for a MAC instance of a priority higher than a given or configured threshold.

In an example, the WTRU may be triggered to send PHRs to one or more serving sites based on a QoS requirement (e.g., PBR, latency, etc.) not being met in a given layer. For example, the WTRU may be triggered to send PHRs to one or more serving sites based on the WTRU determining that a power limitation being applied in a given layer and/or the application of a power scaling function in a given layer precludes and/or otherwise restricts a WTRU from satisfying one or more QoS requirements of LCH and/or MAC instance. For example, the WTRU may determine that the application of the power scaling may prevent a QoS requirement such as a latency requirement and/or a PBR requirement from being met. In an example, rather than or in addition to being triggered to send the PHR based on a single occurrence of a QoS requirement not being met, the determination of whether or not to trigger a PHR may be determined based on transmissions occurring over a given period (e.g., for a scheduling period and/or for a configured amount of time) during which the QoS requirement was not met. Whether or not a QoS requirement is met may be determined for a given period, e.g., for a scheduling period and/or for a specific (possibly configured) amount of time.

For example, if the WTRU determines that a QoS requirement was not met for a number of consecutive transmissions and/or for transmissions occurring within a predetermined time period, the WTRU may determine to send one or more PHRs. In an example, the PHR may be triggered due a QoS requirement not being met on condition that the QoS requirement is applicable to transmissions for a LCH and/or for a MAC instance of a priority higher than a given or configured threshold.

Irrespective of the criteria that triggered PHR transmission, the PHR may be sent to the concerned serving site and/or one or more other active serving sites (e.g., on the resources of another MAC instance). The PHR may be provided to other serving sites such that schedulers at the different serving sites may determine from the received PHR(s) that the power conditions may have changed for the WTRU due to an event that occurred in another layer (e.g., controlled by a second scheduler). The PHR sent to the different serving sites may include common PHR information (e.g., information applicable to each of the serving sites), serving site specific PH information, and/or PH information applicable to other serving sites.

In an example, the WTRU may be configured to report a number of parameters related to Quality of Service (QoS) to one or more serving sites. Reports relating to QoS parameters for one or more serving sites may be referred to as QoS-related status reports (QSRs). From the network perspective, QSR reporting may be useful for a scheduler associated with a first layer in that the scheduler for the first layer may determine the impact (e.g., how well QoS is served) of the scheduling and/or radio quality experienced by the WTRU from another layer and/or from the combined transmission efforts of each of the layers utilized by the WTRU (e.g., including the first layer).

For example, a scheduler located at a first serving site corresponding to a primary layer may receive a QSR from a WTRU. The QSR may include information related to transmissions in the primary layer and/or transmission in other layers. The QSR may indicate that one or more QoS requirements are not being met for one or more DRBs configured for the WTRU. The scheduler in the primary layer (e.g., the scheduler for the first serving site) may determine that one or more action should be performed in order to ensure QoS requirements for the WTRU are being met. For example, if the DRB for which a given QoS requirement is not being met is associated with a secondary layer transmission (e.g., not with primary layer transmission), the scheduler located at a first serving site corresponding to a primary layer may implement one or more active queue management procedures such that the data rate of the application generating that data may be reduced in the WTRU (e.g., using explicit congestion notification (ECN) marking, by selectively dropping packets, etc.). In an example, if the DRB for which a given QoS requirement is not being met is associated with a secondary layer transmission (e.g., not with primary layer transmission), the scheduler located at a first serving site corresponding to a primary layer may trigger mobility-related measurements to be performed by the WTRU in the secondary layer. In an example, if the DRB for which a given QoS requirement is not being met is associated with a secondary layer transmission (e.g., not with primary layer transmission), the scheduler located at a first serving site corresponding to a primary layer may initiate mobility for the concerned DRB such that the DRB is moved to another layer (e.g., the primary layer). In an example, if the DRB for which a given QoS requirement is not being met is associated with a secondary layer transmission (e.g., not with primary layer transmission), the scheduler located at a first serving site corresponding to a primary layer may reconfigure the DRB such that multi-layer flow is supported for the logical channel served by the DRB such that the data for which the QoS requirement is not being meth may be sent using a one or more of plurality of layers. In an example, if the DRB for which a given QoS requirement is not being met is associated with a secondary layer transmission (e.g., not with primary layer transmission), the scheduler located at a first serving site corresponding to a primary layer may notify the MME/NAS such that the service may be reconfigured. As an example, if the DRB for which a given QoS requirement is not being met is associated is configured such that multi-flow is supported, rather than or in addition to performing one or more of the actions described with respect to a DRB mapped to a secondary layer, the scheduler located at a first serving site corresponding to a primary layer may allocate additional resources for the concerned DRB in the primary layer.

A QSR may contain a variety of QoS-related information. For example, a QSR may include a timing-related value such as a head of queue delay (e.g., QSR/Delay). For example, the QSR may include a value related to the time that data has spent in a WTRU buffer measured from an arrival time until a current time. For example, the arrival time may correspond to the time the data was first made available for transmission. The current time may correspond to the time when the report was triggered, the time when the corresponding MAC PDU was assembled, and/or the time when the corresponding MAC PDU was first transmitted. The timing related value included in the QSR may correspond to the maximum delay that may elapse before data in a WTRU buffer (e.g., a SDU or a PDU) should be transmitted. For example, the QSR may indicate the shortest value for the maximum delay that may elapse before data in a WTRU buffer (e.g., a SDU or a PDU) should be transmitted. For example, the time related value may correspond to a value associated with a PDCP DiscardTimer (e.g., for a given radio bearer). The WTRU may determine and report a value corresponding to the difference between DiscardTimer and the difference of the arrival time and the current time (e.g., report value=DiscardTimer−(Arrival Time−Current Time)). In an example, the QSR may include the time of stay in the WTRU buffer for the oldest data that is buffered for transmission.

The QSR may include one or more a transfer rate related values such as indications of PBR satisfaction (e.g., QSR/PBR). For example, the QSR may include an indication of whether or not the PBR is being met for one or more DRBs/logical channels for which the QSR is applicable. For example, the QSR may include an indication of failure to satisfy a PBR for one or more logical channels/DRBs and/or an indication of how much additional data would have to be transmitted (e.g., within a specified time period) in order to satisfy a given PBR. For example, the report may include an indication that the PBR one or more LCHs and/or an aggregated PBR for one or more LCGs has not been met. The WTRU may determine whether or not PBR dissatisfaction should be reported when the PBR has not been met for a specific (e.g., configurable) period of time. As an example, the QSR may include a value that corresponds to the minimum amount of data that would have to be transmitted for a given LCH/LCG in order for the WTRU to meet the corresponding PBR. The WTRU may include an indication of the identity of the LCH and/or the LCG for which a PBR is not being met in the QSR. In an example, the QSR may identify the LCH and/or LCG which includes the largest amount of data for which a PBR is not being met. When information for multiple LCHs and/or LCGs may be included in the same report, each reported item may be indicated in decreasing order of the size of the data for which the PBR is not being met and/or as an ordered list of the affected entities. The WTRU may determine whether or not a value should be reported indicating the amount by which the PBR requirement is not being met, for example based on the PBR not having been met for a specific (e.g., configurable) period of time.

The period of time over which the WTRU may perform the evaluation of whether QoS requirements are met for formulating QSRs may be a function of the length of a scheduling period, for example if the WTRU is configured such that multiple layers operate using different scheduling periods.

The contents of a QSR may be associated with and/or applicable to one or more radio bearers configured for the WTRU. For example, the QSR may be WTRU-specific and may include information that is applicable to a plurality (e.g., all) of the bearers configured for use by the WTRU. The QSR may be layer-specific and may include information that is applicable to a plurality (e.g., all) of the bearers associated with a specific MAC instance (e.g., with a secondary MAC instance). The QSR may be group-specific, for example reporting information for radio bearers that are configured as part of a LCG. For example, the QSR may include one value for each LCG included in the QSR. In an example, rather than or in addition to using logical channel groups, the QSR may group one or more logical channels or radio bearers in a different manner. A QSR may be priority-specific. For example, a given QSR may be associated with radio bearers corresponding to a specific priority level and/or radio bearers corresponding to a priority level equal to or above a configured threshold. A QSR may include a report for radio bearers (RBs) associated with and/or configured for multi-flow operation. For example, data from radio bearers associated with and/or configured for multi-flow operation may be transmitted on the radio resources of a plurality of MAC instances. A QSR may include a report for a specific type of RB, for example DRBs, SRBs, DRBs and SRBs, etc. In an example, the QSR sent by the WTRU may include one value for each instance of a specific reporting type (e.g., WTRU-specific, layer-specific, group-specific, priority-specific, multi-flow specific, type of RB-specific, etc.). For example, if the report is layer specific, a single QSR value may be reported for each layer. If the report is priority specific, a single QSR value may be reported for each priority.

The WTRU may be triggered to transmit a QSR based on detecting various criteria or conditions. For example, the WTRU may be configured to periodically generate and/or transmit a QSR. For example, the WTRU may be configured with a value for a QSR timer and may be triggered to transmit a QSR upon expiration of the timer. The timer may be started and/or restarted each time the QSR is triggered and/or transmitted. In an example, the WTRU may be configured to trigger a QSR based on one or more thresholds being exceeded. For example, a WTRU may be configured to generate and/or transmit a QSR based on one or more QoS parameters being below a certain threshold (e.g., the threshold may be a part of the WTRU configuration set by the network). For example, the WTRU may trigger a QSR that includes PBR information based on the PBR for one or more logical channels/logical channel groups falling below a threshold, which may be configured threshold. A QSR including PBR related information (e.g., QSR/PBR) may be triggered when PBR is not met and/or is below a threshold for a specified/configurable amount of time. In an example, the WTRU may be triggered to send a QSR that includes delay related information (e.g., QSR/Delay) when an acceptable delay for one or more items (e.g., LCH, LCG, etc.) falls below a specified/configured threshold. For example, a QSR may be transmitted for a given radio bearer based on the WTRU determining that the difference between a value of the DiscardTimer and (Arrival Time−Current Time) (e.g., as described above) becomes less than a threshold.

In an example, the WTRU may be triggered to generate and/or send a QSR based on determining that the radio link conditions have or are deteriorating below a specified/configured threshold. In an example, the WTRU may be triggered to generate and/or send a QSR based on determining that one or more RRC timers are running for a given MAC instance. For example, a QSR may be sent to a serving site for a MAC instance for which T301, T302, T304 and/or T311 is running. The QSR may be sent to the MAC instance for which the RRC timer(s) is running and/or to a different MAC instance. In an example, the QSR may be triggered based on the RRC timer(s) running in a secondary MAC instance (e.g., if the WTRU has an ongoing procedure related to connectivity, mobility and/or re-establishment in a secondary layer), but not for RRC timer(s) running in a primary MAC instance.

In an example, the WTRU may be triggered to generate and/or send a QSR based on receiving an aperiodic QSR request from one or more of the serving sites. The WTRU may be triggered to send a QSR upon request from the network, and the request may be included control signaling (e.g., a MAC CE) that requests such a report. The control signaling may be include in L1 signaling (e.g., as a flag in a DCI format) and/or in a MAC CE (e.g., as a flag in a MAC CE, possibly including an explicit indication of the radio bearers for which the QSR should be sent).

In an example, the WTRU may be triggered to generate and/or send a QSR based on reception of control signaling that deactivates a MAC instance (e.g., upon deactivation of a secondary MAC instance). For example, the QSR may be generated based on a MAC instance being deactivated while there is still some data in the WTRU buffer(s) for the deactivated MAC instance. In an example, the QSR may be triggered if the WTRU has data buffered for a LCH/LCG associated with the deactivated MAC instance that is not mapped to any other layers. Such a QSR may be a trigger for radio bearer mobility for radio bearers of the deactivated MAC instance. In an example, the WTRU may be triggered to generate and/or send a QSR for multi-flow bearers (e.g., bearers mapped to multiple MAC instances/layers) that were utilized by a deactivate MAC instance. Such a QSR may be used to make scheduling adjustments due to the change of available resources for a given WTRU.

In an example, the WTRU may be triggered to generate and/or send a QSR based on reception of control signaling that activates a MAC instance (e.g., upon activation of a secondary MAC instance). For example, upon activation of a MAC instance, the WTRU may determine that it has data buffered for transmission and may send the QSR in order to trigger bearer mobility to the newly activated MAC instance. In an example, the WTRU may be triggered to generate and/or send a QSR based on a BSR being triggered.

In an example, if the WTRU determines that a given MAC instance is no longer suitable for meeting one or more QoS requirements of a multi-flow bearer (e.g., due to deactivation, deteriorating radio link quality, RLF, RLM, reset and/or removal of the MAC instance, etc.), the WTRU may trigger a QSR in one or more other layers mapped to the multi-flow bearer in order to be scheduled such that the QoS requirements may be satisfied using the resources of other layer(s).

For example, if the WTRU determines that a MAC instance has become a potential candidate for improving the QoS of a multi-flow bearer (e.g., due to activation, improving radio link quality, configuration of the MAC instance, etc.), the WTRU may trigger a QSR to that MAC instance such that the MAC instance may be scheduled for that bearer. The WTRU may include a QSR report (e.g., a short version of a QSR report) instead of padding (e.g., which may have a lower priority than a padding BSR), if a QSR report may fit in a given transport block.

One or more triggers for sending QSRs may be subject to a backoff and/or prohibit mechanism (e.g., that prevents the QSR from being sent unless various other criteria are met), such as a timer. For example, if a backoff timer is running when the QSR is generated, the QSR may not be sent until the timer has expired. The value used and/or the identity of the backoff and/or prohibit mechanism may be configured on WTRU-specific basis, a layer-specific basis, a group-specific basis, a priority-specific basis, a multi-flow specific basis, a type of RB-specific basis, and/or the like. When a QSR is triggered, the WTRU may start a timer and may be prohibited from triggering additional QSR until the timer has expired.

The WTRU may trigger a Scheduling Request (SR) when it triggers a QSR. For example, the SR may be triggered for the MAC instance and/or instances for which the QSR is applicable. As an example, the WTRU may trigger a SR according to which MAC instance may be used to transmit the data that triggered the QSR. For example, the resource (e.g., PUCCH, PRACH, etc.) and/or method (e.g., D-SR, RA-SR, etc.) used for the SR may be selected as a function of the MAC instance associated with the SR transmission and/or QSR transmission (e.g., the MAC for a specific layer if multi-flow is not supported for the concerned RB, otherwise either MAC instance).

In an example, when a QSR report is triggered, it may be pending until it is cancelled. The QSR report may be pending for a specific layer and/or for multiple layers. A QSR report may be cancelled based on the occurrence of one or more events. For example, the WTRU may cancel a pending and/or triggered QSR based on the QSR being included in a MAC PDU for transmission on a transport block. In an example, the WTRU may cancel a pending and/or triggered QSR based on the criteria that triggered QSR to be sent no longer being met. For example, the WTRU may cancel a pending QSR/Delay report if the corresponding data is no longer in the WTRU buffer (e.g., the data was included in a transport block for transmission; the data has been discarded, etc.). F In an example, the WTRU may cancel a pending and/or triggered QSR based on a sufficient amount of data from buffer associated with the QSR (e.g., LCH and/or LCG) being include in transport block for transmission. In another example, the WTRU may cancel all pending and/or triggered QSRs for a MAC instance based on the concerned MAC instance being reset, deactivated, and/or removed from the WTRU configuration. For example, the WTRU may cancel a QSR to be transmitted to a given serving site for a given DRB based on the upon radio bearer mobility that moves the DRB to another layer. In an example, the WTRU may cancel a pending and/or triggered QSR based on a MAC instance associated with the corresponding reporting item being activated (e.g., in case activation may be in response to improvement of the QoS of the WTRU). In an example, the WTRU may cancel all pending (and/or triggered) QSR to be transmitted for a given MAC instance based on the WTRU receiving a reconfiguration of the concerned MAC instance that modifies and/or removes the radio bearer or bearers that triggered the QSR (e.g., upon radio bearer mobility that moves the bearers to another layer or that reconfigures the corresponding QoS parameters).

When a QSR is pending, the QSR may be transmitted when a transport block satisfies the requirement for the QSR transmission. The WTRU may evaluate the above canceling criteria by including the impact of a transport block to be transmitted up to and including those of the subframe in which the concerned QSR would have been transmitted. In an example, the WTRU may cancel a pending SR that was triggered by a QSR, if the QSR for the concerned SR is cancelled.

In an example, a QSR may be reported using specific resources from one or more layers of the WTRU configuration. The selection of which MAC instance may transfer QSR may be indicated in a received configuration for a given bearer and or a received configuration for a given MAC instance. In an example, the selection of which MAC instance is to be used for transmitting a QSR may be based on one or more of whether the QSR is layer specific, whether a transport block is being delivered to a primary layer, and/or whether the QSR is to be duplicated across multiple layers. For example, a QSR may be reported in a transport block associated with a layer for which the information included in the QSR is applicable. As in example, the QSR may include information associated with a specific DRB, and the QSR may be transmitted to the layer mapped to the concerned DRB. In an example, QSRs may be reported in a transport block associated with a primary layer (e.g., with a layer used for connectivity that may be associated with a MeNB), but not in a secondary layer. As another example, when triggered, a QSR may be duplicated such that it may be included in at least one transport block associated with each layer to which the QSR is applicable.

In an example, Buffer Status Reporting (BSR) may include the triggering of a BSR and/or determination of the contents of the concerned BSR. The WTRU may determine whether or not a BSR should be triggered based on one or more criteria. For example, the WTRU may evaluate the criteria for triggering a BSR by applying the criteria to a subset of logical channels (LCHs) and/or LCH groups (LCGs). For example, the WTRU may receive a configuration for a LCH and/or a LCG that includes an association with the subset of LCHs and/or LCGs. A LCH may be associated with a plurality of subsets (e.g., by being configured such that it may be associated with more than one LCG). In an example, the WTRU may evaluate the criteria for triggering a BSR on a per MAC instance and/or layer-specific basis (e.g., by applying the criteria to the set of LCH(s) and/or LCGs of a given MAC instance).

The WTRU may be configured with a DRB such that multi-flow operation is supported for the corresponding DRB. For example, multi-flow may be achieved by configuring a DRB with a LCH that is mapped to a plurality of MAC instances. In an example, multi-flow may be achieved by configuring one DRB for a given EPS bearer, and one DRB for each concerned MAC instance. The DRB may then be grouped with one or more other DRB such that a plurality of DRB configurations are associated with a LCG, where the LCG may in turn be associated with the corresponding plurality of MAC instances.

A BSR may be triggered if a QoS requirement of a LCH and/or a LCG is not met (e.g., PBR, or latency/delay etc.). In an example, a BSR may be triggered for a LCH/LCG configured for multi-flow operation, but not for single flow LCH/LCG.

When a BSR is triggered, the WTRU may trigger a SR on the MAC instance to be used to transmit the data that triggered the BSR. For example, the resource (e.g., PUCCH, PRACH, etc.) and/or method (e.g., D-SR, RA-SR, etc.) used to send the SR may be selected as a function of the MAC applicable for such transmission. A BSR may be extended to include one or more QSR values. For example, for each LCH/LCG reported in a BSR, the WTRU may include a value for a QSR applicable to the reported LCH/LCG.

The WTRU may duplicate a BSR if the BSR includes a report for at least one radio bearer for which multi-flow is configured. For example, if a radio bearer is a multi-flow bearer, a BSR is transmitted on each layer that is applicable to the concerned multi-flow bearer.

In an example, the WTRU may perform logical channel prioritization (LCP) as a function of a priority association between different layers (e.g., different serving sites, different schedulers, different MAC instance, etc.). When a LCH is configured for multi-flow operation, the LCH may be associated with and/or may be allocated resources of a plurality of MAC instances (e.g., may be scheduled resources on different layers). In order to account for multi-layer transmission, a logical channel prioritization procedure may involve applying prioritization rules across a plurality of MAC instances. For example, a PBR and/or a logical channel priority for a given LCH may be assigned on a per layer basis (e.g., the PBR and/or logical channel priority for a multi-flow bearer may be different for different MAC instances). The PBR and/or logical channel priority of a given logical channel may be associated with WTRU-specific maximum values (e.g., although PBR/logical channel priority may be layer specific, the values for the PBR/logical channel priority may not exceed the corresponding WTRU-specific maximum in any of the layers). Data from a multi-flow LCH may contend for resources in any layer for which the multi-flow LCH is configured. When allocating resources of a transport block for transmissions, the WTRU may allocate resources to one or more logical channels in priority order up to the configured PBR(s) for the logical channels. If the PBR for each of the logical channels is satisfied and there are remaining resources in the transport block for a MAC instance, the LCHs with remaining data buffered for transmission may be served in strict priority order until the transport block is full or there is no remaining data for any of the logical channels. Such PBR and/or priority rules may be layer-specific, and a given multi-flow LCH may have the same or a different configuration (e.g., PBR, priority, etc.) for each layer. As an example, the PBR for a given LCH (e.g., a multi-flow logical channel mapped to a plurality of MAC instances) may be capped across the plurality of layers associated with the logical channel. Rather than or in addition to a WTRU-wide PBR cap for a multi-flow logical channel, the logical channel may also be configured with layer-specific PBR(s) that may cap the prioritized transmissions for the logical channel on a specific MAC instance.

Data from a multi-flow LCH may contend for resources in one or more applicable layers. The WTRU may allocate resources of a transport block to the LCH up to the configured PBR (e.g., a layer specific PBR and/or a WTRU-wide PBR). If a given PBR is WTRU-specific or WTRU-wide (e.g., the PBR may be applicable to any MAC instance and/or may be decremented when the logical channel is served resources by any of the MAC instances), if the WTRU-specific PBR is satisfied in using a subset of the layers to which the LCH is mapped, the LCH may not be allowed to contend for resources in the remaining layers (e.g., even if a layer-specific PBR has not been met) until the PBRs for other logical channels have also been satisfied. However, even if the WTRU-specific PBR has been reached, if for a certain MAC instance the PBR of each of the logical channels served by the MAC instance has been satisfied (e.g., no other LCH for the concerned layer has bj>0), if resources remain in the transport block for the layer, the logical channel may be served additional resources in excess of its WTRU-specific PBR even though the WTRU-specific PBR of other logical channels has not yet been reached (e.g., the logical channels whose WTRU-specific PBR has not yet been satisfied may not be mapped to the MAC instance with remaining resources in the transport block).

As an example, a change in the state of a MAC instance may trigger one or more changes to the logical channel prioritization configuration for a multi-flow LCH served by that MAC instance. For example, data from a multi-flow LCH may contend for resources in one or more layers. When first serving the plurality of logical channels for a newly formed transport block, the WTRU may allocate resources to the multi-flow LCH up to its configured PBR, which may include a WTRU-specific PBR for the LCH and/or a plurality of layer-specific PBRs (e.g., the WTRU may serve the logical channel based on a sum of a number of aggregated PBR configurations). However, during certain periods one or more of the layers that may be unavailable, for example due to the state of the associated MAC instance (e.g., the MAC instance may be in a deactivated state, the MAC instance may be in an impaired state due to poor radio conditions, etc.). In such a scenario, the WTRU may be configured to trigger a QSR/PBR for one or more logical channels mapped to a layer for which the state change has occurred. The logical channel may be reconfigured in order to provide additional resources on other layers since the logical channel may be inadequately served on the layer on which the MAC instance state change occurred. While this may starve other LCHs of lesser priority for the layers over which the logical channel was reconfigured (e.g., priority and/or PBR was increased), the scheduler for the concerned MAC instance may also reconfigure one or more other logical channels to taken into account changes to the logical channel configuration of the multi-flow bearer/LCH.

As an example, the state of a MAC instance for the purposes of logical channel configuration may be determined based on the activation state of the MAC instance and/or based on the radio link conditions being experienced by the MAC instance. For example, a MAC instance may be unavailable when either the MAC instance is deactivated and/or all of the serving cells of the MAC instance are deactivated. A MAC instance may be considered deactivated based on one or more of the radio link conditions being below a given threshold, detecting radio link problems during a radio link monitoring procedure, determining that the estimated pathloss exceeds a given threshold, determining that one or more cells associated with the concerned MAC instance is experiencing RLF (e.g., one of or more of UL RLF and/or DL RLF), determining that RRC timer T310 is running, determining that one or more of RRC timer T301, T302, T304, and/or T311 is running, and/or the like. In an example, rather than consideration each of the cells of the MAC instance to determine if the MAC instance is deactivated, the WTRU may consider the primary MAC instance.

From the network perspective, layer-specific priority allocation for a multi-flow LCHs enable the network to have some form of control over which layer is used first for transmitting data for a corresponding LCH. For example, a layer-specific PBR may enable the network to split the burden of meeting the QoS requirements between a plurality of layers, which may assist the network in allocating sufficient resources for the multi-flow bearer without having to starve one or more other bearers/LCHs that are also served by the layers associated with the multi-flow logical channel.

In an example, when a new transmission is performed, the WTRU may determine an order of use for resources available on multiple layers. For example, the WTRU may assign an order for assigning data of a logical channel to transport blocks for transmission to over a given layer in a given time interval. For example, the time interval may be one of a TTI/subframe, a scheduling period (e.g., multiple subframes), and/or some other predefined period of time. In this manner, a priority may be applied to the different transport blocks of different layers such that a higher priority transport block/layer may be served with data of a given multi-flow logical channel before data of the multi-flow logical channel is served to a transport block of another, lower priority layer.

When there are transport block resources available to the WTRU in a multiple of layers, the WTRU may first allocate resources of a layer with higher priority (e.g., a primary layer) during the logical channel prioritization process. When all resources of the layer with highest priority have been allocated, the WTRU may allocate resources of other layers (e.g., a secondary layer) in decreasing priority (e.g., with equal priority layers being served concurrently). When the WTRU is allocates resources of a given layer of higher priority, the logical channel prioritization procedure may be performed first for the transport block of the layer, and when the logical channel prioritization procedure for that logical channel is complete, the WTRU may perform the logical channel prioritization for a lower priority layer with a transport block available for transmission. For example, consider the scenario where a WTRU is configured for use in a primary layer (e.g., a serving site associated with a MeNB) and a secondary layer (e.g., a serving site associated with a SCeNB). The primary layer may have a higher priority for purposes of logical channel prioritization than the secondary layer (or vice versa). In a scheduling period (e.g., subframe) during which both the primary layer and secondary layer have a transport block scheduled for transmission, the WTRU may determine to first fill the transport block of the primary layer, followed by the transport block of the secondary layer.

For example, the WTRU may first serve each of the logical channels that are mapped to the primary layer up to their configured PBR (e.g., a WTRU-specific PBR and/or a layer-specific PBR) in order of logical channel priority. If there is remaining space in the transport block after each of the logical channels mapped to the primary layer have been served up to their configured PBR (e.g., a WTRU-specific PBR and/or a layer-specific PBR), the logical channels mapped to the primary layer may be served in strict priority order until all their data has been served. Once the transport block for the primary layer is filled, the WTRU may begin serving data to the transport block of the secondary layer. For example, the WTRU may first serve each of the logical channels that are mapped to the secondary layer up to their configured PBR (e.g., a WTRU-specific PBR and/or a layer-specific PBR) in order of logical channel priority. One or more of these logical channels may be multi-flow logical channels that were also served transmission resources in the transport block of the primary layer. If there is remaining space in the transport block after each of the logical channels mapped to the secondary layer have been served up to their configured PBR (e.g., a WTRU-specific PBR and/or a layer-specific PBR), the logical channels mapped to the secondary layer may be served in strict priority order until all their data has been served to the transport block of the secondary layer.

In an example, the WTRU may be configured to first allocate resources to the LCHs that are associated solely to a single MAC instance prior to serving a multi-flow logic channel when filling a transport block of the single MAC instance.

In an example, the WTRU may be configured with a first configuration (e.g., a layer-specific configuration) for performing logical channel prioritization. The first configuration (e.g., a layer-specific configuration) may include one or more of a PBR configuration (e.g., prioritizedBitRate, bucketSizeDuration, etc.), a priority for a one or more radio bearer and/or logical channel (LCH), and/or the like. For example, the first configuration may be received for a LCH that is configured for multi-flow operation.

When the WTRU is configured with such first configuration, the WTRU may allocate resources to the logical channel by performing logical channel prioritization for resources of each layer according to a specific order, (e.g., a priority order). In an example, the WTRU may perform logical channel prioritization independently for each layer, such that LCHs configured for operation using a single layer may be served according to legacy LCP procedures. Multi-flow LCHs may be configured with a layer specific PBR configuration such that the multi-flow channel is considered a single flow logical channel in a given layer when applying the layer-specific PRB configuration for that layer to the logical channel for purposes of logical channel prioritization.

Rather than or in addition to the first configuration, the WTRU may be configured with a second configuration (e.g., a WTRU-specific configuration) that may include a PBR configuration and/or a priority for one or more radio bearers and/or logical channels. The second configuration may be applicable to multi-flow logical channels and may be used to define PBR rules for logical channels that may be served by multiple layers. The second configuration may be in addition to a first configuration or by itself as the entire configuration for the LCH.

When the WTRU is configured with a second, WTRU-specific logical channel configuration, the WTRU may allocate resources to the logical channel by performing logical channel prioritization for resources of each layer according to a specific order (e.g., serve highest priority layer first, next highest second, etc.). The WTRU may perform logical channel prioritization for each layer such that LCHs configured for operation using a single layer may be treated according to the legacy LCP procedure. In an example, a LCH configured for multi-flow operation may be considered for once per scheduling instance, and once the WTRU has been allocated resources in a single (e.g., highest priority) layer according to its second configuration, the multi-flow logical channel may not be considered for transmission in the secondary layer. In an example, a LCH configured for multi-flow operation may be allowed to utilize the resources of multiple layers in a given scheduling period, provided the second configuration is applied across the plurality of layers.

In an example, the WTRU may receive downlink control signaling (e.g., such as DCI on the E-PDCCH and/or the PDCCH) that instructs the WTRU to assign the corresponding grant to a specific subset of LCHs. For example, the received DCI may include an indication such that the received grant may be used for transmission of data from one or more of a specific LCH(s) (e.g., based on bearer identity), a specific bearer type (e.g., SRB), a specific priority (e.g., such as a WTRU-specific LCH priority), and/or the like.

In an example, the WTRU may determine that it has not received (e.g., successfully decoded) downlink control signaling for a control channel (e.g., PDCCH, ePDCCH, etc.) applicable to a certain MAC instance for a certain period of time. In an example, the WTRU may override one or more logical channel prioritization rules based on determining that one or layers have not been scheduled and/or one or more logical channels have not been allocated resources for a predetermined period of time. For example, when the WTRU determines that it has not received a DCI of a specific type such as a grant (e.g., a DCI for an allocation of uplink resources for transmission in the concerned MAC) during the said period of time, the WTRU may determine to override one or more logical channel periodization rules. The LCH prioritization may be overridden based on the WTRU failing to receive any DCI on a concerned MAC instance for a specified period of time. In such a case, the WTRU may determine that the concerned MAC instance is no longer applicable for the LCP process. For example, the WTRU may perform LCP assuming the concerned MAC instance is in a deactivated state.

Although features and elements are described above in particular combinations, one of ordinary skill in the art will appreciate that each feature or element can be used alone or in any combination with the other features and elements. In addition, the methods described herein may be implemented in a computer program, software, or firmware incorporated in a computer-readable medium for execution by a computer or processor. Examples of computer-readable media include electronic signals (transmitted over wired or wireless connections) and computer-readable storage media. Examples of computer-readable storage media include, but are not limited to, a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs). A processor in association with software may be used to implement a radio frequency transceiver for use in a WTRU, UE, terminal, base station, RNC, or any host computer.

What is claimed:

1. A method for providing physical layer resources to a plurality of medium access control (MAC) instances, the method comprising:
a wireless transmit receive unit (WTRU) utilizing a first physical layer configuration for sending a first transmission to a first serving site in accordance with a first uplink grant received from the first serving site, a first MAC instance being associated with a first group of one or more cells served by the first serving site;
the WTRU utilizing a second physical layer configuration for sending a second transmission to a second serving site in accordance with a second uplink grant received from the second serving site, a second MAC instance being associated with a second group of one or more cells served by the second serving site; and
the WTRU allocating at least a portion of transmission power between the first transmission associated with the first MAC instance sent to the first serving site and the second transmission associated with the second MAC instance sent to the second serving site based on tiered priority rules, wherein a first tier priority rule comprises prioritizing transmissions that include uplink control information (UCI) over transmissions that do not include UCI, a second tier priority rule comprises prioritizing transmissions including a first type of UCI over transmissions including a second type of UCI, and a third tier priority rule comprises prioritizing transmissions associated with cells corresponding to a primary MAC instance over transmissions associated with cells corresponding to a secondary MAC instance.

2. The method as in claim 1, wherein the first transmission includes the first type of UCI, the second transmission includes the second type of UCI, and the first transmission is given a higher priority when allocating at least the portion of the transmission power between the first transmission and the second transmission based on the first transmission including the first type of UCI and the second transmission including the second type of UCI.

3. The method as in claim 2, wherein transmission power to be allocated to the second transmission is scaled based on the first transmission being given higher priority than the second transmission.

4. The method as in claim 1, wherein the first transmission and the second transmission include a same type of UCI, the first MAC instance corresponds to a primary MAC instance, the second MAC instance corresponds to a secondary MAC instance, and the first transmission is prioritized over the second transmission when allocating at least the portion of transmission power based on the first MAC instance corresponding to the primary MAC instance and the second MAC instance corresponding to the secondary MAC instance.

5. The method as in claim 1, wherein the first transmission and the second transmission are performed on different frequency bands.

6. The method as in claim 5, wherein the WTRU is configured with a maximum transmit power for transmissions overlapping at least in part in time that are associated with the first and second MAC instances.

7. The method as in claim 1, wherein the WTRU is configured with a maximum transmit power for transmitting to one or more of the first group of one or more cells associated with the first MAC instance or the second group of one or more cells associated with the second MAC instance.

8. The method as in claim 7, further comprising determining that transmitting according to the first uplink grant for the first group of one or more cells associated with the first MAC instance and transmitting according to the second uplink grant for the second group of one or more cells associated with the second MAC instance would result in the WTRU exceeding the maximum transmit power unless at least one of the transmission power to be allocated for the first transmission or the transmission power to be allocated for the second transmission is scaled.

9. The method as in claim 1, further comprising scaling one or more of power allocated for the first transmission or power allocated for the second transmission based on the tiered priority rules, wherein at least the power allocated to the second transmission is scaled based on the second transmission including UCI that is associated with a lower priority than the UCI included in the first transmission.

10. The method as in claim 9, wherein scaling the power allocated for the second transmission comprises allocating power first to the first transmission, and allocating remaining power up to the maximum transmit power to the second transmissions.

11. The method as in claim 2, wherein the first type of UCI corresponds to hybrid automatic repeat request (HARQ) ACK/NACK feedback, the second type of UCI corresponds to channel state information (CSI) feedback, and first transmission including the HARQ ACK/NACK feedback is prioritized over the second transmission including the CSI feedback.

12. The method as in claim 9, wherein a first group of one or more cells is utilized by the WTRU for performing carrier aggregation transmissions to the first serving site and the second group of one or more cells is utilized by the WTRU for performing carrier aggregation transmissions to the second serving site.

13. A wireless transmit receive unit (WTRU) comprising:
a plurality of medium access control (MAC) instances, wherein the plurality of MAC instances comprise a first MAC instance associated with a first group of one or more cells and a second MAC instance associated with a second group of one or more cells;
a physical layer entity configured to:
  operate using a first physical layer configuration for sending a first transmission to a first serving site in accordance with a first uplink grant applicable to the first MAC instance, the first uplink grant being received from the first serving site,
  operate using a second physical layer configuration for sending a second transmission to a second serving site in accordance with a second uplink grant applicable to the second MAC instance, the second uplink grant being received from the second serving site, and
  allocate at least a portion of transmission power between the first transmission associated with the first MAC instance sent to the first serving site and the second transmission associated with the second MAC instance sent to the second serving site based on tiered priority rules, wherein a first tier priority rule comprises prioritizing transmissions that included uplink control information (UCI) over transmissions that do not include UCI, a second tier priority rule comprises prioritizing transmissions including a first type of UCI over transmissions including a second type of UCI, and a third tier priority rule comprises prioritizing transmissions associated with cells corresponding to a primary MAC instance over transmissions associated with cells corresponding to a secondary MAC instance.

14. The WTRU as in claim 13, wherein the first MAC instance and the second MAC instance utilize non-synchronous subframe timing such that portions of transmissions to the first group of one or more cells associated with the first MAC instance partially overlap with portions of transmissions to the second group of one or more cells associated with the second MAC instance.

15. The WTRU as in claim 13, wherein the first transmission includes the first type of UCI, the second transmission includes the second type of UCI, and the physical layer entity is configured to prioritize the first transmission including the first type of UCI over the second transmission that including the second type of UCI when allocating power for the first and second transmissions.

16. The WTRU as in claim 15, wherein power allocated for the second transmission is scaled based on the first transmission including the first type of UCI and the second transmission including the second type of UCI.

17. The WTRU as in claim 13, wherein the first type of UCI corresponds to hybrid automatic repeat request (HARQ) ACK/NACK feedback and the second type of UCI corresponds to channel state information (CSI) feedback.

18. The WTRU as in claim 13, wherein the physical layer entity is configured to report power headroom information for each of transmissions associated with the first MAC instance and transmissions associated with the second MAC instance to the first serving site.

19. The WTRU as in claim 13, wherein the tiered priority rules are implemented such that the first tier priority rule takes precedence over the second tier priority rule and the second tier priority rule takes precedence over the third tier priority rule.

20. A method for a wireless transmit receive unit (WTRU) to allocate power among transmissions associated with different medium access control (MAC) instances, the method comprising:
the WTRU utilizing a first physical layer configuration for sending a first transmission to a first serving site in accordance with a first uplink grant received from the first serving site, a first MAC instance being associated with a first group of one or more cells served by the first serving site;
the WTRU utilizing a second physical layer configuration for sending a second transmission to a second serving site in accordance with a second uplink grant received from the second serving site, a second MAC instance being associated with a second group of one or more cells served by the second serving site; and
the WTRU scaling transmission power of at least one of the first transmission associated with the first MAC instance sent to the first serving site and the second transmission associated with the second MAC instance sent to the second serving site based on tiered priority rules, wherein a first tier priority rule of the tiered priority rules corresponds to prioritizing transmissions that include uplink control information (UCI) over transmissions that do not include UCI, a second tier priority rule of the tier priority rules corresponds to prioritizing transmissions that include a first type of uplink control information (UCI) over transmissions that include a second type of UCI, and a third tier priority rule of the tiered priority rules corresponds to prioritizing a primary MAC instance over a secondary MAC instance on condition that the first transmission associated with the first MAC instance includes the same type of UCI as is included in the second transmission associated with the second MAC instance.

* * * * *